(12) United States Patent
Jovanovic et al.

(10) Patent No.: US 11,138,757 B2
(45) Date of Patent: Oct. 5, 2021

(54) METHODS AND SYSTEMS FOR MEASURING AND MODELING SPACES USING MARKERLESS PHOTO-BASED AUGMENTED REALITY PROCESS

(71) Applicant: Smart Picture Technologies, Inc., Austin, TX (US)

(72) Inventors: Dejan Jovanovic, Austin, TX (US); Andrew Kevin Greff, Austin, TX (US)

(73) Assignee: SMART PICTURE TECHNOLOGIES, INC., Austin, TX (US)

( * ) Notice: Subject to any disclaimer, the term of this patent is extended or adjusted under 35 U.S.C. 154(b) by 0 days.

(21) Appl. No.: 16/870,679

(22) Filed: May 8, 2020

(65) Prior Publication Data

US 2020/0357132 A1    Nov. 12, 2020

Related U.S. Application Data

(60) Provisional application No. 62/846,476, filed on May 10, 2019.

(51) Int. Cl.
*G06T 7/55*     (2017.01)
*G06T 7/73*     (2017.01)
(Continued)

(52) U.S. Cl.
CPC .................. *G06T 7/73* (2017.01); *G06T 7/62* (2017.01); *G06T 7/80* (2017.01); *G06T 7/97* (2017.01);
(Continued)

(58) Field of Classification Search
CPC .............. H04N 7/183; H04N 5/23216; H04N 5/23238; H04N 5/23293; G06T 7/55;
(Continued)

(56) References Cited

U.S. PATENT DOCUMENTS 3,711,831 A    1/1973 Kaneko et al.
4,801,207 A    1/1989 Williams
(Continued)

FOREIGN PATENT DOCUMENTS

DE          19536294 A1    4/1997
DE       202012104890 U1    3/2013
(Continued)

OTHER PUBLICATIONS

A. Sankar and S. M. Seitz. "Capturing indoor scenes with smartphones." In UIST, 2012. (Year: 2012).*
(Continued)

*Primary Examiner* — Patrick E Demosky
(74) *Attorney, Agent, or Firm* — Wilson Sonsini Goodrich & Rosati

(57) ABSTRACT

Described herein are platforms, systems, media, and methods for measuring a space by launching an active augmented reality (AR) session on a device comprising a camera and at least one processor; calibrating the AR session by establishing a fixed coordinate system, receiving a position and orientation of one or more horizontal or vertical planes in the space in reference to the fixed coordinate system, and receiving a position and orientation of the camera in reference to the fixed coordinate system; constructing a backing model; providing an interface allowing a user to capture at least one photo of the space during the active AR session; extracting camera data from the AR session for the at least one photo; extracting the backing model from the AR session; and storing the camera data and the backing model in association with the at least one photo.

23 Claims, 100 Drawing Sheets

(51) Int. Cl.
| | |
|---|---|
| *G06T 7/80* | (2017.01) |
| *G06T 15/06* | (2011.01) |
| *G06T 19/20* | (2011.01) |
| *G06T 7/62* | (2017.01) |
| *G06T 7/00* | (2017.01) |

(52) U.S. Cl.
CPC .............. *G06T 15/06* (2013.01); *G06T 19/20* (2013.01); *G06T 2210/32* (2013.01); *G06T 2210/61* (2013.01); *G06T 2219/004* (2013.01)

(58) Field of Classification Search
CPC ... G06T 2207/20101; G06T 7/73; G06T 7/80; G06T 7/62; G06T 7/97; G06T 15/06; G06T 19/20; G06T 2210/32; G06T 2210/61; G06T 2219/004; G01C 21/16
See application file for complete search history.

(56) References Cited

U.S. PATENT DOCUMENTS

| | | | |
|---|---|---|---|
| 5,481,622 | A | 1/1996 | Gerhardt et al. |
| 5,699,444 | A | 12/1997 | Palm |
| 6,125,197 | A | 9/2000 | Mack et al. |
| 6,356,298 | B1 | 3/2002 | Abe et al. |
| 6,415,051 | B1 | 7/2002 | Callari et al. |
| 7,058,213 | B2 | 6/2006 | Rubbert et al. |
| 7,239,732 | B1 | 7/2007 | Yamada |
| 7,256,899 | B1 | 8/2007 | Faul et al. |
| 8,031,909 | B2 | 10/2011 | Se et al. |
| 8,294,958 | B2 | 10/2012 | Paterson et al. |
| 8,351,686 | B2 | 1/2013 | Graesser |
| 8,605,987 | B2 | 12/2013 | Chao et al. |
| 8,885,916 | B1 | 11/2014 | Maurer et al. |
| 8,922,647 | B2 | 12/2014 | Crothers et al. |
| 9,131,223 | B1 | 9/2015 | Rangarajan et al. |
| 9,157,757 | B1 | 10/2015 | Liao et al. |
| 9,766,075 | B2 | 9/2017 | Foxlin |
| 10,066,016 | B2 | 9/2018 | Jovanovic et al. |
| 10,083,522 | B2 | 9/2018 | Jovanovic et al. |
| 10,304,254 | B2 | 5/2019 | Jovanovic et al. |
| 2003/0012410 | A1 | 1/2003 | Navab et al. |
| 2003/0068098 | A1 | 4/2003 | Rondinelli et al. |
| 2003/0091227 | A1 | 5/2003 | Chang et al. |
| 2003/0095338 | A1 | 5/2003 | Singh et al. |
| 2003/0128401 | A1 | 7/2003 | Conrow et al. |
| 2004/0095385 | A1 | 5/2004 | Koo et al. |
| 2004/0239688 | A1 | 12/2004 | Krajec |
| 2005/0031167 | A1 | 2/2005 | Hu et al. |
| 2005/0123179 | A1 | 6/2005 | Chen et al. |
| 2005/0213082 | A1 | 9/2005 | Dibernardo et al. |
| 2005/0261849 | A1 | 11/2005 | Kochi et al. |
| 2006/0017720 | A1 | 1/2006 | Li |
| 2006/0056707 | A1 | 3/2006 | Suomela et al. |
| 2006/0210192 | A1 | 9/2006 | Orhun |
| 2007/0065004 | A1 | 3/2007 | Kochi et al. |
| 2008/0062164 | A1 | 3/2008 | Bassi et al. |
| 2008/0075324 | A1 | 3/2008 | Sato et al. |
| 2008/0095468 | A1 | 4/2008 | Klemmer et al. |
| 2008/0123937 | A1 | 5/2008 | Arias Estrada et al. |
| 2008/0159595 | A1 | 7/2008 | Park et al. |
| 2008/0201101 | A1 | 8/2008 | Hebert et al. |
| 2008/0208547 | A1* | 8/2008 | Kim ....................... G06T 7/536 703/2 |
| 2009/0012667 | A1 | 1/2009 | Matsumoto et al. |
| 2009/0268214 | A1 | 10/2009 | Lucic et al. |
| 2010/0017178 | A1 | 1/2010 | Tsuk et al. |
| 2010/0053591 | A1 | 3/2010 | Gibson et al. |
| 2010/0076631 | A1 | 3/2010 | Mian |
| 2010/0104199 | A1 | 4/2010 | Zhang et al. |
| 2010/0201809 | A1 | 8/2010 | Oyama et al. |
| 2011/0050640 | A1 | 3/2011 | Lundback et al. |
| 2011/0106312 | A1 | 5/2011 | Chen et al. |
| 2011/0123135 | A1 | 5/2011 | Hsieh et al. |
| 2011/0205340 | A1 | 8/2011 | Garcia et al. |
| 2012/0007943 | A1 | 1/2012 | Tytgat |
| 2012/0020518 | A1 | 1/2012 | Taguchi |
| 2012/0062702 | A1 | 3/2012 | Jiang et al. |
| 2012/0113142 | A1* | 5/2012 | Adhikari ............ G06Q 30/0623 345/633 |
| 2012/0176380 | A1 | 7/2012 | Wang et al. |
| 2012/0215500 | A1 | 8/2012 | Ciuti et al. |
| 2012/0218437 | A1 | 8/2012 | Hermary et al. |
| 2012/0287240 | A1 | 11/2012 | Grossmann et al. |
| 2012/0293667 | A1 | 11/2012 | Baba et al. |
| 2013/0033596 | A1 | 2/2013 | Crothers et al. |
| 2013/0063613 | A1 | 3/2013 | Conwell |
| 2013/0076894 | A1 | 3/2013 | Osman |
| 2013/0076896 | A1 | 3/2013 | Takabayashi et al. |
| 2013/0136341 | A1 | 5/2013 | Yamamoto |
| 2013/0162785 | A1 | 6/2013 | Michot et al. |
| 2013/0278755 | A1 | 10/2013 | Starns et al. |
| 2013/0307932 | A1 | 11/2013 | Mestha et al. |
| 2013/0321585 | A1 | 12/2013 | Hassebrook et al. |
| 2013/0324830 | A1 | 12/2013 | Bernal et al. |
| 2014/0140579 | A1 | 5/2014 | Takemoto |
| 2014/0143096 | A1 | 5/2014 | Stubert et al. |
| 2014/0210950 | A1 | 7/2014 | Atanassov et al. |
| 2014/0211018 | A1 | 7/2014 | De Lima et al. |
| 2014/0307100 | A1 | 10/2014 | Myllykoski et al. |
| 2014/0314276 | A1 | 10/2014 | Wexler et al. |
| 2014/0320661 | A1 | 10/2014 | Sankar et al. |
| 2014/0375793 | A1 | 12/2014 | Harada et al. |
| 2015/0181198 | A1 | 6/2015 | Baele et al. |
| 2015/0260509 | A1 | 9/2015 | Kofman et al. |
| 2015/0292873 | A1 | 10/2015 | Chou et al. |
| 2015/0316368 | A1 | 11/2015 | Moench et al. |
| 2015/0330775 | A1 | 11/2015 | Basevi et al. |
| 2015/0331576 | A1 | 11/2015 | Piya et al. |
| 2015/0331970 | A1* | 11/2015 | Jovanovic .............. G06T 19/006 703/1 |
| 2015/0347827 | A1 | 12/2015 | Dickinson et al. |
| 2015/0369593 | A1 | 12/2015 | Myllykoski |
| 2016/0044301 | A1 | 2/2016 | Jovanovic et al. |
| 2016/0134860 | A1 | 5/2016 | Jovanovic et al. |
| 2016/0148433 | A1* | 5/2016 | Petrovskaya .......... G02B 27/01 345/633 |
| 2016/0227193 | A1 | 8/2016 | Osterwood et al. |
| 2016/0260250 | A1 | 9/2016 | Jovanovic et al. |
| 2016/0321827 | A1 | 11/2016 | Xiao et al. |
| 2016/0358384 | A1 | 12/2016 | Marche |
| 2017/0249745 | A1 | 8/2017 | Fiala |
| 2018/0021597 | A1 | 1/2018 | Berlinger et al. |
| 2018/0300551 | A1* | 10/2018 | Luccin ............... H04N 5/23293 |
| 2019/0051054 | A1 | 2/2019 | Jovanovic et al. |
| 2019/0347859 | A1 | 11/2019 | Jovanovic et al. |

FOREIGN PATENT DOCUMENTS

| | | |
|---|---|---|
| EP | 2554940 A1 | 2/2013 |
| FR | 2924560 A1 | 6/2009 |
| WO | WO-2006027339 A2 | 3/2006 |
| WO | WO-2007030026 A1 | 3/2007 |
| WO | WO-2013033787 A1 | 3/2013 |
| WO | WO-2013155379 A2 | 10/2013 |
| WO | WO-2015023483 A1 | 2/2015 |
| WO | WO-2015073590 A2 | 5/2015 |
| WO | WO-2015134794 A2 | 9/2015 |
| WO | WO-2015134795 A2 | 9/2015 |
| WO | WO-2019032736 A1 | 2/2019 |
| WO | WO-2020231872 A1 | 11/2020 |

OTHER PUBLICATIONS

PCT/US2020/032246 International Search Report and Written Opinion dated Aug. 6, 2020.
U.S. Appl. No. 14/308,874 Office Action dated May 21, 2020.
Cain et al. Drawing Accurate Ground Plans Using Optical Triangulation Data. 2003 IEEE Conference on Computer Vision and Pattern Recognition (11 pgs) (Jun. 18-20, 2003).
Co-pending U.S. Appl. No. 16/862,272, filed Apr. 29, 2020.
Horn et al. Determining optical Flow: a retrospective. Artificial Intelligence 17:185-203 (1981).

(56) References Cited

OTHER PUBLICATIONS

Kawasaki et al. Entire model acquisition system using handheld 3D digitizer. 3D Data Processing, Visualization and Transmission, 2004. 3DPVT 2004. Proceedings. 2nd International Symposium on. (pp. 478-485) (Sep. 6-9, 2004).

Klein et al. Parallel Tracking and Mapping for Small AR Workspaces. Mixed and Augmented Reality. ISMAR 2007. 6th IEEE and ACM International Symposium on.(10 pgs) (Nov. 13-16, 2007).

Newcombe et al. DTAM: Dense Tracking and Mapping in Real Time. Computer Vision (ICCV), 2011 IEEE International Conference on. (8 pgs) (Nov. 6-13, 2011).

Nguyen et al. A Simple Method for Range Finding via Laser Triangulation. Technical Document 2734. published by the United States Naval Command, Control and Ocean Surveillance Center, RDT&E Division and NRAD (12 pgs) (Jan. 1995).

PCT/US2013/036314 International Search Report and Written Opinion dated Nov. 15, 2013.

PCT/US2014/049900 International Search Report and Written Opinion dated Dec. 10, 2014.

PCT/US2014/065309 International Search Report and Written Opinion dated May 20, 2015.

PCT/US2015/019040 International Search Report and Written Opinion dated Feb. 17, 2016.

PCT/US2015/019041 International Search Report and Written Opinion dated Mar. 31, 2016.

PCT/US2018/045861 International Search Report and Written Opinion dated Oct. 29, 2018.

Sankar et al. Capturing Indoor Scenes with Smartphones. UIST'12 Proceedings of the 25th annual ACM symposium on User interface software and technology. Cambridge, MA Oct. 7-10, 2012. Retrieved on Oct. 11, 2018 from the Internet< url: https://dl.acm.org/citation.cfm?id=2380116.2380168> (pp. 403-412) (2012)</url:>.

Tanskanen et al. Live Metric 3D Reconstruction on Mobile Phones. Computer Vision (ICCV), 2013 IEEE International Conference on. (pp. 65-72) (Dec. 1-8, 2013).

U.S. Appl. No. 13/861,534 Office Action dated Dec. 24, 2015.
U.S. Appl. No. 13/861,534 Office Action dated Jan. 30, 2015.
U.S. Appl. No. 13/861,685 Office Action dated Dec. 4, 2015.
U.S. Appl. No. 13/861,685 Office Action dated Jul. 27, 2016.
U.S. Appl. No. 13/861,685 Office Action dated Mar. 13, 2015.
U.S. Appl. No. 14/308,874 Office Action dated Apr. 3, 2018.
U.S. Appl. No. 14/308,874 Office Action dated Apr. 8, 2016.
U.S. Appl. No. 14/308,874 Office Action dated Aug. 3, 2017.
U.S. Appl. No. 14/308,874 Office Action dated Aug. 8, 2019.
U.S. Appl. No. 14/308,874 Office Action dated Nov. 30, 2018.
U.S. Appl. No. 14/452,937 Office Action dated Jan. 12, 2017.
U.S. Appl. No. 14/539,924 Office Action dated Oct. 6, 2016.
U.S. Appl. No. 14/639,912 Office Action dated Jan. 11, 2017.
U.S. Appl. No. 14/745,325 Office Action dated Jul. 27, 2017.
U.S. Appl. No. 14/745,325 Office Action dated Mar. 7, 2018.
U.S. Appl. No. 15/123,662 Office Action dated Dec. 28, 2017.
U.S. Appl. No. 16/387,221 Office Action dated Oct. 8, 2019.

Zucchelli. Optical Flow based Structure from Motion. Doctoral Dissertation (142 pgs) (2002).

U.S. Appl. No. 16/862,272 Office Action dated Mar. 19, 2021.

* cited by examiner

METHODS AND SYSTEMS FOR MEASURING AND MODELING SPACES USING MARKERLESS PHOTO-BASED AUGMENTED REALITY PROCESS

CROSS-REFERENCE TO RELATED APPLICATIONS

This application claims the benefit of U.S. Application No. 62/846,476, filed on May 10, 2019, entitled "METHODS AND SYSTEMS FOR MEASURING AND MODELING SPACES USING MARKERLESS PHOTO-BASED AUGMENTED REALITY PROCESS," the contents of which are incorporated herein by reference for all purposes.

BACKGROUND

Augmented reality (AR) is an interactive experience of a real-world environment where the objects that reside in the real world are enhanced by computer-generated perceptual information. AR technology may be practically applied to solve real world problems.

SUMMARY

In one aspect, disclosed herein are systems comprising a first processing device comprising a camera and at least one processor configured to perform at least the following: launch an active augmented reality (AR) session; calibrate the AR session by establishing a fixed coordinate system, receiving a position and orientation of one or more horizontal or vertical planes in a space in reference to the fixed coordinate system, and receiving a position and orientation of the camera in reference to the fixed coordinate system; construct a backing model comprising the fixed coordinate system, the position and orientation of the camera, and the position and orientation of the one or more horizontal or vertical planes; present an interface allowing a user to capture at least one photo of the space during the active AR session; extract camera data from the AR session for the at least one photo; extract the backing model from the AR session; and store the camera data and the backing model in association with the at least one photo. In some embodiments, the first processing device is further configured to: provide a user interface allowing the user to perform at least: viewing the at least one photo; and identifying screen coordinates on the at least one photo to measure a feature of the space; access the camera data and the backing model for the at least one photo; build a conversion pipeline, using the camera data, to convert the screen coordinates to world coordinates using ray-casting, the conversion pipeline performing at least: using the screen coordinates to project a camera ray in world coordinates; evaluate the ray for intersections with objects in the backing model; and return any intersections as the world coordinates corresponding to the screen coordinates; convert the identified world coordinates to one or more lengths, one or more areas, or one or more volumes in the space; annotate the at least one photo with the one or more lengths, one or more areas, or one or more volumes; and store the measurements and annotations in association with the at least one photo. In further embodiments, the user identifies screen coordinates by tapping on a touchscreen, tapping and dragging on a touch screen, clicking with a pointing device, or clicking and dragging with a pointing device. In further embodiments, the measurements and annotations are stored in association with the at least one photo as metadata associated with the at least one photo. In further embodiments, the measurements and annotations are stored in association with the at least one photo by linking the measurements and the annotations to that at least one photo via a stored token or key. In some embodiments, the first processing device is further configured to: utilize one or more computer vision algorithms to detect one or more 3D geometries in the space, the one or more 3D geometries selected from: floor corners, walls, windows, doors, and other 3D geometries; and automatically add detected 3D geometries to the backing model. In some embodiments, the first processing device is further configured to allow the user to make corrections to the backing model based on measurements taken in the at least one photo. In some embodiments, the first processing device is further configured to transmit the stored camera data, the stored backing model, and the at least one photo. In some embodiments, the system further comprises a second processing device comprising at least one processor configured to perform at least the following: present a user interface allowing the user to perform at least: viewing the at least one photo; and identifying screen coordinates on the at least one photo to measure a feature of the space; access the camera data and the backing model for the at least one photo; build a conversion pipeline, using the camera data, to convert the screen coordinates to world coordinates using ray-casting, the conversion pipeline performing at least: using the screen coordinates to project a camera ray in world coordinates; evaluate the ray for intersections with objects in backing model; and returning any intersections as the world coordinates corresponding to the screen coordinates; convert the identified world coordinates to one or more lengths, one or more areas, or one or more volumes in the space; annotate the at least one photo with the one or more lengths, one or more areas, or one or more volumes; and store the measurements and annotations in association with the at least one photo. In further embodiments, the user interface is implemented in a web browser or a mobile application. In still further embodiments, the user identifies screen coordinates by tapping on a touchscreen, tapping and dragging on a touch screen, clicking with a pointing device, or clicking and dragging with a pointing device. In further embodiments, the measurements and annotations are stored in association with the at least one photo as metadata associated with the at least one photo. In further embodiments, the measurements and annotations are stored in association with the at least one photo by linking the measurements and the annotations to that at least one photo via a stored token or key. In further embodiments, the second processing device is further configured to: utilize one or more computer vision algorithms to detect one or more 3D geometries in the space, the one or more 3D geometries selected from: floor corners, walls, windows, doors, and other 3D geometries; and automatically add detected 3D geometries to the backing model. In further embodiments, the second processing device is further configured to allow the user to make corrections to the backing model based on measurements taken in the at least one photo. In some embodiments, the camera data comprises: projection matrix, view matrix, view port, camera position, view angle, scale factor, or a combination thereof. In some embodiments, the first processing device is further configured to allow the user to add one or more objects to the backing model by performing at least the following: provide an AR interface allowing the user to indicate the positions of corners of a floor of the space in reference to the fixed coordinate system, wherein the application is configured to project a reference point on the screen into a ray in world coordinates and determine an intersection point with the one or more horizontal or vertical planes plane via hit-testing thus detecting the corners of the floor of the space; assemble the detected corners into a floorplan of the space; generate virtual quasi-infinite vertical planes extending from each corner of the detected corners representing virtual walls of the space; provide an AR interface allowing the user to indicate the positions of intersection points between the ceiling and the virtual walls; truncate the virtual walls to reflect the ceiling height in the space; and optionally, provide an AR interface allowing the user to indicate the positions of corners openings in the virtual walls. In some embodiments, the first processing device is further configured to convert the at least one photo to a transmittable format. In further embodiments, the transmittable format comprises JPEG, JPEG 2000, TIFF, PNG, GIF, WebP, BAT, BPG, PPM, PGM, PBM, or PNM. In some embodiments, the camera data and the backing model are stored in a structured or semi-structured data format. In further embodiments, structured or semi-structured data format comprises JSON, XML, or a combination thereof. In some embodiments, the camera data and the backing model are stored in association with the at least one photo as metadata associated with the at least one photo. In further embodiments, the metadata associated with the at least one photo comprises EXIF, EFIC, IPTC, and/or XMP data associated with the at least one photo and/or included in a sidecar file associated with the at least one photo. In other embodiments, the camera data and the backing model are stored in association with the at least one photo by linking the camera data and the backing model to that at least one photo via a stored token or key. In some embodiments, the capture of the at least one photo of the space during the active AR session is triggered by a local user present in the space and with the first processing device. In other embodiments, the capture of the at least one photo of the space during the active AR session is triggered by a remote user not present in the space. An example of this embodiment is where the first and second devices communicate using a real-time video link, whereby a second processing device controls capture in the first processing device. In some embodiments, the system further comprises a second processing device comprising at least one processor configured to provide an application allowing a user to edit the position or orientation of the one or more horizontal or vertical planes in the space in reference to the fixed coordinate system. In further embodiments, the second processing device comprises a server, a server cluster, a cloud computing platform, or a combination thereof. In some embodiments, the system further comprises a second processing device comprising at least one processor configured to provide an application allowing a user to edit the screen coordinates identified on the at least one photo. In further embodiments, a remote user of the second processing device optionally makes real-time measurements on captured photos from the first processing device. In this embodiment, the first and second processing devices are connected with a real-time video link. In further embodiments, the second processing device comprises a server, a server cluster, a cloud computing platform, or a combination thereof. In some embodiments, the system further comprises one or more computer vision algorithms configured to perform one or more of the following: identify or quantify one or more colors in space; identify or quantify one or more materials in the space; and identify or quantify one or more objects in the space. In some embodiments, the one or more computer vision algorithms comprises at least one artificial neural network.

In another aspect, disclosed herein are methods comprising: launching an active augmented reality (AR) session on a first processing device comprising a camera and at least one processor; calibrating the AR session by establishing a fixed coordinate system, receiving a position and orientation of one or more horizontal or vertical planes in a space in reference to the fixed coordinate system, and receiving a position and orientation of the camera in reference to the fixed coordinate system; constructing a backing model comprising the fixed coordinate system, the position and orientation of the camera, and the position and orientation of the one or more horizontal or vertical planes; providing an interface allowing a user to capture at least one photo of the space during the active AR session; extracting camera data from the AR session for the at least one photo; extracting the backing model from the AR session; and storing the camera data and the backing model in association with the at least one photo. In some embodiments, the method further comprises: providing a user interface allowing the user to perform at least: viewing the at least one photo; and identifying screen coordinates on the at least one photo to measure a feature of the space; accessing the camera data and the backing model for the at least one photo; building a conversion pipeline, using the camera data, to convert the screen coordinates to world coordinates using ray-casting, the conversion pipeline performing at least: using the screen coordinates to project a camera ray in world coordinates; evaluate the ray for intersections with objects in the backing model; and return any intersections as the world coordinates corresponding to the screen coordinates; converting the identified world coordinates to one or more lengths, one or more areas, or one or more volumes in the space; annotating the at least one photo with the one or more lengths, one or more areas, or one or more volumes; and storing the measurements and annotations in association with the at least one photo. In further embodiments, the user identifies screen coordinates by tapping on a touchscreen, tapping and dragging on a touch screen, clicking with a pointing device, or clicking and dragging with a pointing device. In further embodiments, the measurements and annotations are stored in association with the at least one photo as metadata associated with the at least one photo. In further embodiments, the measurements and annotations are stored in association with the at least one photo by linking the measurements and the annotations to that at least one photo via a stored token or key. In some embodiments, the method further comprises: utilizing one or more computer vision algorithms to detect one or more 3D geometries in the space, the one or more 3D geometries selected from: floor corners, walls, windows, doors, and other 3D geometries; and automatically adding detected 3D geometries to the backing model. In some embodiments, the method further comprises providing an interface allowing the user to make corrections to the backing model based on measurements taken in the at least one photo. In some embodiments, the method further comprises transmitting the stored camera data, the stored backing model, and the at least one photo. In some embodiments, the method further comprises: presenting, on a second processing device comprising at least one processor, a user interface allowing the user to perform at least: viewing the at least one photo; and identifying screen coordinates on the at least one photo to measure a feature of the space; accessing the camera data and the backing model for the at least one photo; building a conversion pipeline, using the camera data, to convert the screen coordinates to world coordinates using ray-casting, the conversion pipeline performing at least: using the screen coordinates to project a camera ray in world coordinates; evaluate the ray for intersections with objects in backing model; and returning any intersections as the world coordinates corresponding to the screen coordinates; converting the identified world coordinates to one or more lengths, one or more areas, or one or more volumes in the space; annotating the at least one photo with the one or more lengths, one or more areas, or one or more volumes; and storing the measurements and annotations in association with the at least one photo. In further embodiments, the user interface is implemented in a web browser or a mobile application. In still further embodiments, the user identifies screen coordinates by tapping on a touchscreen, tapping and dragging on a touch screen, clicking with a pointing device, or clicking and dragging with a pointing device. In further embodiments, the measurements and annotations are stored in association with the at least one photo as metadata associated with the at least one photo. In further embodiments, the measurements and annotations are stored in association with the at least one photo by linking the measurements and the annotations to that at least one photo via a stored token or key. In further embodiments, the method further comprises: utilizing one or more computer vision algorithms to detect one or more 3D geometries in the space, the one or more 3D geometries selected from: floor corners, walls, windows, doors, and other 3D geometries; and automatically adding detected 3D geometries to the backing model. In further embodiments, the method further comprises providing an interface allowing the user to make corrections to the backing model based on measurements taken in the at least one photo. In some embodiments, the camera data comprises: projection matrix, view matrix, view port, camera position, view angle, scale factor, or a combination thereof. In some embodiments, the first processing device is further configured to allow the user to add one or more objects to the backing model by performing at least the following: provide an AR interface allowing the user to indicate the positions of corners of a floor of the space in reference to the fixed coordinate system, wherein the application is configured to project a reference point on the screen into a ray in world coordinates and determine an intersection point with the one or more horizontal or vertical planes plane via hit-testing thus detecting the corners of the floor of the space; assemble the detected corners into a floorplan of the space; generate virtual quasi-infinite vertical planes extending from each corner of the detected corners representing virtual walls of the space; provide an AR interface allowing the user to indicate the positions of intersection points between the ceiling and the virtual walls; truncate the virtual walls to reflect the ceiling height in the space; and optionally, provide an AR interface allowing the user to indicate the positions of corners openings in the virtual walls. In some embodiments, the method further comprises converting the at least one photo to a transmittable format. In further embodiments, the transmittable format comprises JPEG, JPEG 2000, TIFF, PNG, GIF, WebP, BAT, BPG, PPM, PGM, PBM, or PNM. In some embodiments, the camera data and the backing model are stored in a structured or semi-structured data format. In further embodiments, structured or semi-structured data format comprises JSON, XML, or a combination thereof. In some embodiments, the camera data and the backing model are stored in association with the at least one photo as metadata associated with the at least one photo. In further embodiments, the metadata associated with the at least one photo comprises EXIF, EFIC, IPTC, and/or XMP data associated with the at least one photo and/or included in a sidecar file associated with the at least one photo. In other embodiments, the camera data and the backing model are stored in association with the at least one photo by linking the camera data and the backing model to that at least one photo via a stored token or key. In some embodiments, the capture of the at least one photo of the space during the active AR session is triggered by a local user present in the space and with the first processing device. In other embodiments, the capture of the at least one photo of the space during the active AR session is triggered by a remote user not present in the space. In some embodiments, the method further comprises providing an application allowing a user to edit the position or orientation of the one or more horizontal or vertical planes in the space in reference to the fixed coordinate system. In some embodiments, the method further comprises providing an application allowing a user to edit the screen coordinates identified on the at least one photo. In some embodiments, the method further comprises applying one or more computer vision algorithms to perform one or more of the following: identify or quantify one or more colors in space; identify or quantify one or more materials in the space; and identify or quantify one or more objects in the space. In further embodiments, the one or more computer vision algorithms comprises at least one artificial neural network.

BRIEF DESCRIPTION OF THE DRAWINGS

A better understanding of the features and advantages of the present subject matter will be obtained by reference to the following detailed description that sets forth illustrative embodiments and the accompanying drawings of which.

DETAILED DESCRIPTION

Figure 1:
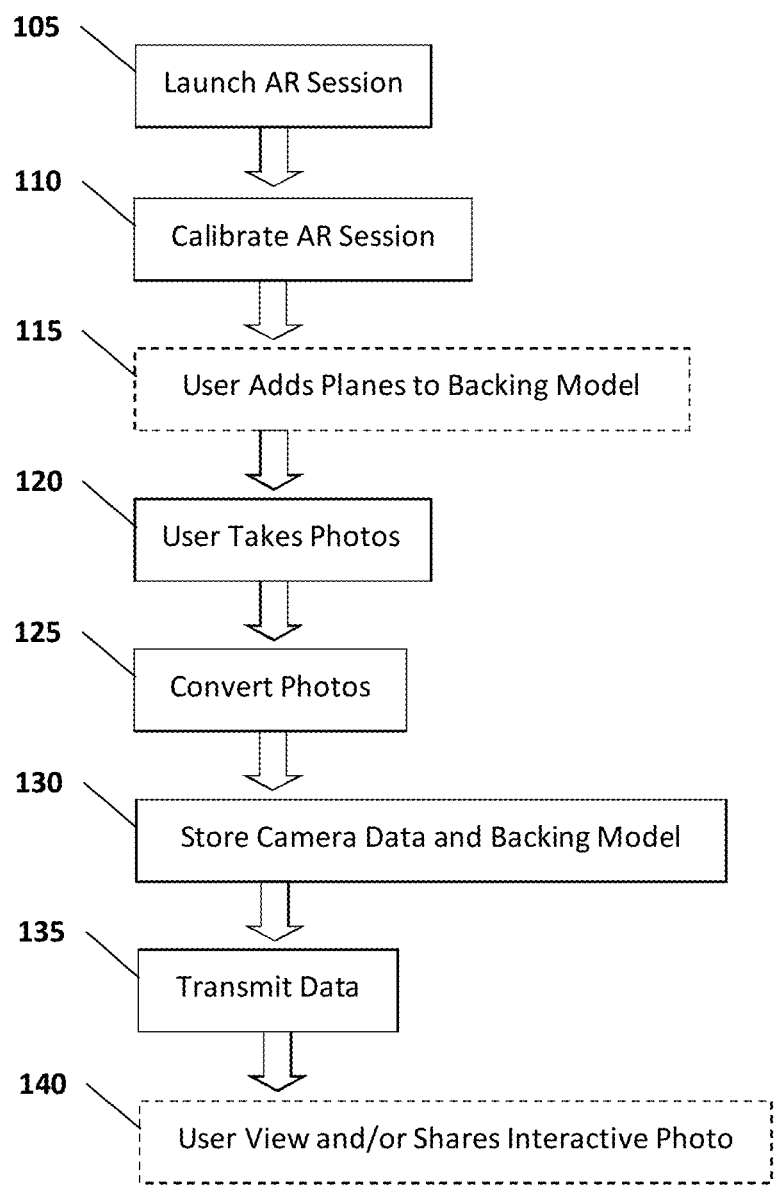
FIG. 1 shows a non-limiting exemplary process flow diagram illustrating a process for creating an interactive model of a space by capturing photos during an AR session.

Described herein, in certain embodiments, are systems comprising a first electronic device comprising a camera and at least one processor configured to perform at least the following: launch an active augmented reality (AR) session; calibrate the AR session by establishing a fixed coordinate system, receiving a position and orientation of one or more horizontal or vertical planes in a space in reference to the fixed coordinate system, and receiving a position and orientation of the camera in reference to the fixed coordinate system; construct a backing model comprising the fixed coordinate system, the position and orientation of the camera, and the position and orientation of the one or more horizontal or vertical planes; present an interface allowing a user to capture at least one photo of the space during the active AR session; extract camera data from the AR session for the at least one photo; extract the backing model from the AR session; and store the camera data and the backing model in association with the at least one photo.

Also described herein, in certain embodiments, are methods comprising: launching an active augmented reality (AR) session on a first electronic device comprising a camera and at least one processor; calibrating the AR session by establishing a fixed coordinate system, receiving a position and orientation of one or more horizontal or vertical planes in a space in reference to the fixed coordinate system, and receiving a position and orientation of the camera in reference to the fixed coordinate system; constructing a backing model comprising the fixed coordinate system, the position and orientation of the camera, and the position and orientation of the one or more horizontal or vertical planes; providing an interface allowing a user to capture at least one photo of the space during the active AR session; extracting camera data from the AR session for the at least one photo; extracting the backing model from the AR session; and storing the camera data and the backing model in association with the at least one photo.

Certain Definitions

Unless otherwise defined, all technical terms used herein have the same meaning as commonly understood by one of ordinary skill in the art to which the present subject matter belongs. As used in this specification and the appended claims, the singular forms "a," "an," and "the" include plural references unless the context clearly dictates otherwise. Any reference to "or" herein is intended to encompass "and/or" unless otherwise stated.

"Markerless," as used herein, refers to the fact that the subject matter described herein does not utilize visual fiducial markers of known pattern and size to serve as real world anchors of location, orientation, and/or scale.

"Augmented reality" or "AR," as used herein, refers to an interactive experience of a real-world environment whereby the objects that reside in the real-world are augmented by computer-generated perceptual information. AR as used herein includes, but is not limited to, photo and/or video-based AR systems utilizing, for example, one or more cameras, and also LiDAR-based AR systems utilizing, for example, an active time-of-flight sensor.

"Fixed coordinate system" or "world coordinate system," as used herein, refers to a real-world coordinate system that is fixed and oriented to a world tracking origin.

"Ray casting" or "hit testing," as used herein, refers to the use of a ray that intersects extending perpendicular to the screen of an electronic device that is useful for solving a variety of computational geometry. In some aspects, disclosed herein, ray casting uses a geometric ray tracing algorithm.

Overview

In some embodiments, the platforms, systems, media, and methods described herein comprise one or more application configured to carry out a photo/data capture process and/or a viewing/measuring/annotating process. The two processes may be carried out using the same application or different application used by the same user or different users during the same session or in different sessions at different points in time. These processes are useful for empirical measurement including, by way of non-limiting examples, measurements in remodeling and insurance claim contexts. In further embodiments, the platforms, systems, media, and methods described herein offer a simplified workflow that does not require a marker or other reference objects placed in the space and that only requires the user to take photos during an active AR session. This allows new, inexperienced, and non-tech-savvy users to succeed in easily making accurate and complex 3D models of a space and measurements of the same.

A non-limiting example of a capture process is provided in FIG. 1. Referring to FIG. 1, in a particular embodiment, a photo/data capture process starts with launching an active AR session 105. The AR session is calibrated 110 by establishing a fixed coordinate system and establishing the position/orientation of the camera and the position/orientation of a horizontal or vertical plane in reference to the fixed coordinate system. Once calibrated, the user takes photos of the space to be measured 120 and, optionally, uses a manual process to add additional planes 115 to a backing model for the photos in the session. The photos are processed and converted to a transmissible format 125. Also, camera data and backing model data are stored in association with the photos captured during the AR session 130. Subsequently, the associated photos and data are transmitted 135. Finally, the same user or a different user has the option to view and/or share the resulting interactive photo (e.g., a smart picture) 140, which can be used to make 3D measurements, in real world coordinates, in the captured space.

In an alternative embodiment, the AR session comprises a collaboration with one or more other users. In various embodiments, the collaboration is conducted via audio conference, video conference, telepresence, and the like. In further embodiments, the photos are optionally taken remotely by one or more of the collaborators. In such embodiments, the remote collaborator(s) activate the camera present in the space to capture one or more of the photos.

Figure 2:
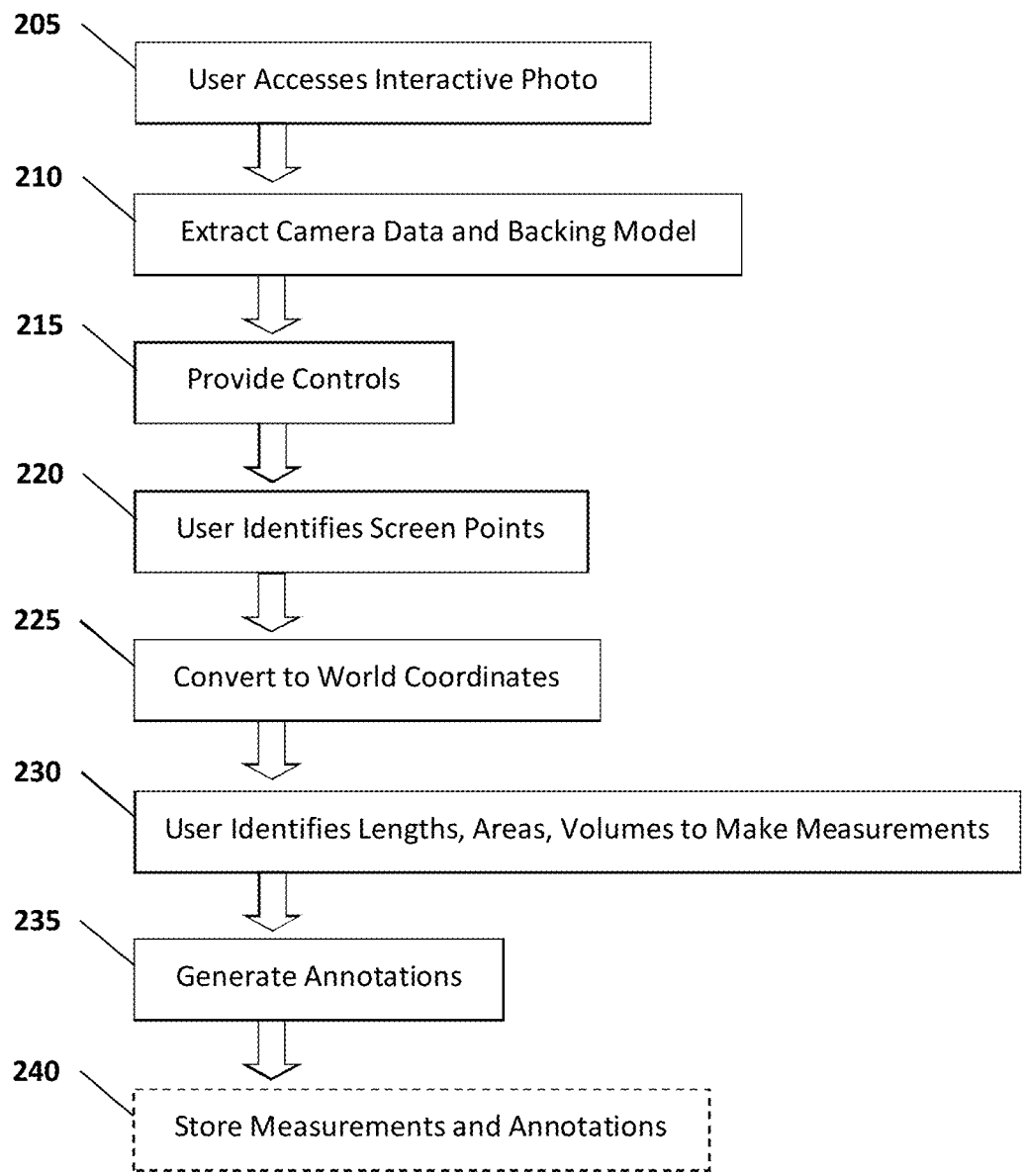
FIG. 2 shows a non-limiting exemplary process flow diagram illustrating a process for creating a viewer for making measurements of a space as well as annotations using an interactive model of the space.

A non-limiting example of a viewing process is provided in FIG. 2. Referring to FIG. 2, in a particular embodiment, a viewing/measuring process starts with a user accessing the interactive photo (e.g., the smart picture) 205. In a case where the camera data and the backing model data from the AR session are packaged with the photo(s), for example, as metadata (such as EXIF, EFIC, IPTC, XMP data, or other metadata format), the data is extracted 210. In an alternative case where the camera data and the backing model data from the AR session are stored and associated with the photo(s) by, for example, a key, token, link, etc., the data is retrieved. Next, in this process, the user is provided with a viewer interface including controls 215 allowing the user to identify screen points 220 by touching, tapping, clicking, or by using voice commands, etc. The application converts the identified screen points to world coordinates 225. The viewer interface also provided the user with the option to make measurements 230 by identifying lengths, areas, volumes, etc. in the space. Annotations are generated to document the measurements in the photo(s) 235. Finally, and optionally, the measurements and annotations are stored in association with the photo(s) 240, either by including the data as metadata (such as EXIF, EFIC, IPTC, XMP data, other metadata) associated with the photo(s), or alternatively, are stored separately, for example, in a database or sidecar file, and associated with the photo(s) by way of a key, token, link, or the like.

Figure 3:
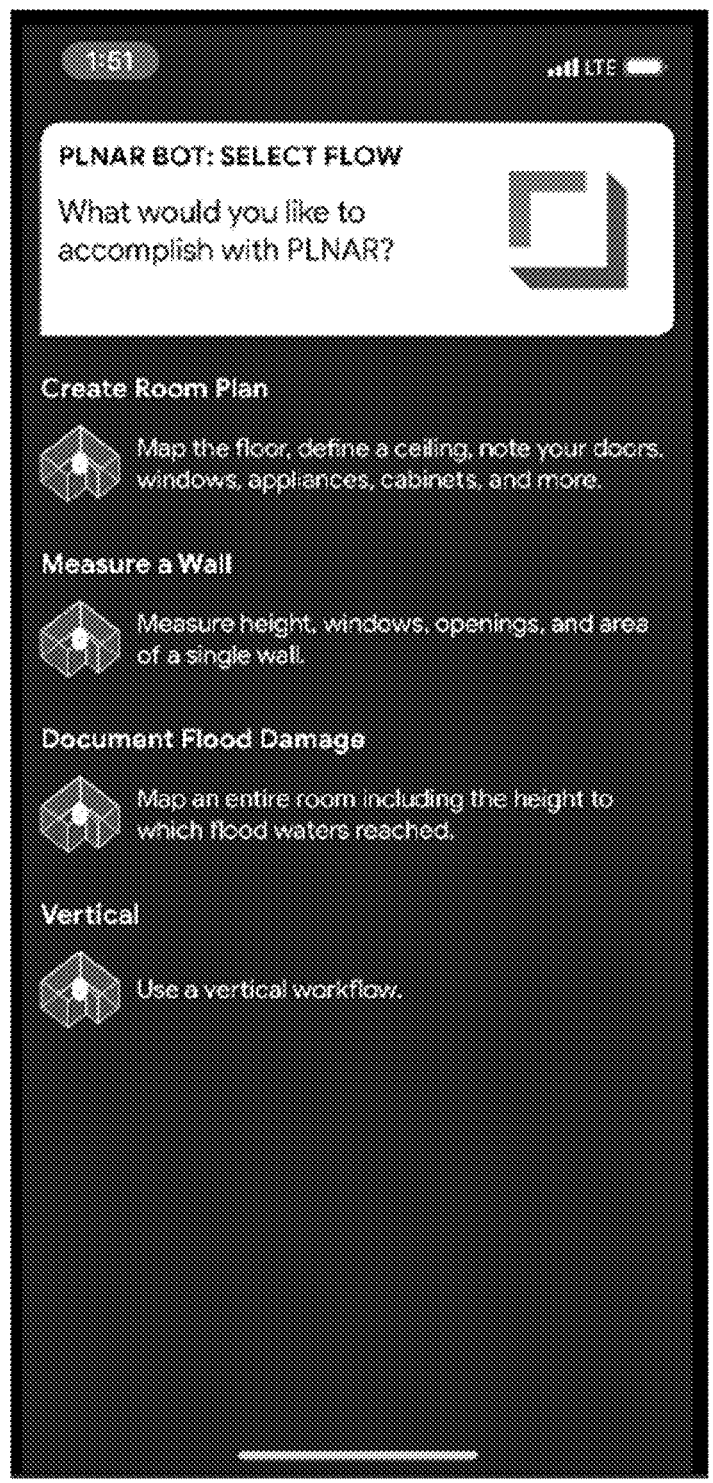
FIG. 3 shows a non-limiting example of a menu interface for an AR application described herein; in this case, a menu interface allowing a user to select from a variety of modes for constructing a 3D model of an interior or exterior space.

Referring to FIG. 3, in a particular embodiment, an AR capture application described herein provides a user interface menu allowing a user to select from among capture modes. In this embodiment, the menu includes options to select 1) create a room plan, 2) measure a wall, 3) document damage (as part of a practical property insurance application), and 4) use a vertical workflow.

Calibration

In some embodiments, the platforms, systems, media, and methods described herein include features for launching and calibrating an AR session. In further embodiments, calibrating an AR session includes establishing a fixed coordinate system, receiving a position and orientation of one or more horizontal or vertical planes in a space in reference to the fixed coordinate system, and receiving a position and orientation of a device camera in reference to the fixed coordinate system. In some embodiments, the position and orientation of one or more horizontal or vertical planes in a space includes the position and orientation of a ground plane in the space. See, e.g., FIGS. 1, 4-5, and 29-30.

Backing Model

In some embodiments, the platforms, systems, media, and methods described herein utilize backing models. In further embodiments, a backing model is associated with one or more photos of a space taken by a user. In some embodiments, the platforms, systems, media, and methods described herein are configured to construct a backing model. In further embodiments, a constructed backing model includes data from an active AR session and is associated with one or more photos taken during the active AR session. In still further embodiments, a backing model includes a fixed coordinate system, a position and orientation of a camera, and a position and orientation of one or more horizontal or vertical planes (such as a ground plane) from an active AR session. In some embodiments, a backing model is stored in association with one or more photos captured during an active AR session. In embodiments, where the AR session is LiDAR-based, the backing model includes LiDAR data such as pointclouds, meshes, structural data, and the like, and/or is generated, at least in part, from LiDAR data and is integrated with one or more photos/videos.

In some embodiments, a backing model for one or more photos is accessed and used to build a conversion pipeline to convert screen coordinates to world coordinates, wherein ray casting is used to evaluate for intersections with objects in the backing model and return any intersections as the world coordinates corresponding to screen coordinates identified by a user.

In some embodiments, a backing model described herein comprises one or more planes defined in a fixed coordinate system. In further embodiments, for each plane defined, a backing model includes, by way of non-limiting examples, a name, a description, normal coordinates (X, Y, and Z-axis), a width, a position (X, Y, and Z-axis), a height, an extrusion depth, and the like. In some embodiments, planes are added to the backing model automatically by the platforms, systems, media, and methods described herein. In some embodiments, planes are added to the backing model by a user. In some embodiments, a backing model includes a UI Bezier path.

Automatic Augmentation of Backing Model

In some embodiments, the platforms, systems, media, and methods described herein are configured to automatically augment, supplement, or improve the backing model. In further embodiments, the backing model is automatically augmented, supplemented, or improved by utilization of one or more computer vision algorithms to detect one or more 3D geometries in the space, which are added to or integrated into the backing model. By way of non-limiting examples, the 3D geometries detected may include floor corners, floor perimeters, floors, wall corners, wall bases, walls, wall-ceiling interfaces, ceiling corners, ceilings, ceiling vaults and peaks, openings in walls and ceilings (e.g., windows, niches, doors, passages, pass-throughs, skylights, etc.), and other 3D geometries.

In some embodiments, the platforms, systems, media, and methods described herein are configured to perform corner detection to augment, supplement, or improve the backing model. In further embodiments, the platforms, systems, media, and methods described herein utilize a computer vision pipeline employing one or more deep learning algorithms to detect corners in a space. Non-limiting examples of suitable corner detection methods include Harris operator (Harris feature detection), Shi and Tomasi, FAST, Level curve curvature, Hessian feature strength measures, and SUSAN. By way of examples, in various embodiments, the object detection framework is configured to detect corners of a floor perimeter, corners of an interior or exterior wall base, corners of an interior or exterior wall, corners of an interior ceiling or exterior roof, corners of openings is walls and/or ceilings (e.g., windows, niches, doors, passages, pass-throughs, skylights, etc.), and/or corners of fixtures (e.g., cabinets, counters, islands, appliances, etc.) in the backing model. In some embodiments, automatic corner detection allows the user to measure the distance between corners that are automatically detected, thereby reducing user time to completion of the project. In some embodiments, the automatic corner detection facilitates making measurements, by enabling the measuring tools to "snap" to the detected corners.

In some embodiments, the platforms, systems, media, and methods described herein are configured to perform object detection to augment, supplement, or improve the backing model. In further embodiments, the platforms, systems, media, and methods described herein utilize a computer vision pipeline employing one or more deep learning algorithms to detect objects in a space. In some embodiments, object detection is performed by combining an object detection framework with the augmented reality (AR) data generated during an AR session. Non-limiting examples of suitable object detection frameworks include neutral networks, convolutional neural networks, deep learning algorithms (e.g., CAFFE) and object detection algorithms (Teknomo-Fernandez algorithm, Viola-Jones object detection framework, etc.). In some embodiments, the object detection framework leverages the data generated using the AR application to detect scale of the object in the space. In further embodiments, the object detection framework is configured to recognize objects common in the space type and/or region or location of the space.

Figure 52:
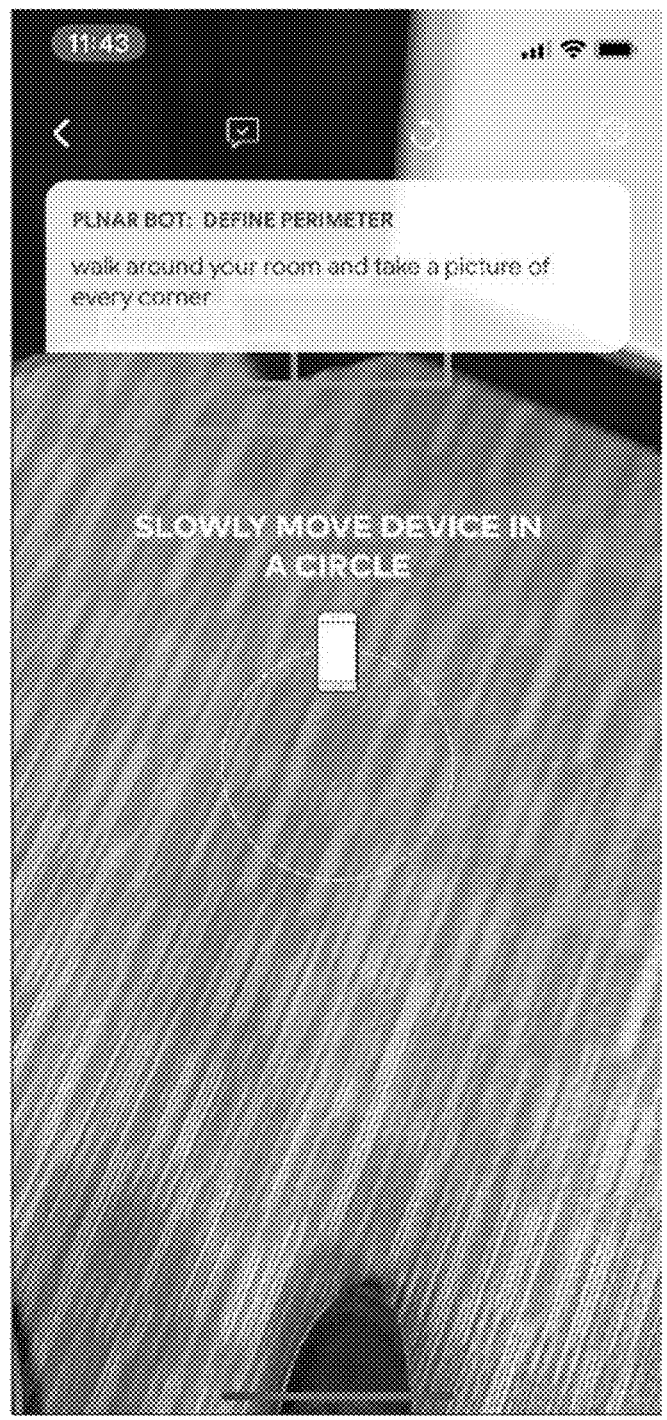
FIGS. 52-57 show non-limiting examples of a user interface for an AR application described herein; in this case, a user interface for defining a floor perimeter using computer vision methods to automatically detect corners of a space.
Figure 53:
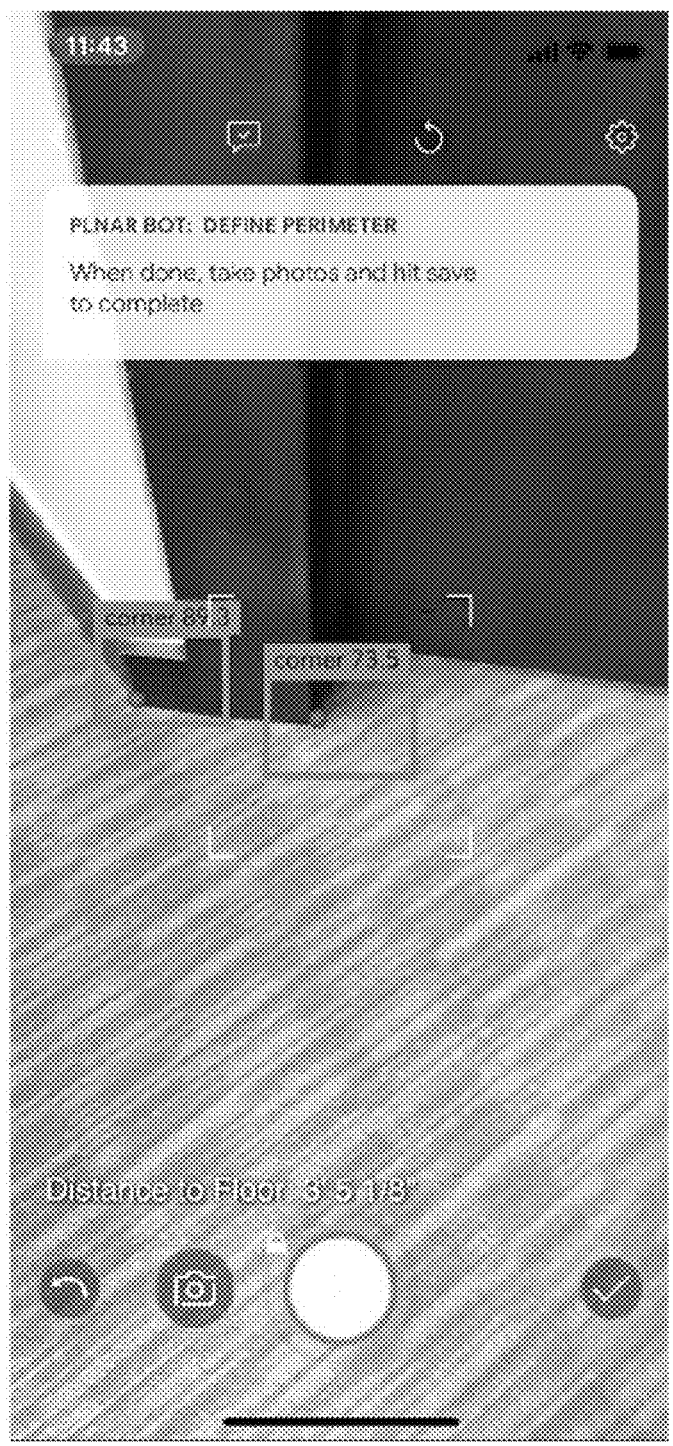
Figure 54:
Figure 55:
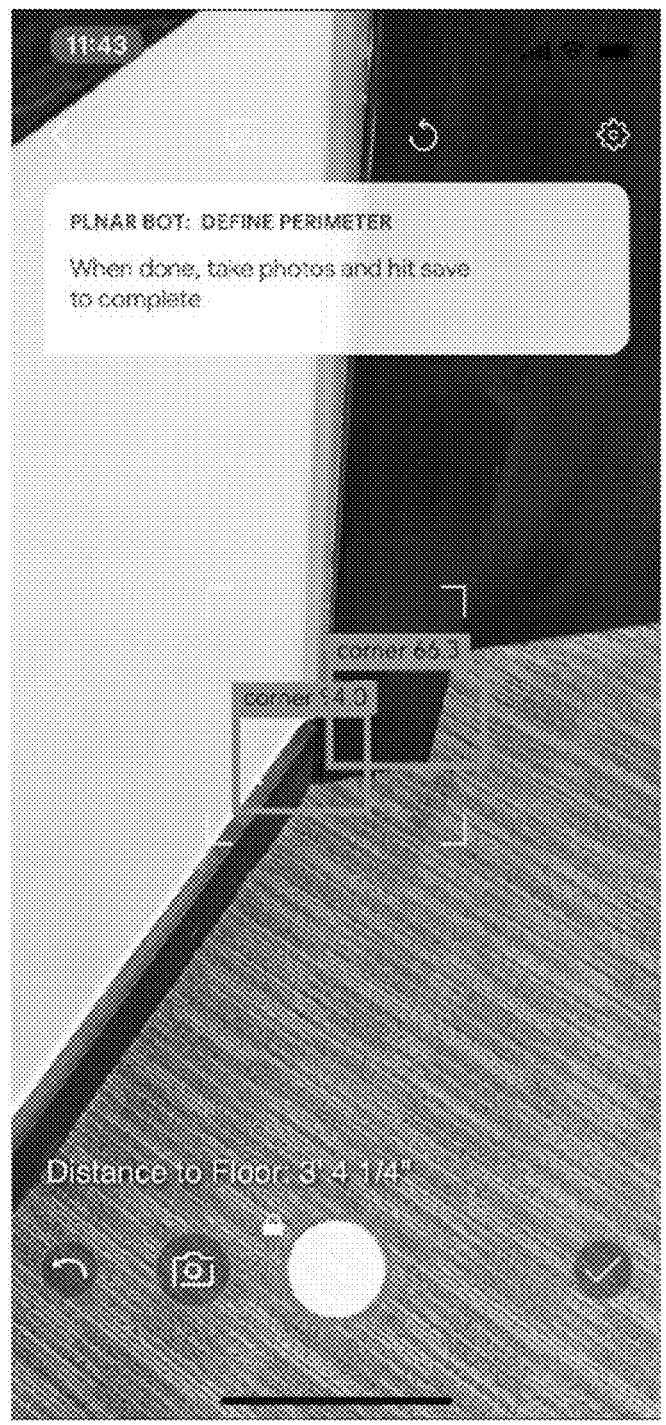
Figure 56:
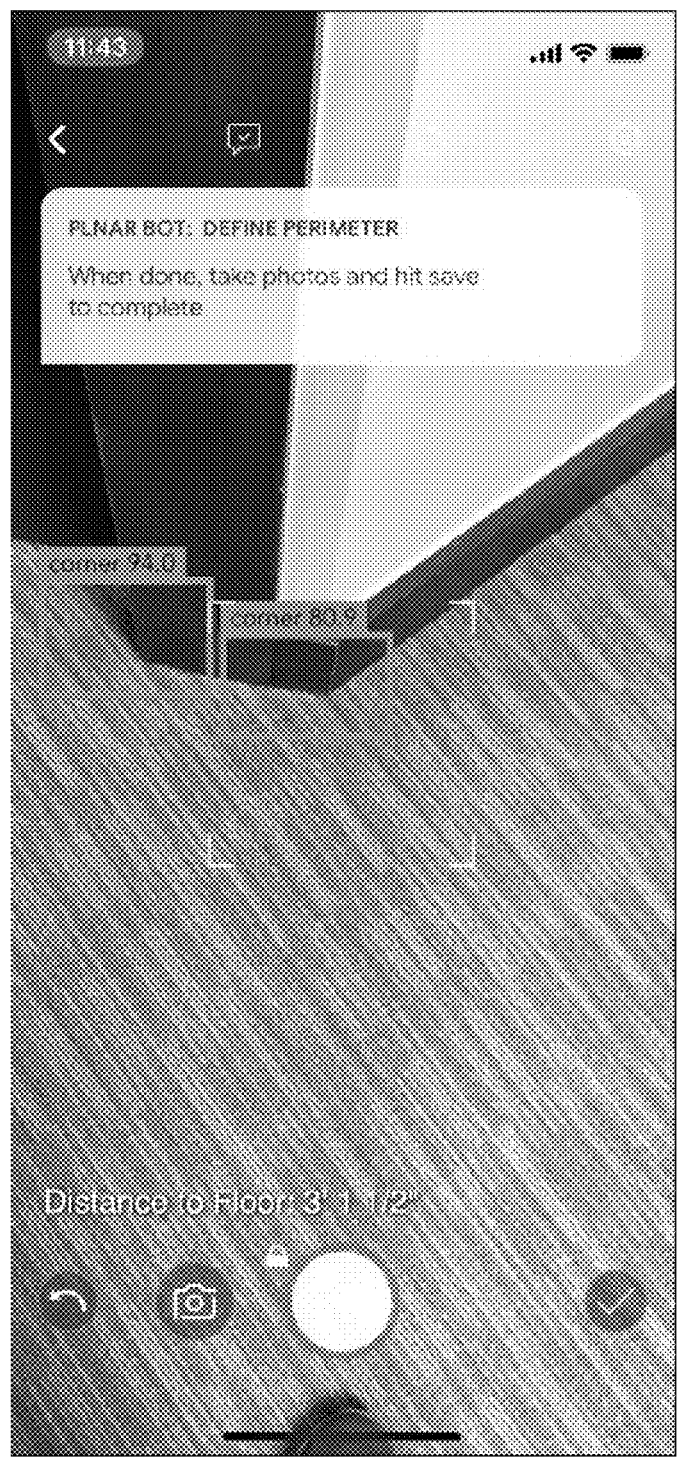
Figure 57:
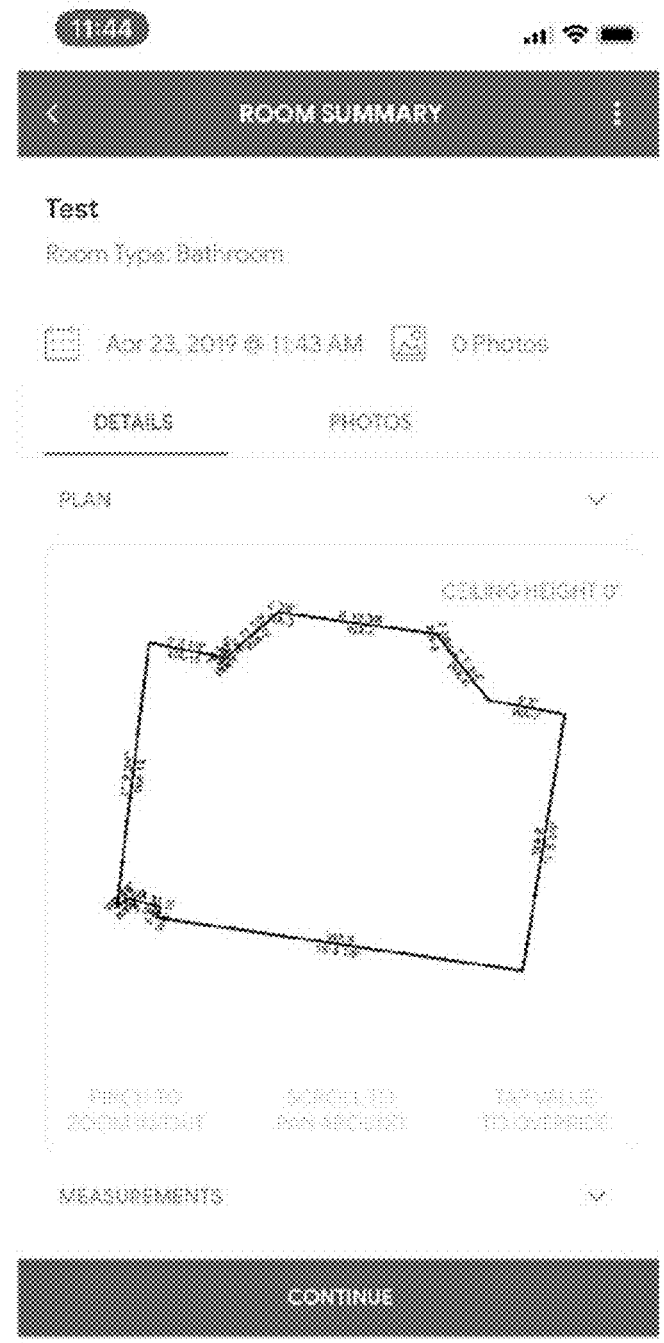

A non-limiting example is provided in FIGS. 52-57. Referring to FIG. 52, in a particular embodiment, a user is prompted to calibrate an active AR session by aiming the camera of a device toward the floor of a space and slowly moving the device in a circular pattern parallel to the floor. In this embodiment, once the ground plane is detected and the user is further prompted to walk around the perimeter of the space and take photos of the corners at the perimeter of the floor. As shown in FIGS. 53-56, in the active AR session, the distance to the floor is tracked and the corner points are automatically by computer vision methods and indicated with a bounding box containing the identified corner point along with its coordinates. Referring to FIG. 57, the corners are automatically assembled into a floorplan, which is shown along with additional information and associated with the photos taken by the user. In this embodiment, the user is not required to tap or otherwise indicate the corners; they merely pan along the space and capture photos to generate the floorplan.

Manual Augmentation of Backing Model

In some embodiments, the platforms, systems, media, and methods described herein include features allowing a user to augment, supplement, and or improve a backing model by starting an AR session and manually defining a space, an aspect of a space, or an object in a space. In further embodiments, the platforms, systems, media, and methods described herein include providing an AR interface allowing the user to indicate the positions of corners of a floor of the space in reference to the fixed coordinate system. In still further embodiments, the application is configured to project a reference point on the screen into a ray in world coordinates and determine an intersection point with the one or more horizontal or vertical planes plane via hit-testing thus detecting the corners of the floor of the space; assemble the detected corners into a floorplan of the space; generate virtual quasi-infinite vertical planes extending from each corner of the detected corners representing virtual walls of the space; provide an AR interface allowing the user to indicate the positions of intersection points between the ceiling and the virtual walls; and truncate the virtual walls to reflect the ceiling height in the space. In some embodiments, the platforms, systems, media, and methods described herein include providing an AR interface allowing the user to indicate the positions of corners openings in the virtual walls. In such embodiments, the one or more horizontal or vertical planes, the floorplan, the virtual walls, the ceiling height, the openings in the virtual walls, and/or a 3D model constructed from any of the foregoing are added to the backing model to augment, supplement, and or improve the model.

Complex Wall Geometry

In some embodiments, the platforms, systems, media, and methods described herein include features allowing a user to augment, supplement, and or improve a backing model by capturing complex interior or exterior wall geometry. Often these walls can span multiple stories and physical measurements would be very challenging without specialty equipment and a team of people. Once a basic backing model is defined, a user optionally captures complex geometries of walls, e.g., walls in rooms with vaulted ceilings using custom UX constructs based on virtual planes and hit testing. An exemplary wall geometry capture process could proceed as follows: 1) calibrate the AR session and detect the ground plane, 2) set a baseline along the wall-ground boundary matching the horizontal extent of the wall, 3) place a virtual vertical plane suitable for hit testing, 4) create a rectangle from the baseline and raise it via hit testing against the vertical plane (optionally, edge points can be dragged up independently), wherein the resulting rectangular structure can span multiple stores conceptually without limit, 5) add points to the existing exterior segments as needed and adjust (raise/lower) the segments as needed for additional structure thereby capturing any pitches and gables or other non-rectangular geometries, and 6) optionally, add interior geometries to capture any doors or windows.

Figure 4:
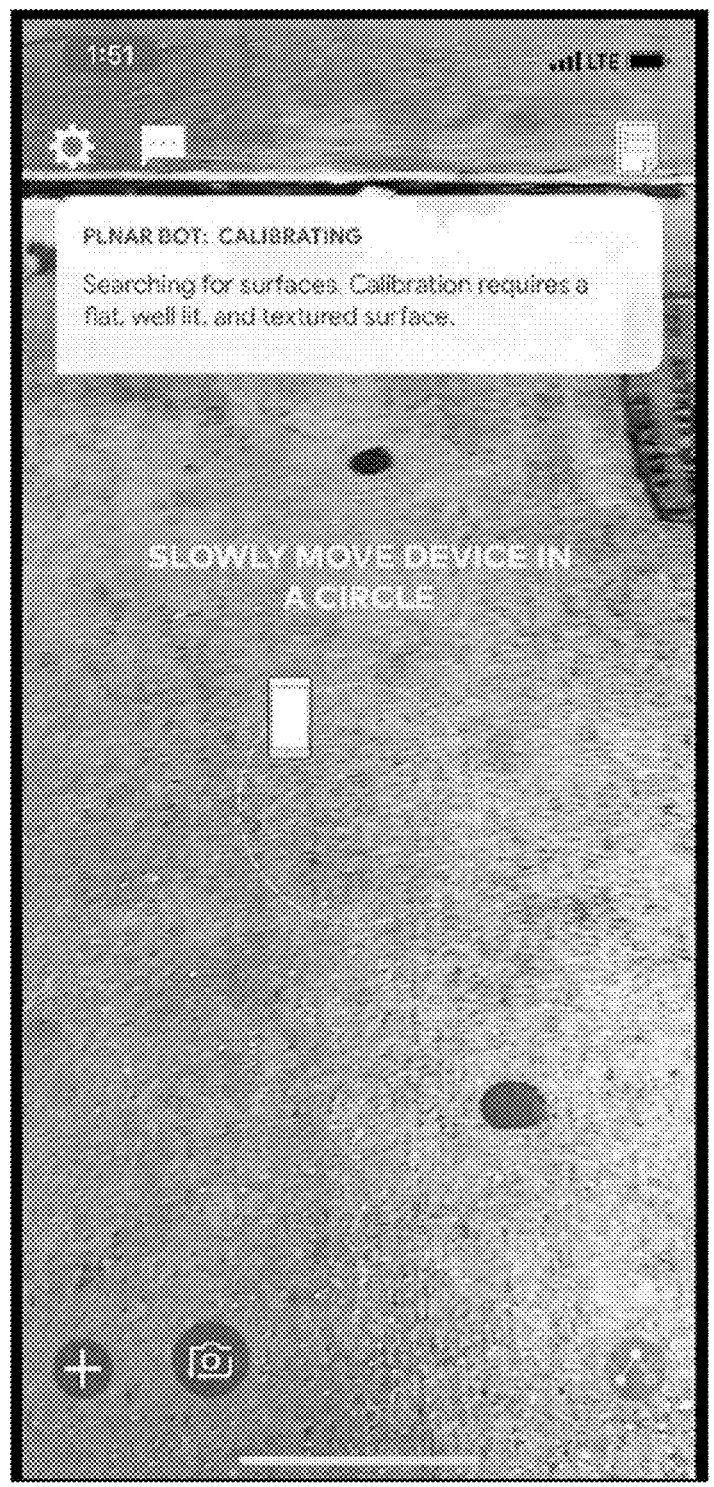
FIGS. 4-5 show non-limiting examples of a user interface for an AR application described herein; in this case, a user interface for calibrating an AR session.
Figure 5:
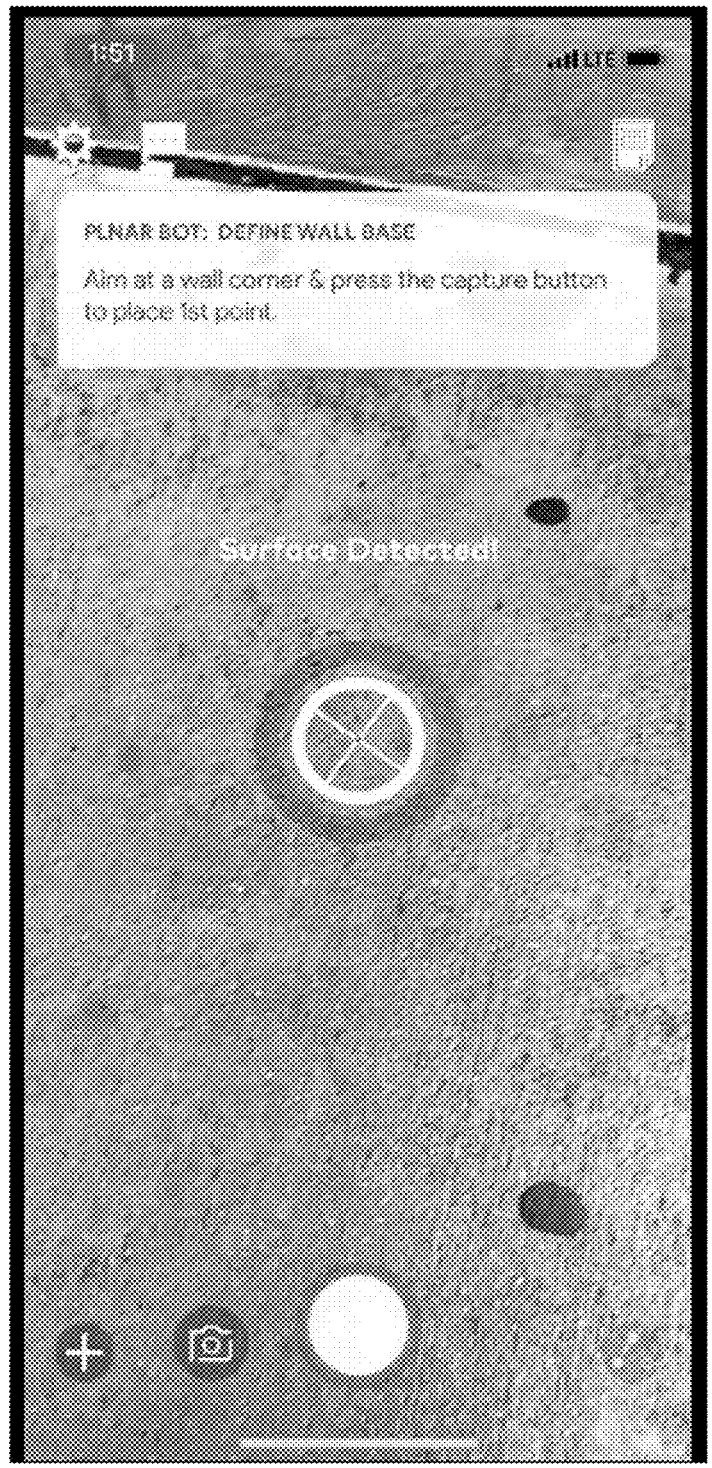
Figure 6:
FIGS. 6-10 show non-limiting examples of a user interface for an AR application described herein; in this case, a user interface for defining a wall base.
Figure 7:
Figure 8:
Figure 9:
Figure 10:
Figure 11:
FIGS. 11-14 show non-limiting examples of a user interface for an AR application described herein; in this case, a user interface for defining a wall height.
Figure 12:
Figure 13:
Figure 14:
Figure 15:
FIGS. 15-25 show non-limiting examples of a user interface for an AR application described herein; in this case, a user interface for defining a geometry of a top of a wall and the roof/ceiling interface.
Figure 16:
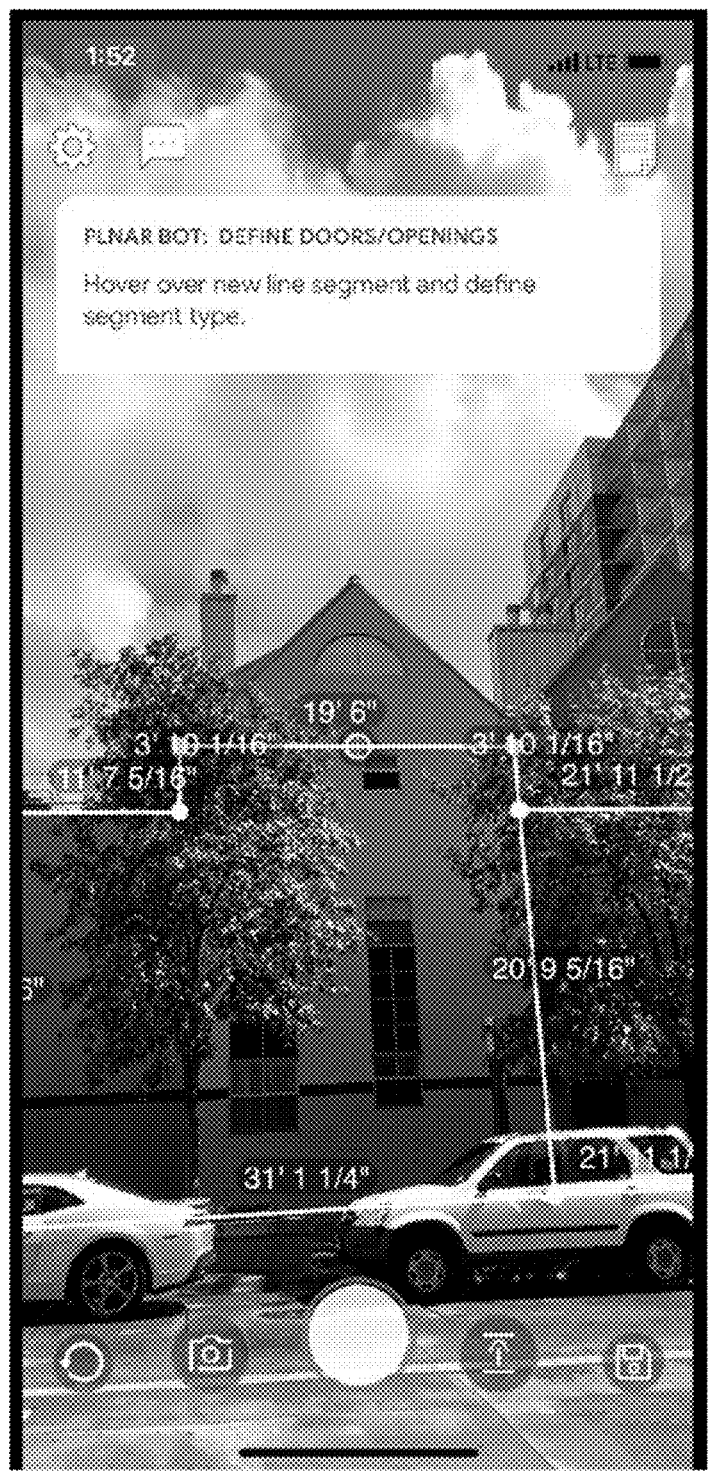
Figure 17:
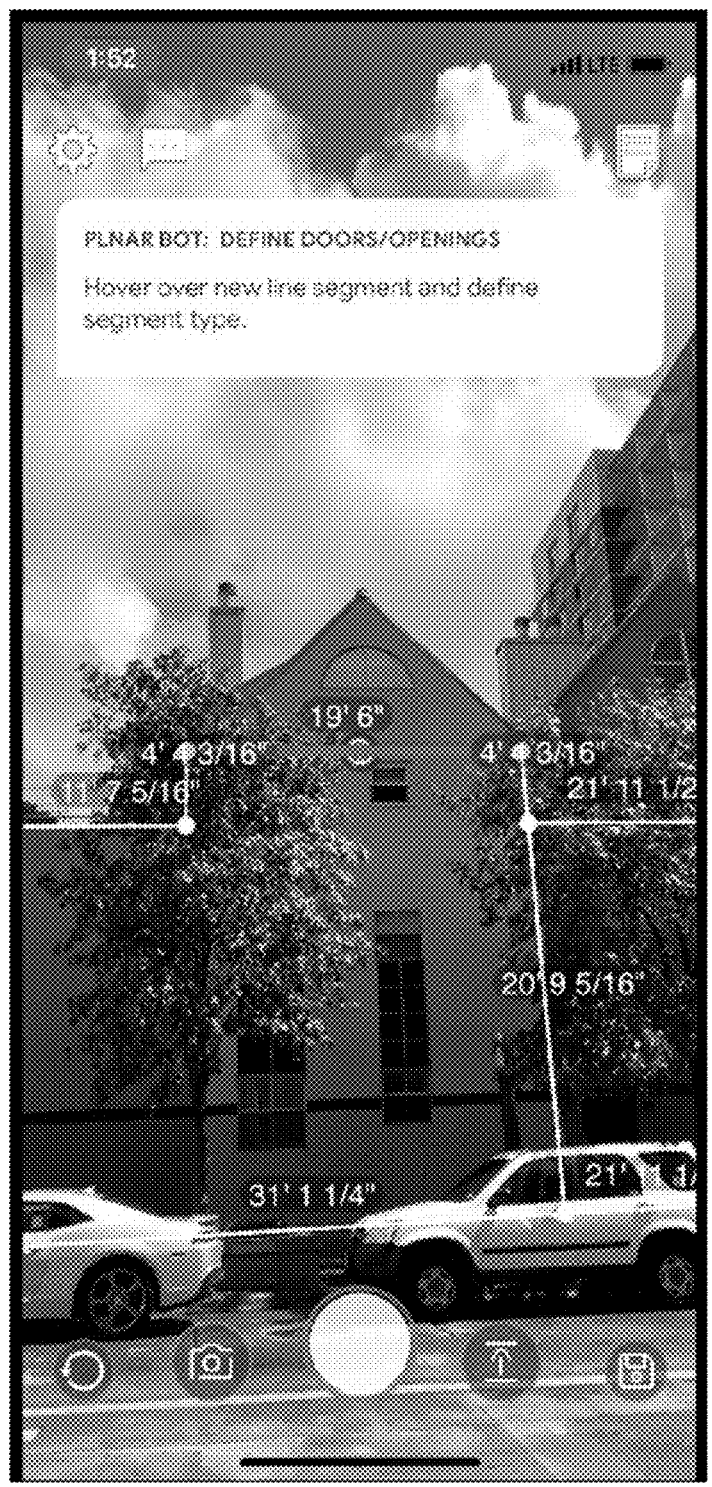
Figure 18:
Figure 19:
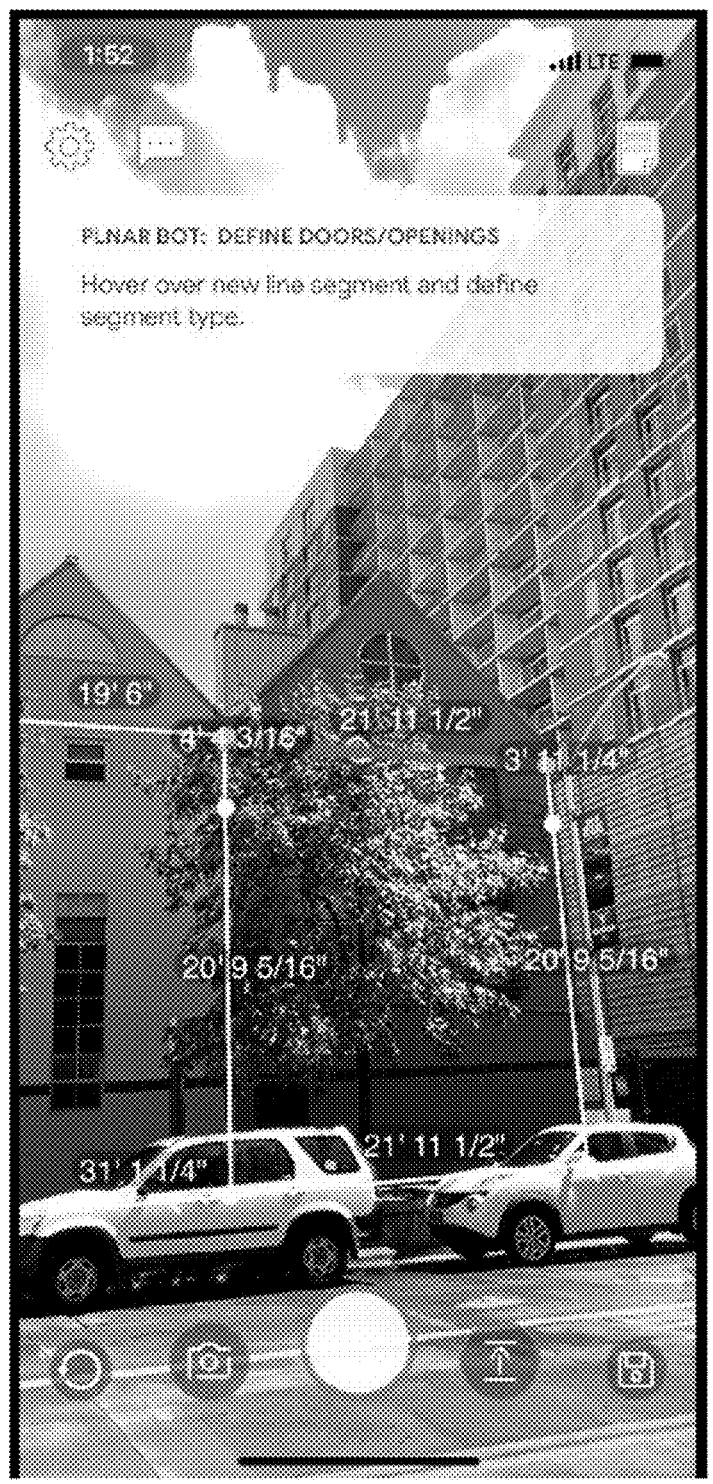
Figure 20:
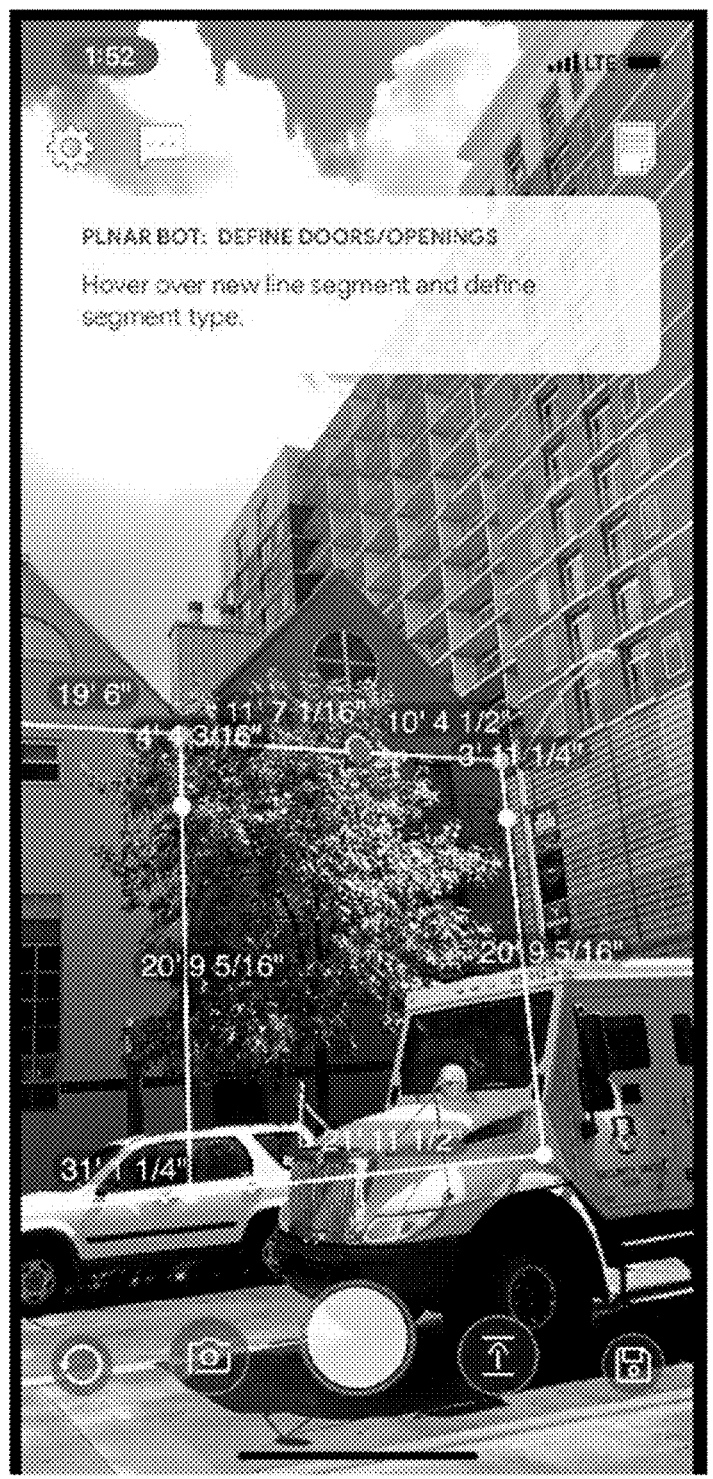
Figure 21:
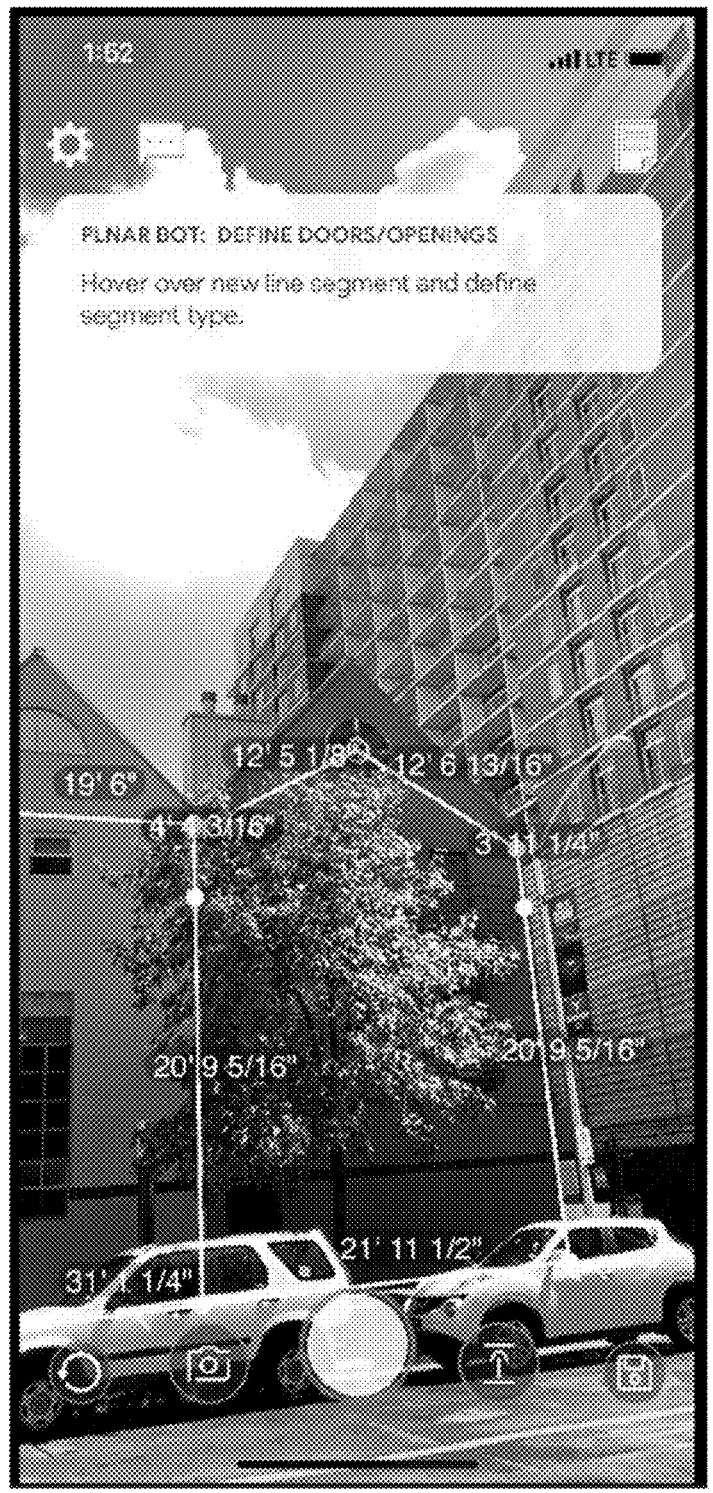
Figure 22:
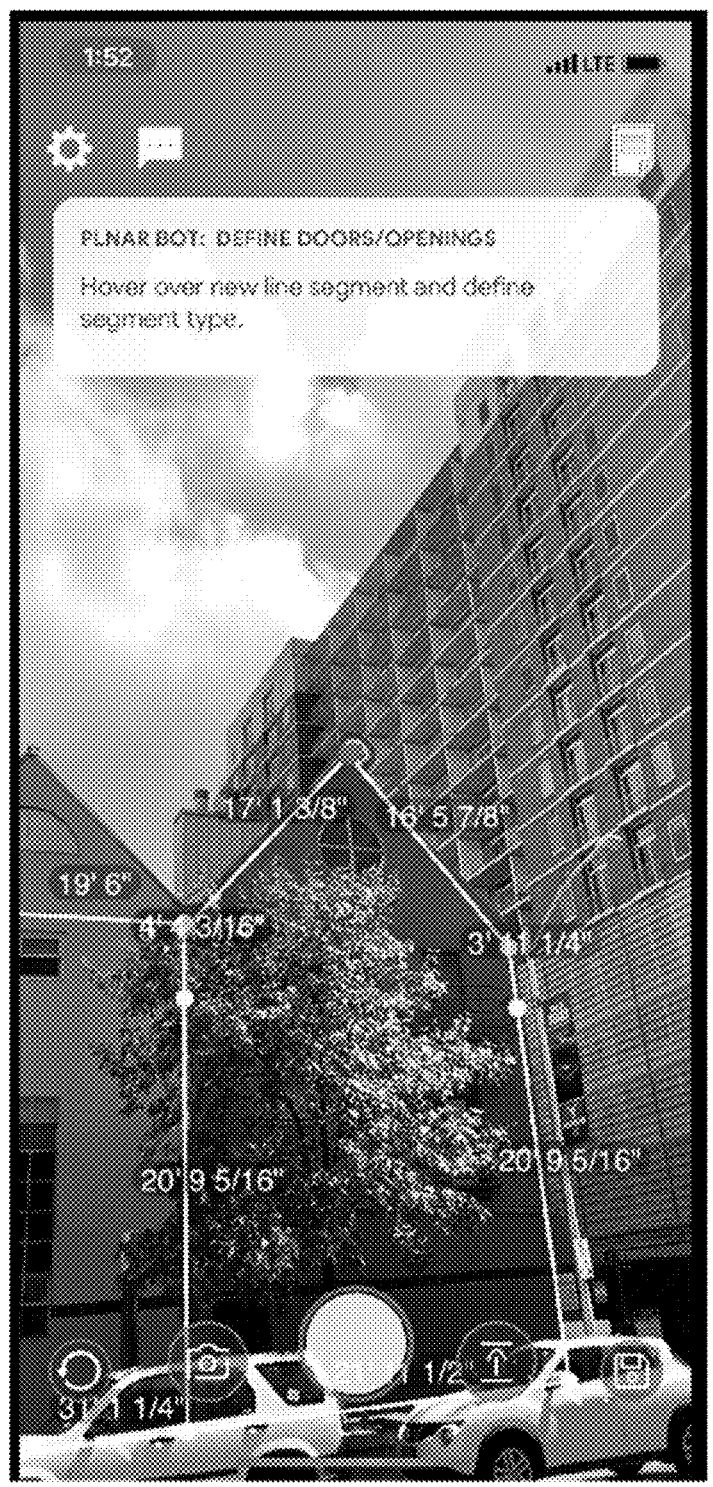
Figure 23:
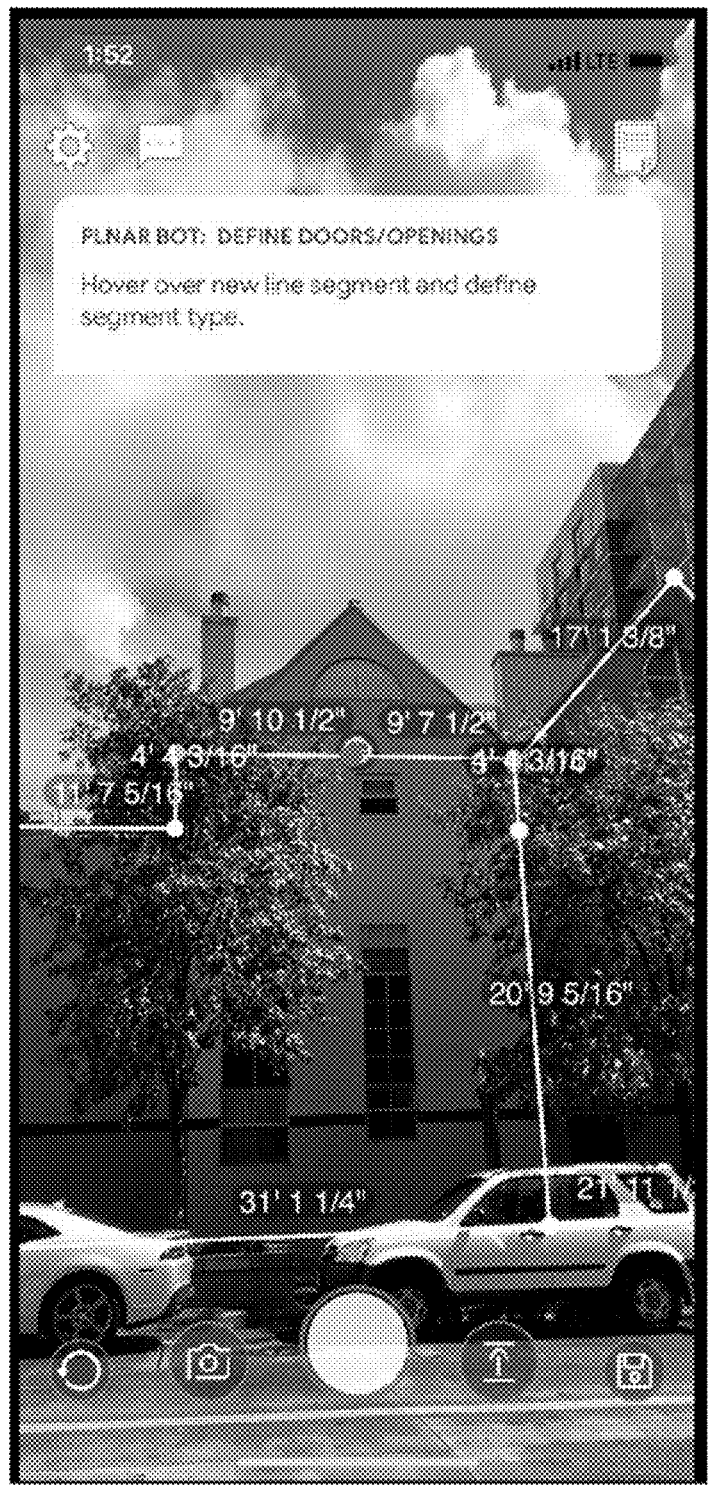
Figure 24:
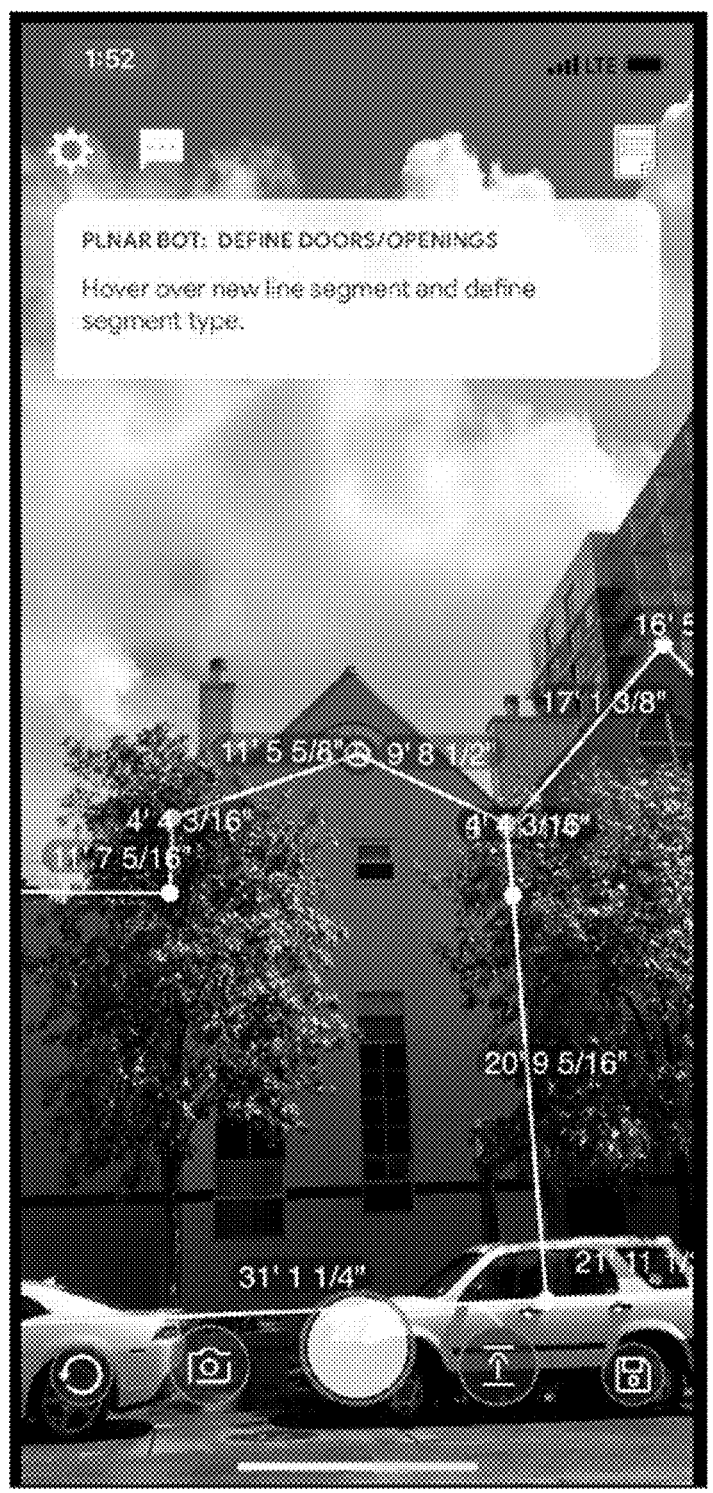
Figure 25:
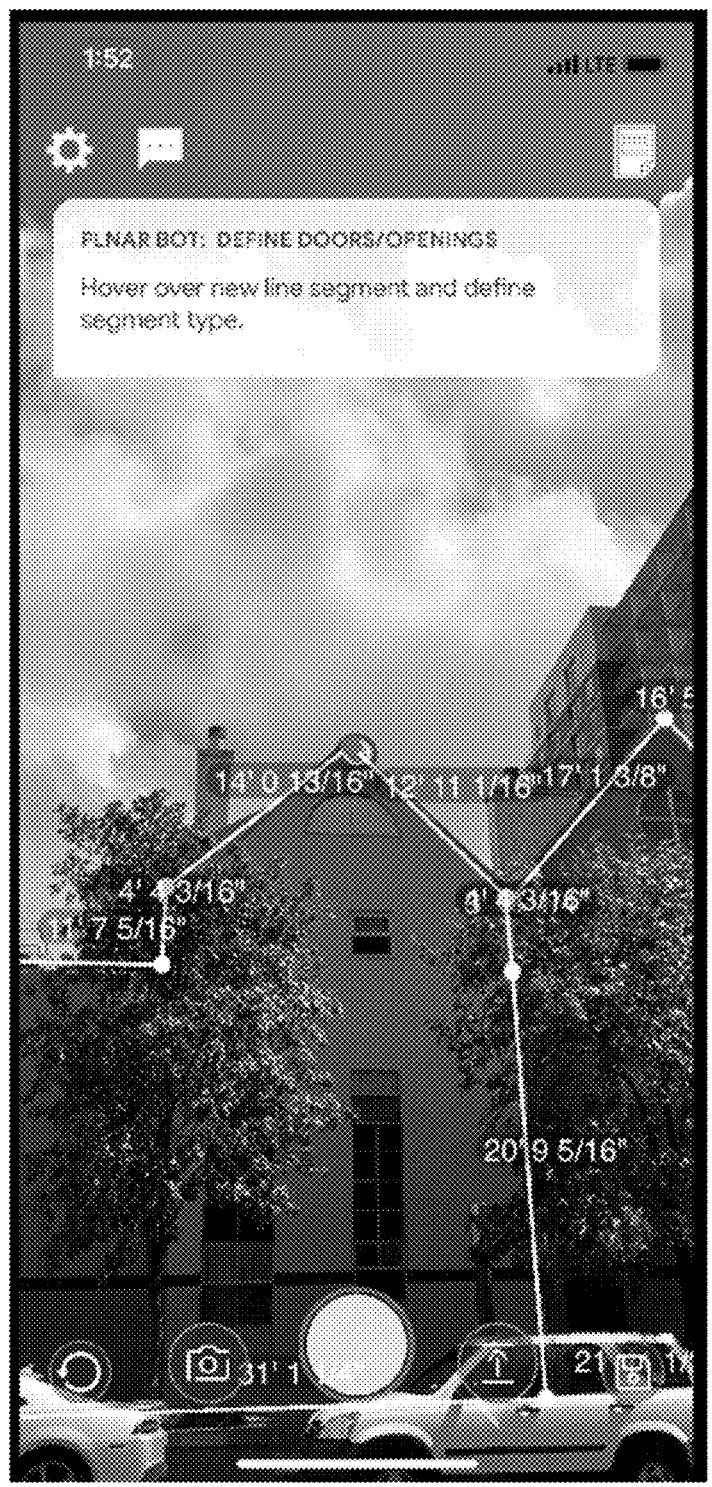
Figure 26:
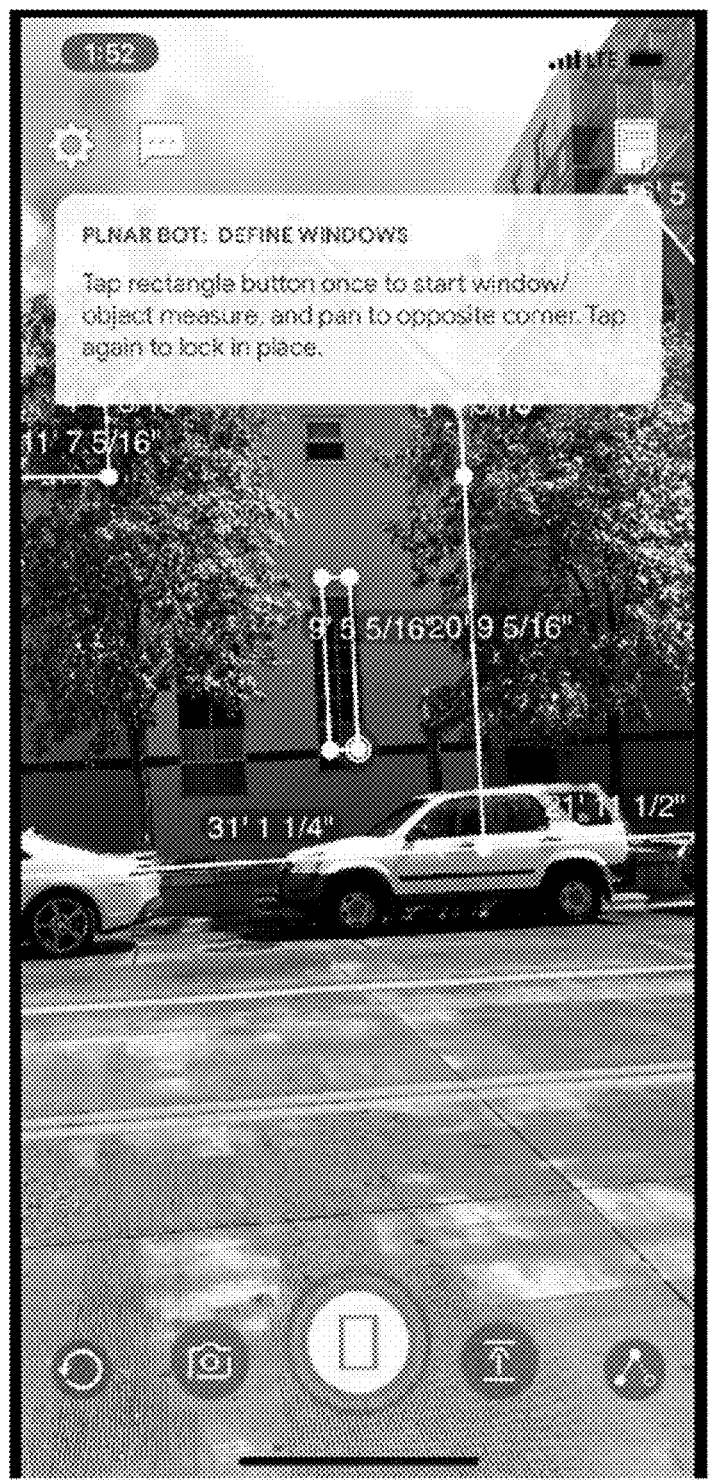
FIGS. 26-28 show non-limiting examples of a user interface for an AR application described herein; in this case, a user interface for defining openings in a wall of a space.
Figure 27:
Figure 28:
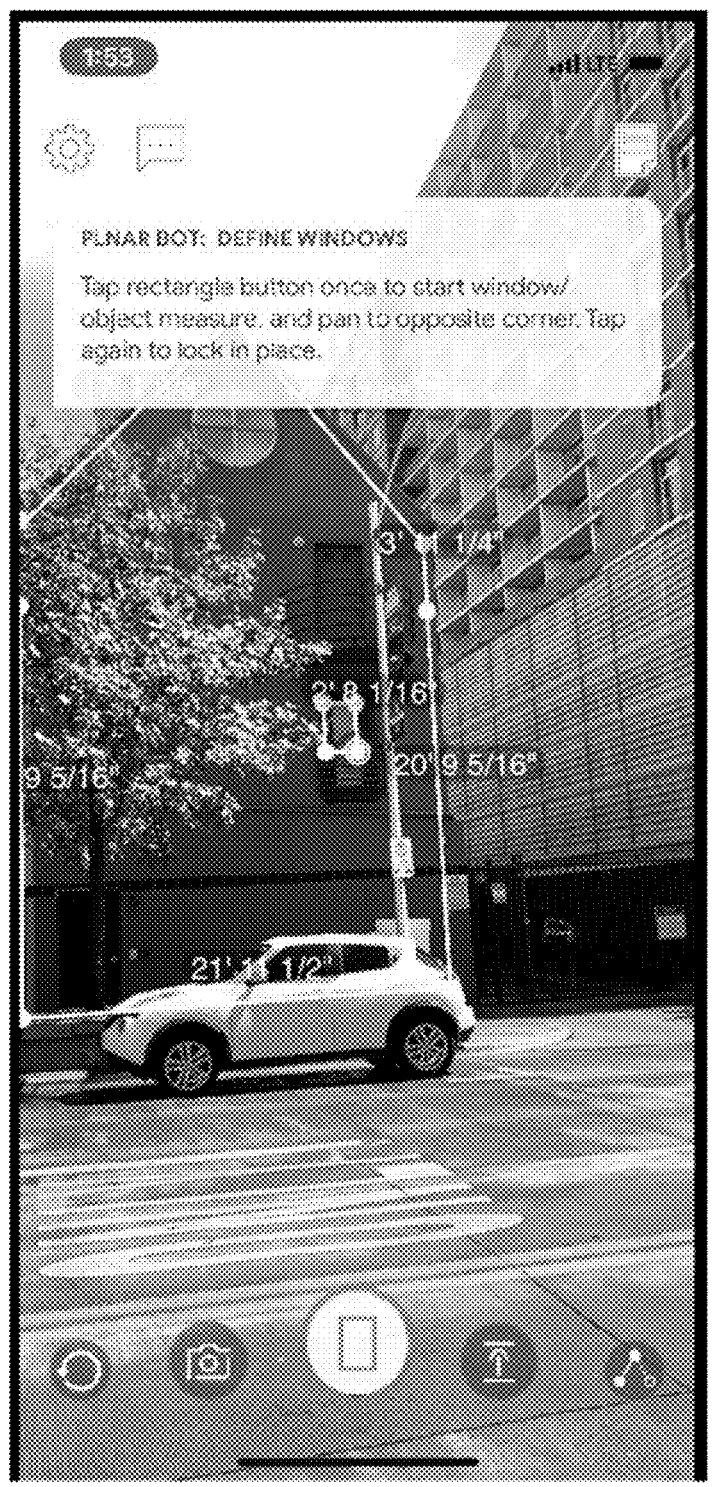

A non-limiting example is provided in FIGS. 4-28. Referring to FIG. 4, in a particular embodiment, a user is prompted to calibrate an AR session by aiming the camera of a device toward the floor of a space and slowly moving the device in a circular pattern parallel to the floor. Referring to FIG. 5, in this embodiment, the ground plane is detected and the user is further prompted to aim the camera of the device at a first wall corner of the space and tap a user interface element to capture the position of the first corner. Referring to FIG. 6, the user places a camera reticle on a first wall corner and taps a capture button. As shown in FIGS. 7-10, the user is prompted to pan to adjacent corners along the base of the wall and tap to capture each. Referring to FIG. 11, in this embodiment, the user is prompted to tap a user interface element to indicate the height of the wall and raise a virtual wall as shown in FIGS. 12-14. Further, as shown in FIGS. 15-19, the user is next prompted to define line segments to define the 3D geometry of the top of the wall where it intersects with the roof. Referring to FIGS. 20-22 and 23-25, in this embodiment, the user is enabled to add points to the line segments defining the top edge of the wall and then tap and drag the points to document peaks in the 3D geometry of the wall-roof interface. Finally, referring to FIGS. 26-28, in this embodiment, the user is prompted to indicate the positions of the corners of openings in the wall. In such embodiments, the geometry of the wall base, the geometry of the top edge of the wall, the geometry of the virtual wall, the openings in the virtual wall, and/or a 3D model constructed from any of the foregoing are added to the backing model to augment, supplement, and or improve the model.

Complex Ceiling Geometry

In some embodiments, the platforms, systems, media, and methods described herein include features allowing a user to augment, supplement, and or improve a backing model by capturing complex ceiling geometries (e.g., vaults, single pitch, multi-pitch, etc.) which can be conceptually and physically demanding to capture. Once a basic backing model is defined, a user optionally captures the complex geometry of, e.g., vaulted ceilings using custom UX constructs based on virtual planes and hit testing. An exemplary ceiling geometry capture process could proceed as follows: 1) placing an Interior ceiling segment using point placements over existing exterior segments, 2) adjusting the horizontal placement of the segment for better alignment to the ceiling feature, 3) creating a virtual vertical plane through the added segment aligned to gravity, 4) raising the segment vertically until it aligns with a ceiling vault seam, 5) using the provided UI controls to adjust the vault placement horizontally and vertically as needed. For more complex ceiling structures additional vaults can be added by repeating the steps above as needed. When the wireframe structure is complete, at the point of model reconstruction, an optional step would be to perform a geometric analysis of the ceiling structure to convert the wireframe into a mesh topology for rendering.

Rectangle Mode

In some embodiments, the platforms, systems, media, and methods described herein include features allowing a user to augment, supplement, and or improve a backing model by starting an AR session (tracking+floor plane detection) and applying corner points at each corner of a space or object in a space to capture the geometry of the space and/or object. In some cases, all the corners may not be visible, which can cause problems with accurate placement. In some cases, AR tracking can become unstable leading to accumulated drift as the capture session proceeds. When the first and last points in the measured geometry are connected, this drift often leads to odd geometric artifacts which do not represent the actual boundaries of the space or object. Finally, invariably when free drawing in a AR session, the combination of accumulated drift, and lack of user care in point placement, leads to contours which do not fall on rectilinear (e.g., 90 degrees and/or 45 degrees) boundaries which leads to a poor representation of the actual geometric angles. To solve these issues, and to afford users a potentially faster method for acquiring floorplan geometries, a new capture flow using a rectangular starting geometry, and subsequent segment definition and movement, is provided herein.

For more accurate and geometrically representative definition, a segment-based capture process, for, e.g., a floorplan, a space, and object, etc., is provided. In the exemplary embodiment of a floorplan of a space, after AR calibration, the flow begins by defining a baseline between two points encompassing a reference wall in a room. Once the baseline is defined, a rectangle is established from the baseline and subsequently defined by the user by dragging one of the rectangle segments to an opposing wall. The result is an inner rectangle that can completely, for rectangular rooms, or partially, for odd shaped rooms, define the floor. For rectangular rooms the flow would be complete at this point. For oddly shaped rooms with inserts, alcoves, protrusions, etc., points can be added to the existing segments and these new segments can be dragged perpendicularly to align with these detailed structures. The user can proceed in this manner until all the fine structure is adequately captured and the floorplan is complete. The advantages of this method are a faster capture process, maintenance of rectilinear (e.g., 90 degrees) corners resulting in a better aesthetic model, and significantly improved accuracy due reduced drift achieved by keeping the AR session focused away from floor-wall seams.

Figure 29:
FIGS. 29-30 show non-limiting examples of an additional user interface for an AR application described herein; in this case, a user interface for calibrating an AR session.
Figure 30:
Figure 31:
FIGS. 31-41 show non-limiting examples of a user interface for an AR application described herein; in this case, a user interface for defining a floor perimeter using a rectangle mode and point adding/editing features.
Figure 32:
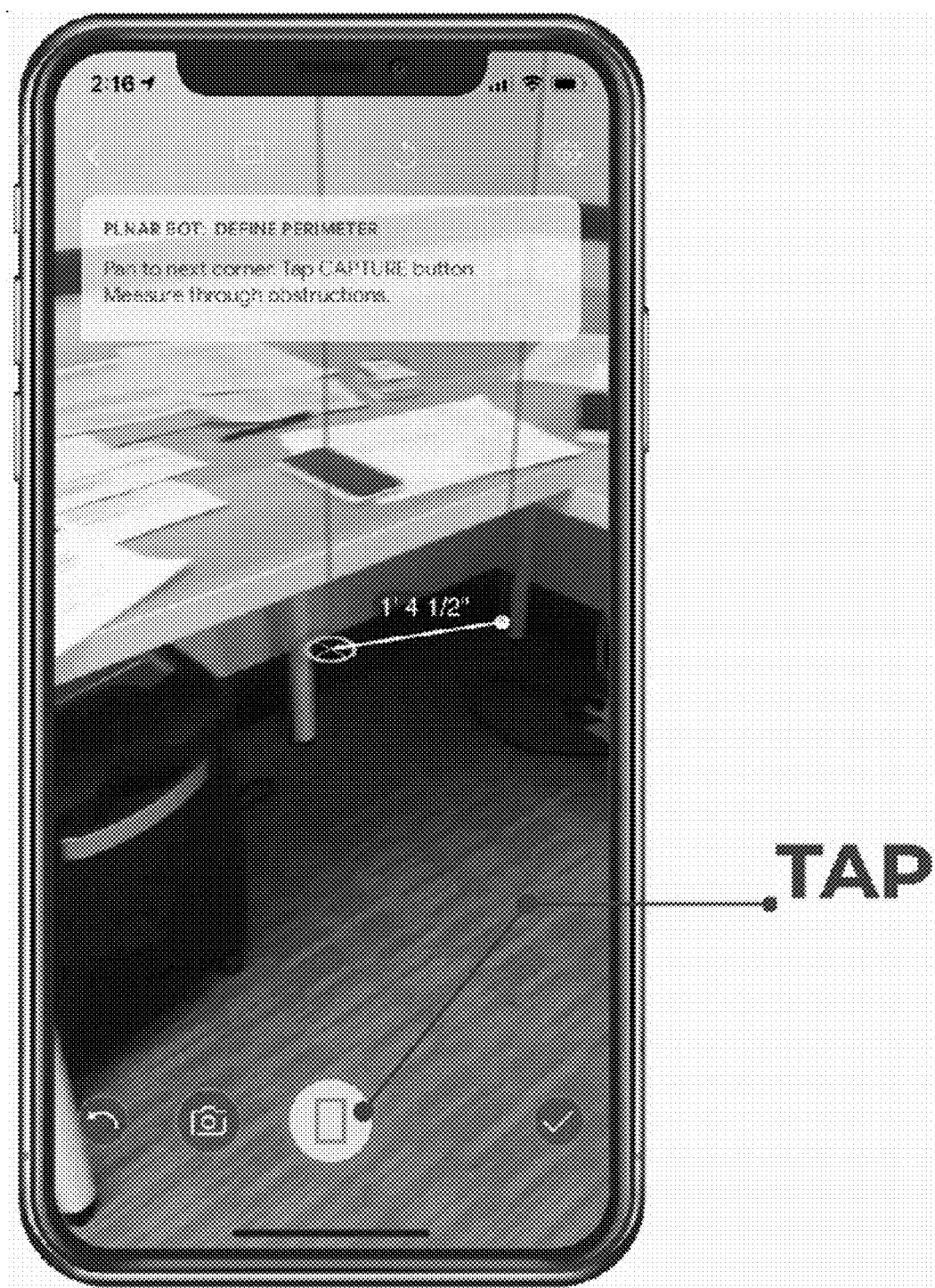
Figure 33:
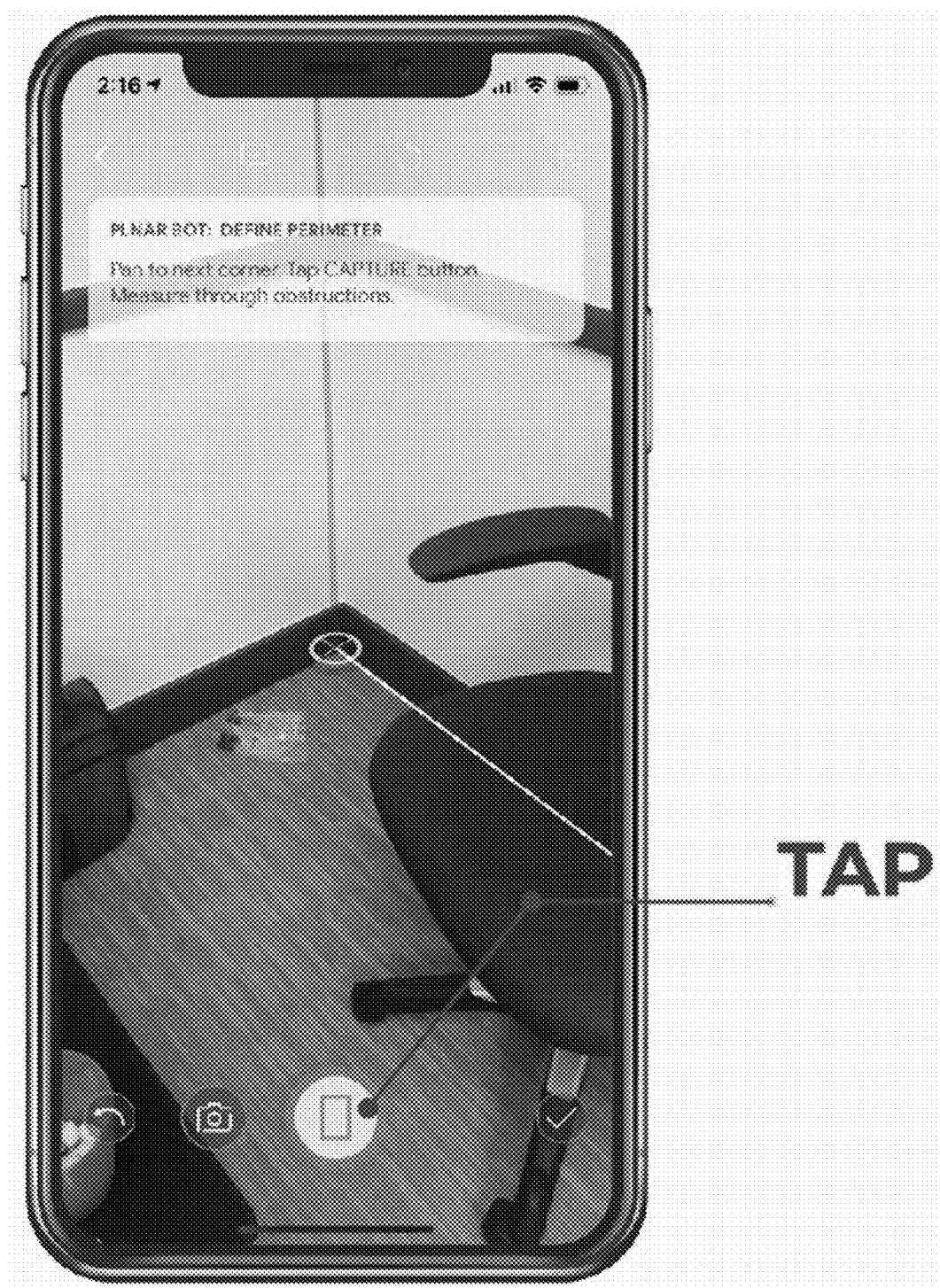
Figure 34:
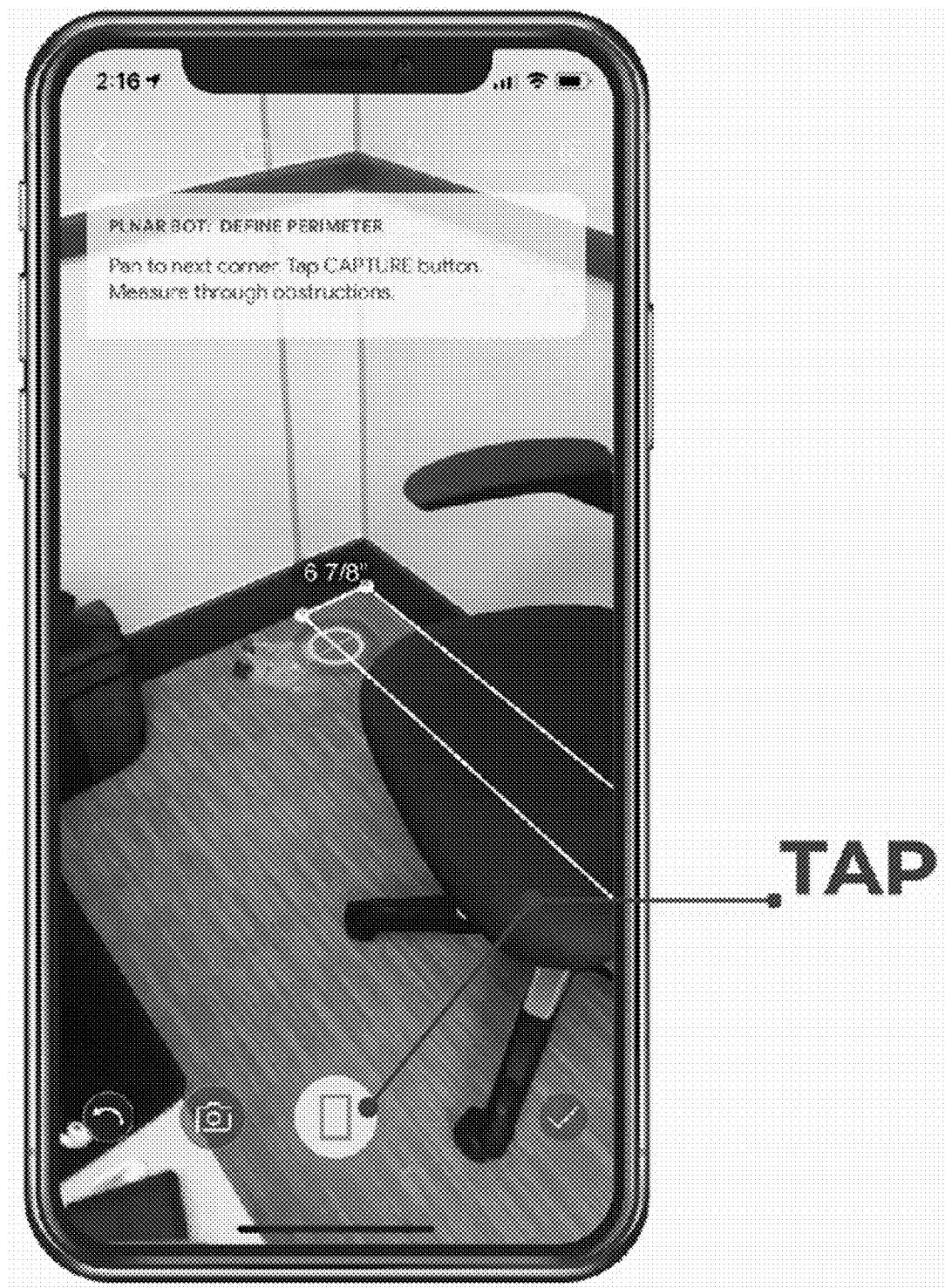
Figure 35:

A non-limiting example is provided in FIGS. 29-35. Referring to FIG. 29, in a particular embodiment, a user is prompted to calibrate an AR session by aiming the camera of a device toward the floor of a space and slowly moving the device in a circular pattern parallel to the floor. Referring to FIG. 30, in this embodiment, the ground plane is detected and the user is further prompted to aim the camera of the device at a first floor corner of the space and tap a user interface element to capture the position of the first corner. Referring to FIG. 31, the user places a camera reticle on a first floor corner and taps a capture button. As shown in FIGS. 32 and 33, the user is prompted to pan to adjacent corners around the perimeter of the floor and tap to capture each. Referring to FIGS. 34 and 35, further in this embodiment, a rectangle is established from this baseline and subsequently defined by the user by dragging one of the rectangle segments to an opposing wall to further develop a floorplan of the space.

Point Editing

In some embodiments, the platforms, systems, media, and methods disclosed herein enable a user to edit points, corners, and/or segments of objects in the backing model. In some embodiments, editing invoices adding, removing, or moving a point, corner, and/or segment. In some embodiments, the platforms, systems, media, and methods disclosed herein allow the user to make corrections, via point editing, to the backing model based on measurements taken in the at least one photo. In some embodiments, an editable point falls on a corner of an object in the backing model. In other embodiments, an editable point falls on a segment of an object in the backing model. In some embodiments, a segment is the distance between the positions corners in the backing model, or the distance between points between the positions of corners in the backing model, indicated by the user. In some embodiments, a segment is represented by a measured line viewable by the user.

One of the advantages of editing points, corners, and/or segments includes an improvement in accuracy of the backing model. In addition, the user is able to measure small adjacent areas within the space, and/or measure behind objects within the space, thereby improving accuracy of the measurements. In some embodiments, the user edits points, corners, and/or segments of objects in the backing model by touching, tapping, clicking, etc., on the point, corner, and/or segment to activate the position. In such embodiments, once activated, the point, corner, and/or segment may be removed or the position of the point, corner, and/or segment may be moved. In some embodiments, the user adds points, corners, and/or segments to objects in the backing model by touching, tapping, clicking, etc., on the existing object or segment.

In further embodiments, the user edits the activated point, corner, and/or segment using voice commands.

Figure 36:
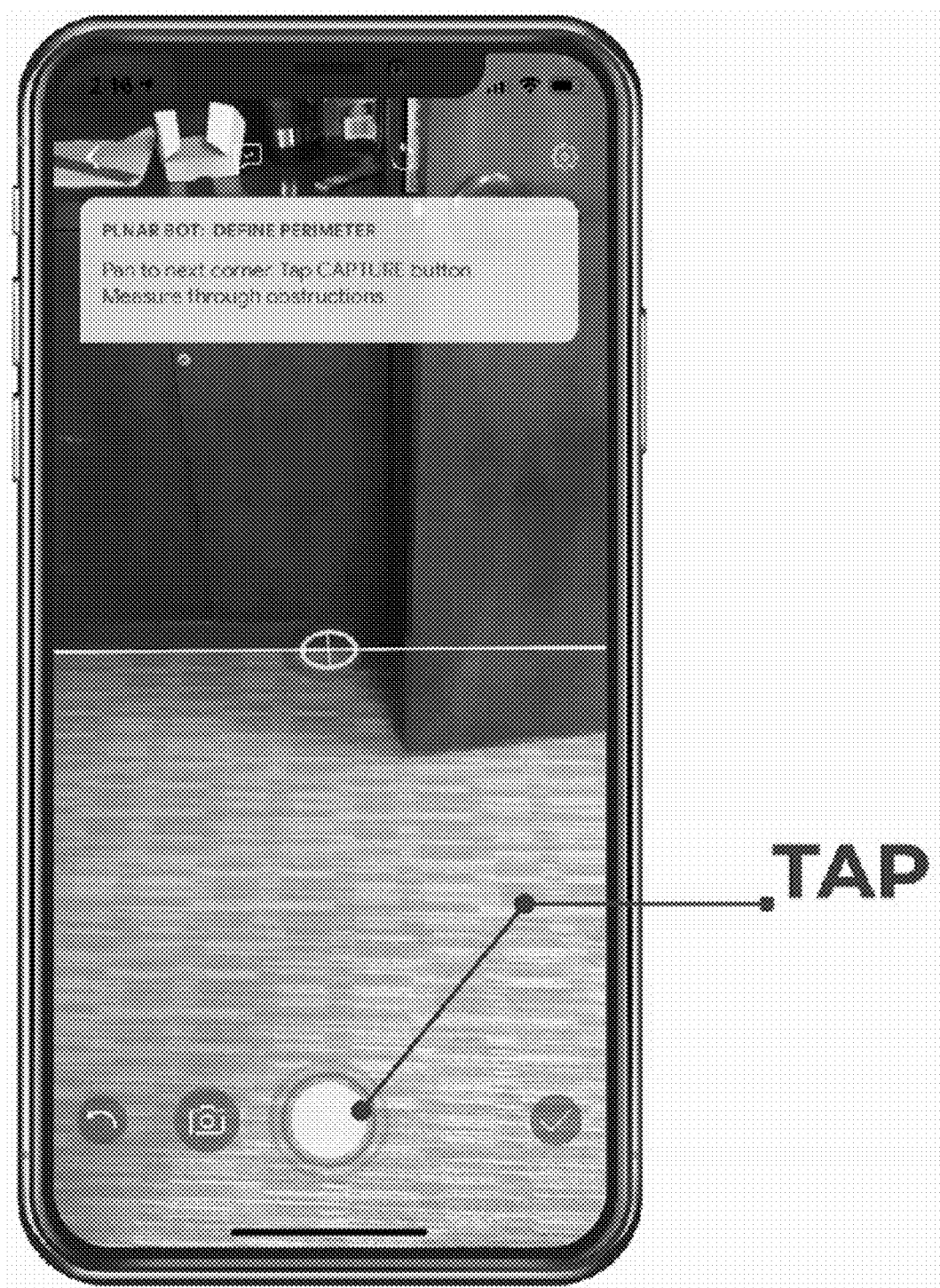
Figure 37:
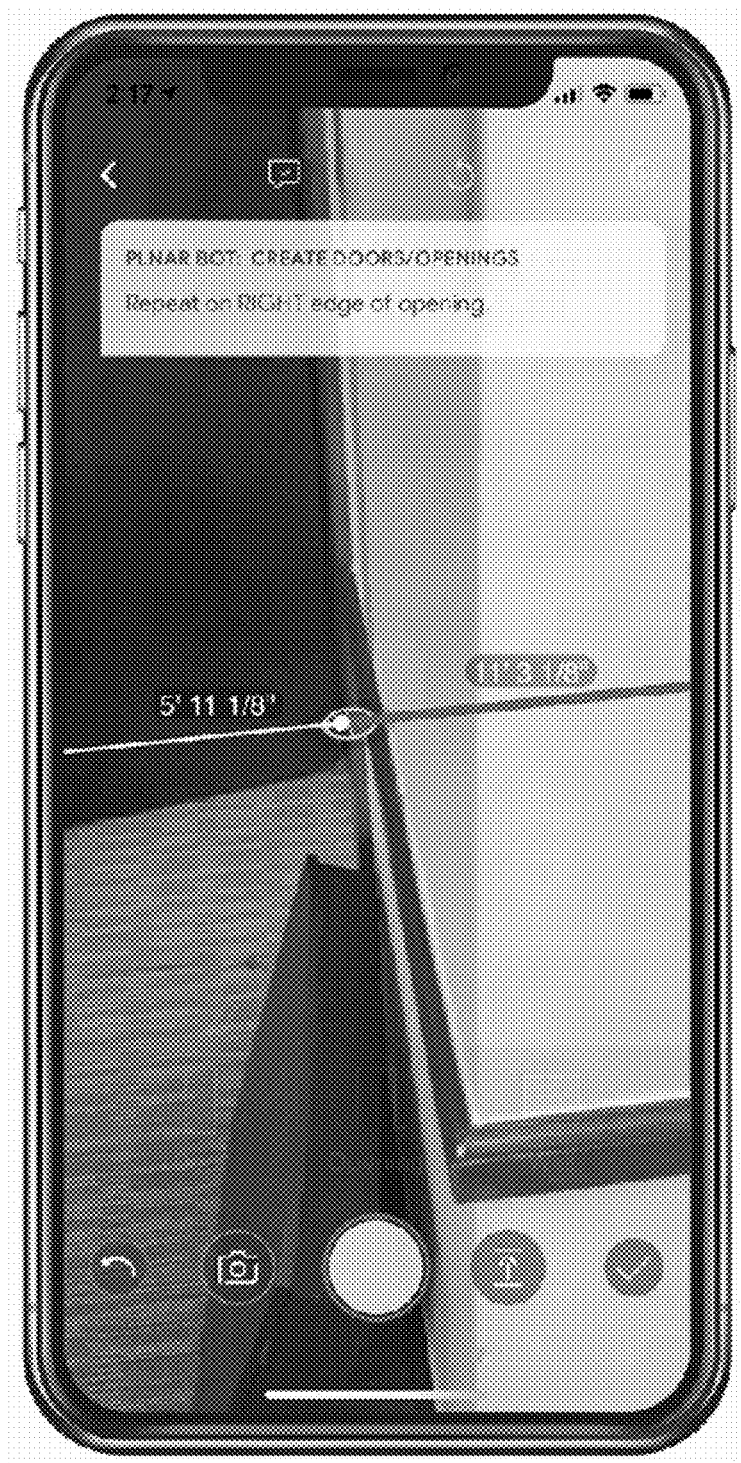
Figure 38:
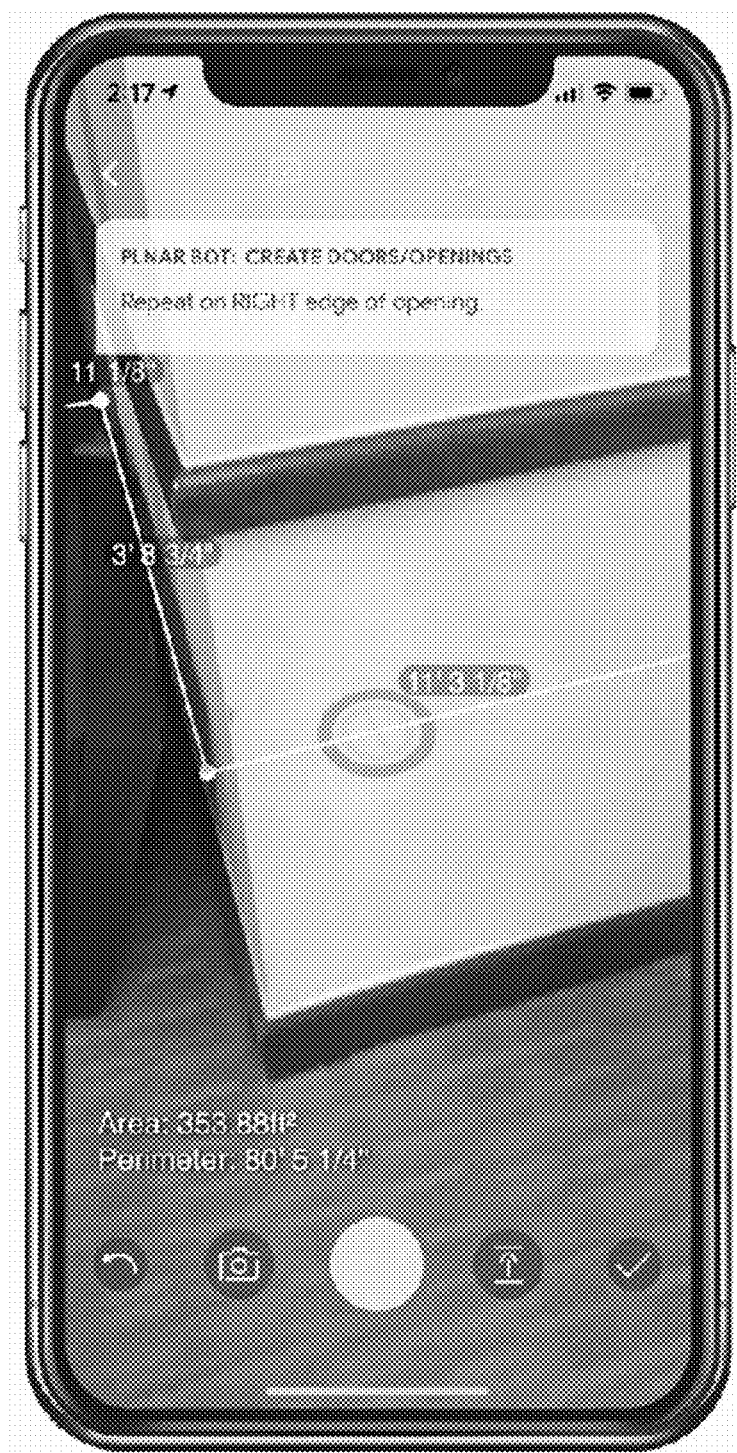
Figure 39:
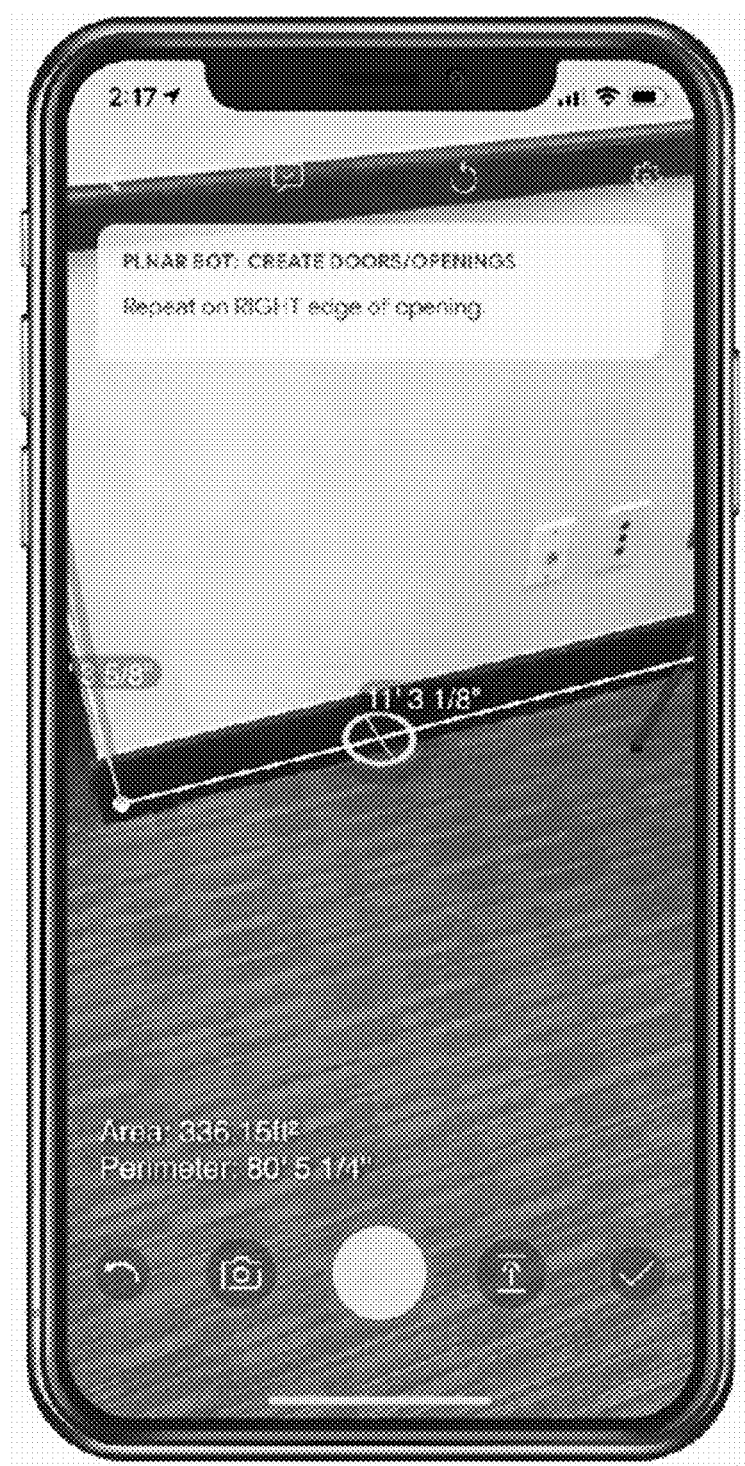

A non-limiting example is provided in FIGS. 36-39. Referring to FIG. 36, in a particular embodiment, a user aims a reticle of a camera at a line segment of an AR floorplan. As shown in FIG. 37, the user taps to add a point to the line segment of the floor perimeter. As shown in FIGS. 38 and 39, the user can tap and drag to move the new point and adjust the line of the floorplan to match a jog in the floor perimeter.

Figure 40:
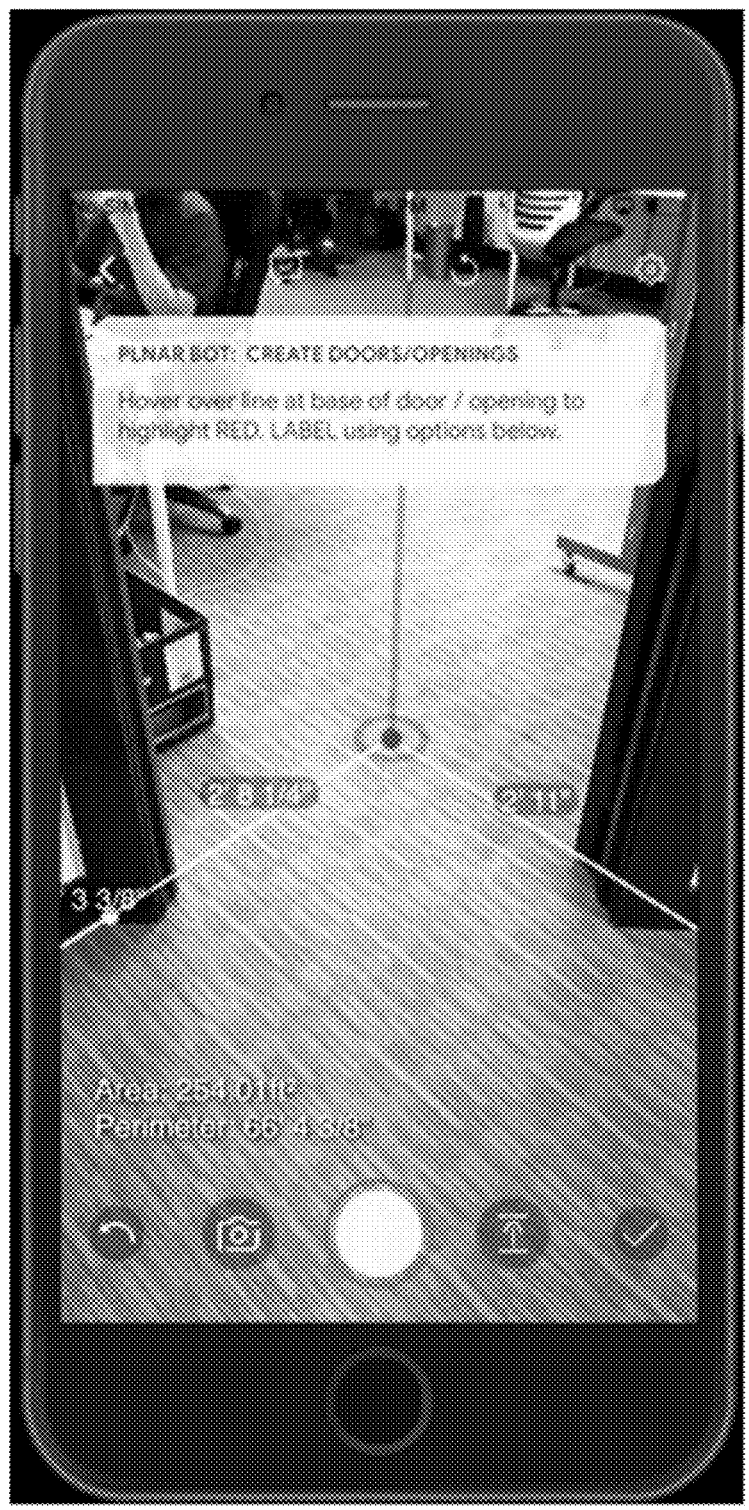
Figure 41:
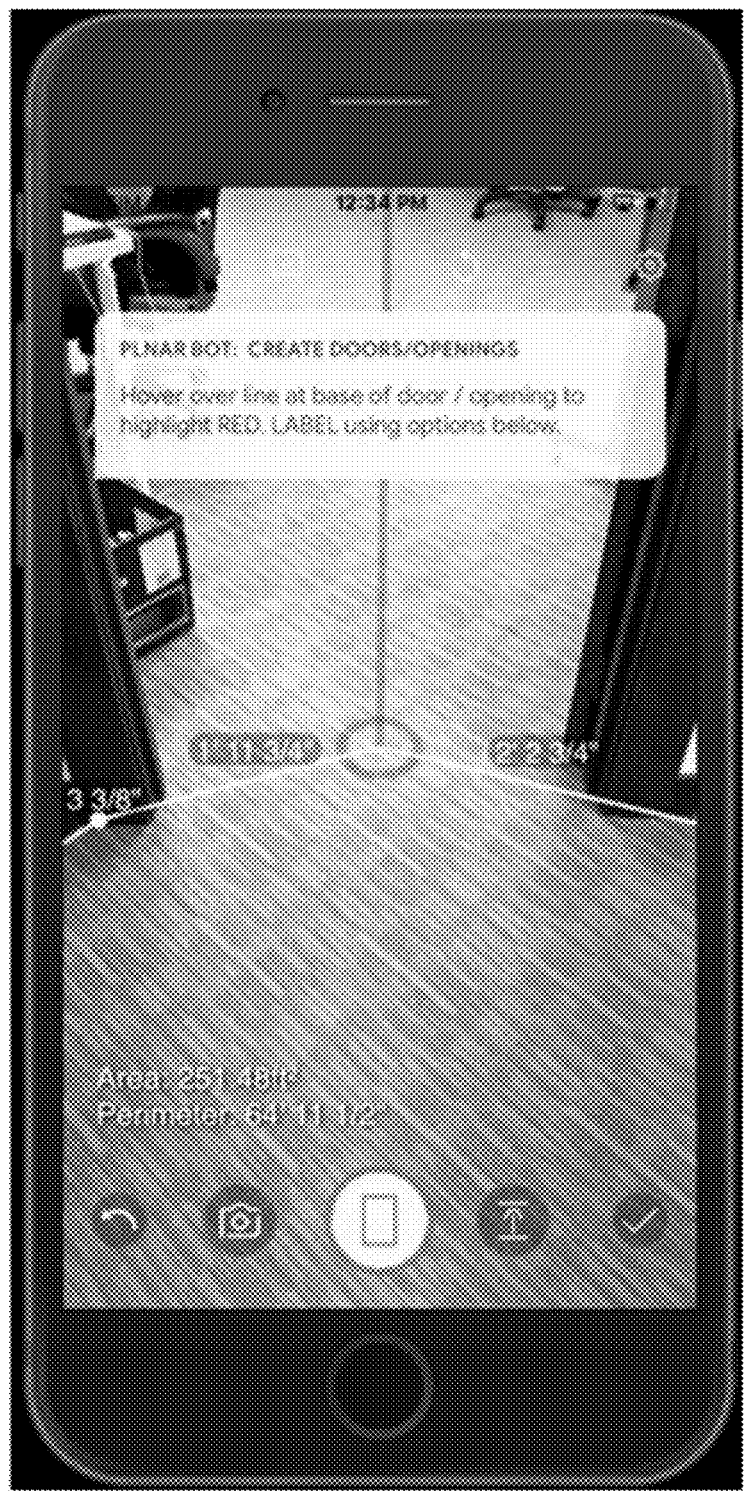

A further non-limiting example is provided in FIGS. 40 and 41. Referring to FIG. 40, in a particular embodiment, a user selects a point previously created by moving a corner of a rectangle established to aid generation of a floorplan. As shown in FIG. 41, the user can tap and drag the selected point to adjust the floorplan to match an opening in the floor perimeter.

A non-limiting example also allows the floorplan to be globally edited by enforcing all angles to fit between a particular set (e.g., by rectifying the angles). In a particular embodiment, the floorplan is rectified by enforcing all interior angles to map into, for example, 0 degree, 45 degree, 90 degree, 135 degree, or 180 degree values. This corrects for minor imperfections in corner placement and produces a more accurate floorplan.

Another non-limiting example also allows the virtual floor-plane height to be adjusted which improves the floorplan scale relative to the real measurements. Users optionally adjust the virtual floor-plane up or down to force the calculated floorplan and resulting 3D model to match the size and aspect ratio of known objects in the scene. This corrects for variations in accuracy produced by the underlying augmented reality system at the time of capture.

Camera Data

In some embodiments, the platforms, systems, media, and methods described herein utilize camera data. In further embodiments, camera data is associated with one or more photos of a space taken by a user. In some embodiments, the platforms, systems, media, and methods described herein are configured to launch and calibrate an active AR session by receiving a position and orientation of a camera used in the active AR session in reference to the fixed coordinate system. In some embodiments, the platforms, systems, media, and methods described herein are configured to construct a backing model comprising the fixed coordinate system and the position and orientation of the camera in reference to the fixed coordinate system. In some embodiments, the platforms, systems, media, and methods described herein are configured to extract camera data from the AR session for the at least one photo captured with the camera during the active AR session. In further embodiments, the platforms, systems, media, and methods described herein store the camera data in association with the at least one photo.

In some embodiments, camera data for one or more photos is accessed and used to build a conversion pipeline to convert screen coordinates identified by a user to world coordinates.

In some embodiments, a backing model described herein comprises, by way of non-limiting examples, camera position, view frame, view port, view scale factor, view angle, view matrix, projection matrix, and the like.

Storing Data

In some embodiments, the platforms, systems, media, and methods described herein store data in association with one or more photos of a space taken during an active AR session. In some embodiments, the data stored in association with the one or more photos includes camera data described herein. In some embodiments, the data stored in association with the one or more photos includes backing model data described herein. In some embodiments, the data stored in association with the one or more photos includes measurements and/or annotations described herein.

In some embodiments, the data is stored in a structured or semi-structured format, such as JSON or XML. In some embodiments, the data is stored as metadata of the photo files (image files). Many image file formats are suitable, including, by way of non-limiting examples, JPEG, JPEG 2000, TIFF, PNG, GIF, WebP, BAT, BPG, PPM, PGM, PBM, or PNM. Uncompressed image files are suitable as are image files with varying degrees of compression. In some embodiments, the photos are stored in a format supporting metadata fields, including by way of non-limiting examples, the EXIF, EFIC, IPTC, and/or XMP metadata formats, and the data is stored as metadata of the photo files. In further embodiments, the photos are stored in a format supporting Exchangeable Image File format (EXIF), such as JPEG or TIFF, and the data is stored as EXIF data of the photo files. In such embodiments, the data and photo are packaged together and are transmissible as a package or unit, which is later separable. In some embodiments, the data is stored separately from the one or more photos, for example in a database and/or sidecar file, and associated with the one or more photos by a token, a key, a link, or other identifier.

Interactive Model

In some embodiments, the platforms, systems, media, and methods described herein extract camera data and a backing model data from an active AR session for at least one photo captured during the active AR session. In further embodiments, the platforms, systems, media, and methods described herein store the data in association with the at least one photo. In still further embodiments, the at least one photo and the associated data provide content and information, which when extracted by a viewer application, provide an interactive smart picture allowing a user to make measurements in world coordinates by identifying points and line segments on the screen.

In some embodiments, the platforms, systems, media, and methods described herein provide a user interface allowing the user to view at least one photo captured during an active AR session, identify screen coordinates on the at least one photo to measure a feature of the space, access camera data and backing model data for the at least one photo, and build a conversion pipeline, using the camera data, to convert the screen coordinates to world coordinates using ray-casting. In further embodiments, the conversion pipeline operates by using the screen coordinates to project a camera ray in world coordinates; evaluating the ray for intersections with objects in the backing model; and returning any intersections as the world coordinates corresponding to the screen coordinates. In still further embodiments, the platforms, systems, media, and methods described herein convert the identified world coordinates to one or more lengths, one or more areas, or one or more volumes in the space; allow the user to annotate the at least one photo with the one or more lengths, one or more areas, or one or more volumes; and store the measurements and annotations in association with the at least one photo. In some embodiments, a viewer application is integrated with a capture application. In other embodiments, the viewer application and the capture application are separate applications.

Figure 42:
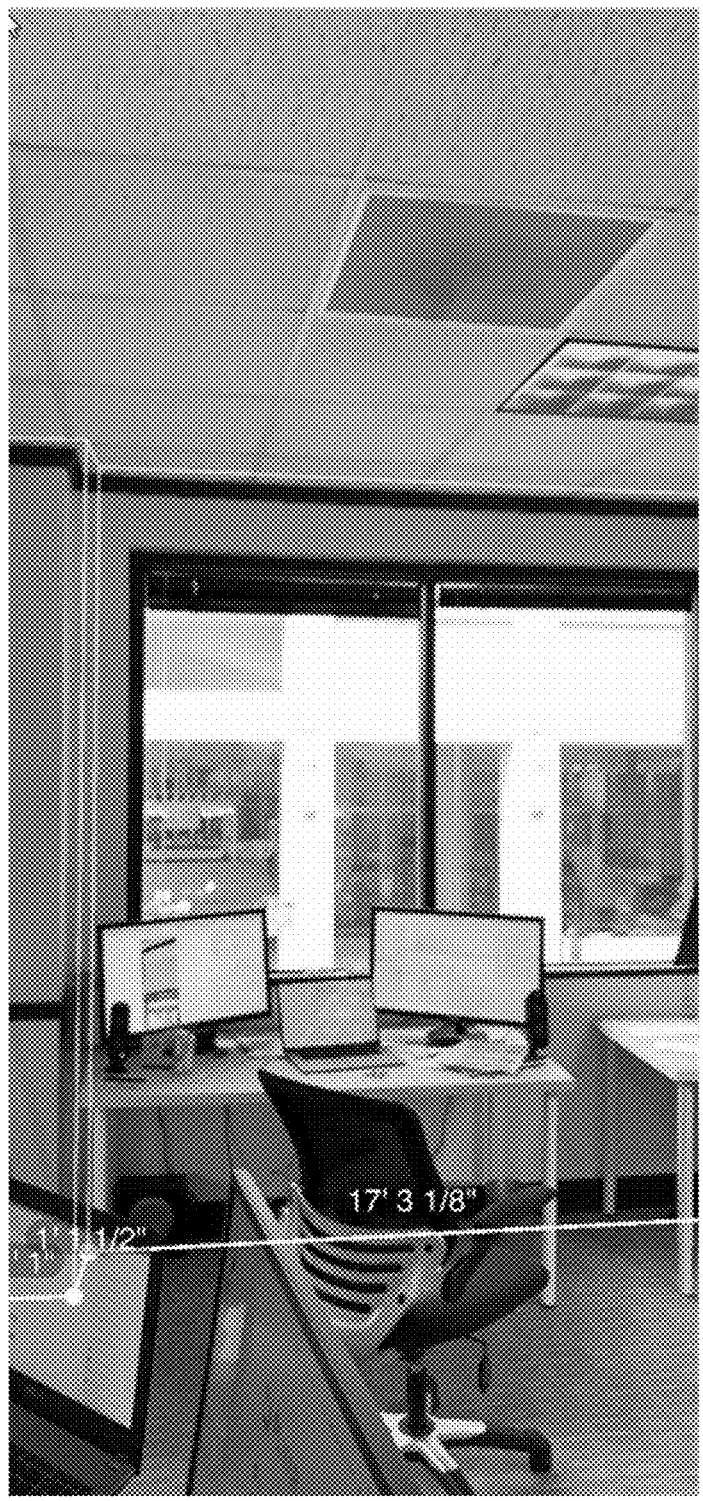
FIGS. 42-46 show non-limiting examples of a user interface for an AR application described herein; in this case, a user interface providing an interactive model of a space (e.g., a smart picture) for making measurements in real world coordinates and, optionally, making annotations.
Figure 43:
Figure 44:
Figure 45:
Figure 46:

A non-limiting example is provided in FIGS. 42-46, which show non-limiting examples of an interactive model of a space (e.g., a smart picture) for making measurements in real world coordinates, merely by selecting points on the screen, as well as for making annotations. Referring to FIG. 42, in a particular embodiment, a photo taken by a user during an active AR session is overlaid with a 3D model showing the floor perimeter and walls, which are annotated with real world measurements. In this embodiment, the photo is an interactive smart picture, which allows the user to tap on their screen to identify coordinates on the photo (or otherwise identify points by mouse, stylus, voice, etc.) and cast rays (e.g., line segments) into the model. The points and lines identified ae converted in real-time to world coordinates in order to make real world measurements in the 3D space, which are annotated onto the photo. Referring to FIGS. 43-46, in this particular embodiment, the user taps to identify the corners of a window in the photo and the real world measurements of the window are generated in real time.

Figure 99:
FIG. 99 shows non-limiting example of a user interface for an AR application described herein; in this case, a user interface including tools/features for measuring objects in an AR environment on multiple 3D planes simultaneously.

Referring to FIG. 99, in an particular embodiment, a user optionally makes real world measurements of objects in an interactive smart picture. In this embodiment, the user optionally makes measurements of objects on multiple 3D planes defined within the smart picture simultaneously, e.g., on floors, walls, virtual walls, ceilings, etc. Suitable measurements include, by way of non-limiting examples, height, width, length, depth, area, perimeter, and the like.

Figure 100:
FIG. 100 shows non-limiting example of a user interface for an AR application described herein; in this case, a user interface for including tools/features for creating one or more virtual walls and using the virtual wall(s) as a 3D plane on which to measure objects in an AR environment.

Referring to FIG. 100, in an particular embodiment, a user optionally creates one or more virtual walls in an interactive smart picture. In this embodiment, a virtual wall defines a 3D plane within the smart picture allowing the user to make real world measurements of objects in smart picture on that plane.

In one embodiment, virtual walls are created by tracing the base of a wall along the visible floor in a picture. The real world coordinates of the base of the wall can subsequently be computed via hit-testing against the virtual wall plane which allows the corner points of the wall to be identified. From these points, a virtual wall plane, perpendicular to the floor, can be created and used for subsequent measurements.

Processing Device

Figure 47:
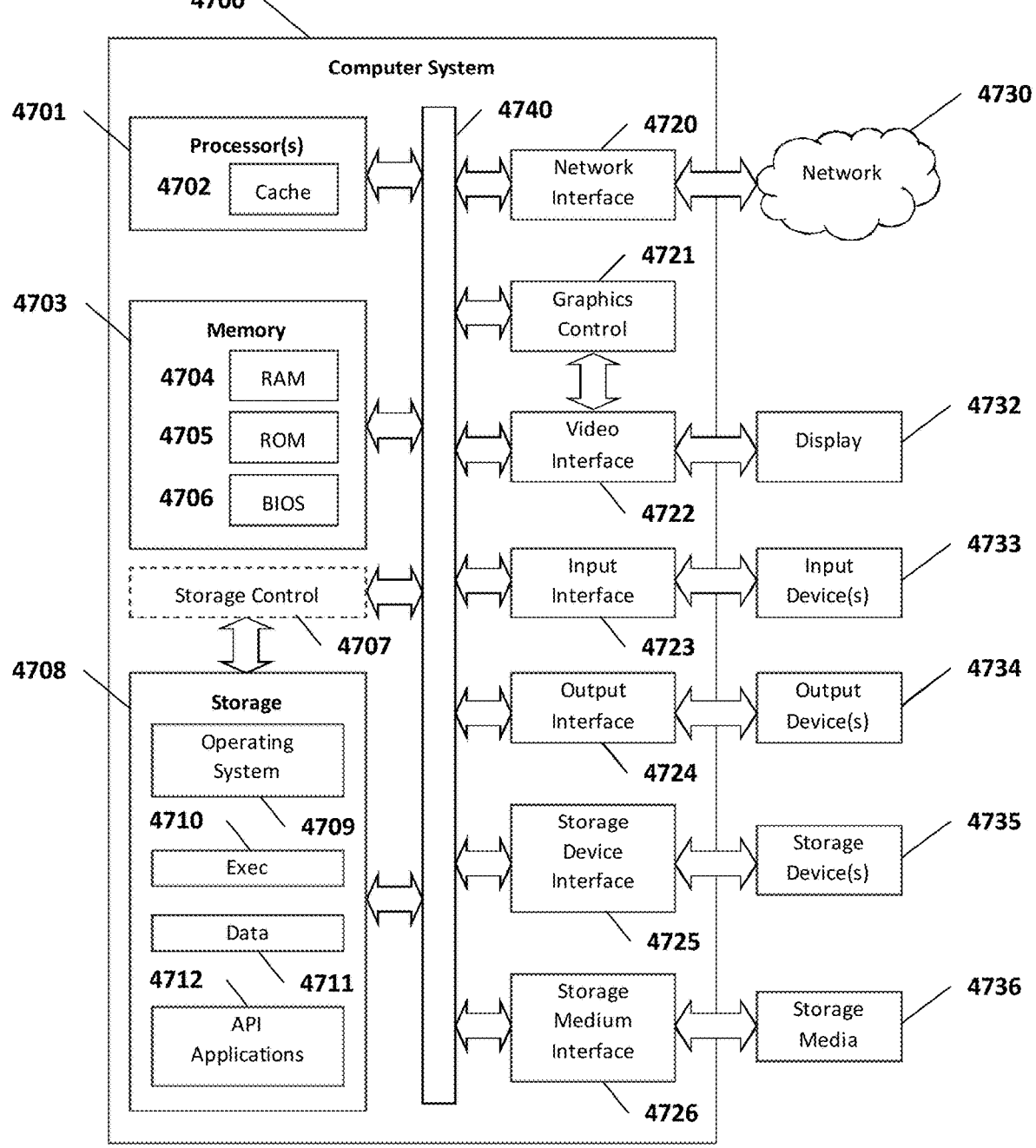
FIG. 47 shows a non-limiting example of a computing device; in this case, a device with one or more processors, memory, storage, and a network interface.

Referring to FIG. 47, a block diagram is shown depicting an exemplary machine that includes a computer system 4700 (e.g., a processing or computing device) within which a set of instructions can execute for causing a device to perform or execute any one or more of the aspects and/or methodologies for static code scheduling of the present disclosure. The components in FIG. 47 are examples only and do not limit the scope of use or functionality of any hardware, software, embedded logic component, or a combination of two or more such components implementing particular embodiments.

Computer system 4700 may include one or more processors 4701, a memory 4703, and a storage 4708 that communicate with each other, and with other components, via a bus 4740. The bus 4740 may also link a display 4732, one or more input devices 4733 (which may, for example, include a keypad, a keyboard, a mouse, a stylus, etc.), one or more output devices 4734, one or more storage devices 4735, and various tangible storage media 4736. All of these elements may interface directly or via one or more interfaces or adaptors to the bus 4740. For instance, the various tangible storage media 4736 can interface with the bus 4740 via storage medium interface 4726. Computer system 4700 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Computer system 4700 includes one or more processor(s) 4701 (e.g., central processing units (CPUs) or general purpose graphics processing units (GPGPUs)) that carry out functions. Processor(s) 4701 optionally contains a cache memory unit 4702 for temporary local storage of instructions, data, or computer addresses. Processor(s) 4701 are configured to assist in execution of computer readable instructions. Computer system 4700 may provide functionality for the components depicted in FIG. 47 as a result of the processor(s) 4701 executing non-transitory, processor-executable instructions embodied in one or more tangible computer-readable storage media, such as memory 4703, storage 4708, storage devices 4735, and/or storage medium 4736. The computer-readable media may store software that implements particular embodiments, and processor(s) 4701 may execute the software. Memory 4703 may read the software from one or more other computer-readable media (such as mass storage device(s) 4735, 4736) or from one or more other sources through a suitable interface, such as network interface 4720. The software may cause processor(s) 4701 to carry out one or more processes or one or more steps of one or more processes described or illustrated herein. Carrying out such processes or steps may include defining data structures stored in memory 4703 and modifying the data structures as directed by the software.

The memory 4703 may include various components (e.g., machine readable media) including, but not limited to, a random access memory component (e.g., RAM 4704) (e.g., static RAM (SRAM), dynamic RAM (DRAM), ferroelectric random access memory (FRAM), phase-change random access memory (PRAM), etc.), a read-only memory component (e.g., ROM 4705), and any combinations thereof. ROM 4705 may act to communicate data and instructions unidirectionally to processor(s) 4701, and RAM 4704 may act to communicate data and instructions bidirectionally with processor(s) 4701. ROM 4705 and RAM 4704 may include any suitable tangible computer-readable media described below. In one example, a basic input/output system 4706 (BIOS), including basic routines that help to transfer information between elements within computer system 4700, such as during start-up, may be stored in the memory 4703.

Fixed storage 4708 is connected bidirectionally to processor(s) 4701, optionally through storage control unit 4707. Fixed storage 4708 provides additional data storage capacity and may also include any suitable tangible computer-readable media described herein. Storage 4708 may be used to store operating system 4709, executable(s) 4710, data 4711, applications 4712 (application programs), and the like. Storage 4708 can also include an optical disk drive, a solid-state memory device (e.g., flash-based systems), or a combination of any of the above. Information in storage 4708 may, in appropriate cases, be incorporated as virtual memory in memory 4703.

In one example, storage device(s) 4735 may be removably interfaced with computer system 4700 (e.g., via an external port connector (not shown)) via a storage device interface 4725. Particularly, storage device(s) 4735 and an associated machine-readable medium may provide non-volatile and/or volatile storage of machine-readable instructions, data structures, program modules, and/or other data for the computer system 4700. In one example, software may reside, completely or partially, within a machine-readable medium on storage device(s) 4735. In another example, software may reside, completely or partially, within processor(s) 4701.

Bus 4740 connects a wide variety of subsystems. Herein, reference to a bus may encompass one or more digital signal lines serving a common function, where appropriate. Bus 4740 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 4700 may also include an input device 4733. In one example, a user of computer system 4700 may enter commands and/or other information into computer system 4700 via input device(s) 4733. Examples of an input device(s) 4733 include, but are not limited to, an alphanumeric input device (e.g., a keyboard), a pointing device (e.g., a mouse or touchpad), a touchpad, a touch screen, a multi-touch screen, a joystick, a stylus, a gamepad, an audio input device (e.g., a microphone, a voice response system, etc.), an optical scanner, a video or still image capture device (e.g., a camera), and any combinations thereof. In some embodiments, the input device is a Kinect, Leap Motion, or the like. Input device(s) 4733 may be interfaced to bus 4740 via any of a variety of input interfaces 4723 (e.g., input interface 4723) including, but not limited to, serial, parallel, game port, USB, FIREWIRE, THUNDERBOLT, or any combination of the above.

In particular embodiments, when computer system 4700 is connected to network 4730, computer system 4700 may communicate with other devices, specifically mobile devices and enterprise systems, distributed computing systems, cloud storage systems, cloud computing systems, and the like, connected to network 4730. Communications to and from computer system 4700 may be sent through network interface 4720. For example, network interface 4720 may receive incoming communications (such as requests or responses from other devices) in the form of one or more packets (such as Internet Protocol (IP) packets) from network 4730, and computer system 4700 may store the incoming communications in memory 4703 for processing. Computer system 4700 may similarly store outgoing communications (such as requests or responses to other devices) in the form of one or more packets in memory 4703 and communicated to network 4730 from network interface 4720. Processor(s) 4701 may access these communication packets stored in memory 4703 for processing.

Examples of the network interface 4720 include, but are not limited to, a network interface card, a modem, and any combination thereof. Examples of a network 4730 or network segment 4730 include, but are not limited to, a distributed computing system, a cloud computing system, a wide area network (WAN) (e.g., the Internet, an enterprise network), a local area network (LAN) (e.g., a network associated with an office, a building, a campus or other relatively small geographic space), a telephone network, a direct connection between two computing devices, a peer-to-peer network, and any combinations thereof. A network, such as network 4730, may employ a wired and/or a wireless mode of communication. In general, any network topology may be used.

Information and data can be displayed through a display 4732. Examples of a display 4732 include, but are not limited to, a cathode ray tube (CRT), a liquid crystal display (LCD), a thin film transistor liquid crystal display (TFT-LCD), an organic liquid crystal display (OLED) such as a passive-matrix OLED (PMOLED) or active-matrix OLED (AMOLED) display, a plasma display, and any combinations thereof. The display 4732 can interface to the processor(s) 4701, memory 4703, and fixed storage 4708, as well as other devices, such as input device(s) 4733, via the bus 4740. The display 4732 is linked to the bus 4740 via a video interface 4722, and transport of data between the display 4732 and the bus 4740 can be controlled via the graphics control 4721. In some embodiments, the display is a video projector. In some embodiments, the display is a head-mounted display (HMD) such as a VR headset. In further embodiments, suitable VR headsets include, by way of non-limiting examples, HTC Vive, Oculus Rift, Samsung Gear VR, Microsoft HoloLens, Razer OSVR, FOVE VR, Zeiss VR One, Avegant Glyph, Freefly VR headset, and the like. In still further embodiments, the display is a combination of devices such as those disclosed herein.

In addition to a display 4732, computer system 4700 may include one or more other peripheral output devices 4734 including, but not limited to, an audio speaker, a printer, a storage device, and any combinations thereof. Such peripheral output devices may be connected to the bus 4740 via an output interface 4724. Examples of an output interface 4724 include, but are not limited to, a serial port, a parallel connection, a USB port, a FIREWIRE port, a THUNDERBOLT port, and any combinations thereof.

In addition or as an alternative, computer system 4700 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a computer-readable medium may encompass a circuit (such as an IC) storing software for execution, a circuit embodying logic for execution, or both, where appropriate. The present disclosure encompasses any suitable combination of hardware, software, or both.

Those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by one or more processor(s), or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In accordance with the description herein, suitable computing devices include, by way of non-limiting examples, server computers, desktop computers, laptop computers, notebook computers, sub-notebook computers, netbook computers, netpad computers, set-top computers, media streaming devices, handheld computers, Internet appliances, mobile smartphones, tablet computers, personal digital assistants, video game consoles, and vehicles. Those of skill in the art will also recognize that select televisions, video players, and digital music players with optional computer network connectivity are suitable for use in the system described herein. Suitable tablet computers, in various embodiments, include those with booklet, slate, and convertible configurations, known to those of skill in the art.

In some embodiments, the computing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smartphone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®. Those of skill in the art will also recognize that suitable media streaming device operating systems include, by way of non-limiting examples, Apple TV®, Roku®, Boxee®, Google TV®, Google Chromecast®, Amazon Fire®, and Samsung® HomeSync®. Those of skill in the art will also recognize that suitable video game console operating systems include, by way of non-limiting examples, Sony® P53®, Sony® PS4®, Microsoft® Xbox 360®, Microsoft Xbox One, Nintendo® Wii®, Nintendo® Wii U®, and Ouya®.

Non-Transitory Computer Readable Storage Medium

In some embodiments, the platforms, systems, media, and methods disclosed herein include one or more non-transitory computer readable storage media encoded with a program including instructions executable by the operating system of an optionally networked computing device. In further embodiments, a computer readable storage medium is a tangible component of a computing device. In still further embodiments, a computer readable storage medium is optionally removable from a computing device. In some embodiments, a computer readable storage medium includes, by way of non-limiting examples, CD-ROMs, DVDs, flash memory devices, solid state memory, magnetic disk drives, magnetic tape drives, optical disk drives, distributed computing systems including cloud computing systems and services, and the like. In some cases, the program and instructions are permanently, substantially permanently, semi-permanently, or non-transitorily encoded on the media.

Computer Program

In some embodiments, the platforms, systems, media, and methods disclosed herein include at least one computer program, or use of the same. A computer program includes a sequence of instructions, executable by one or more processor(s) of the computing device's CPU, written to perform a specified task. Computer readable instructions may be implemented as program modules, such as functions, objects, Application Programming Interfaces (APIs), computing data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft®.NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® Actionscript, Javascript, or Silverlight®. In some embodiments, a web application is written to some extent in a server-side coding language such as Active Server Pages (ASP), ColdFusion™, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Figure 48:
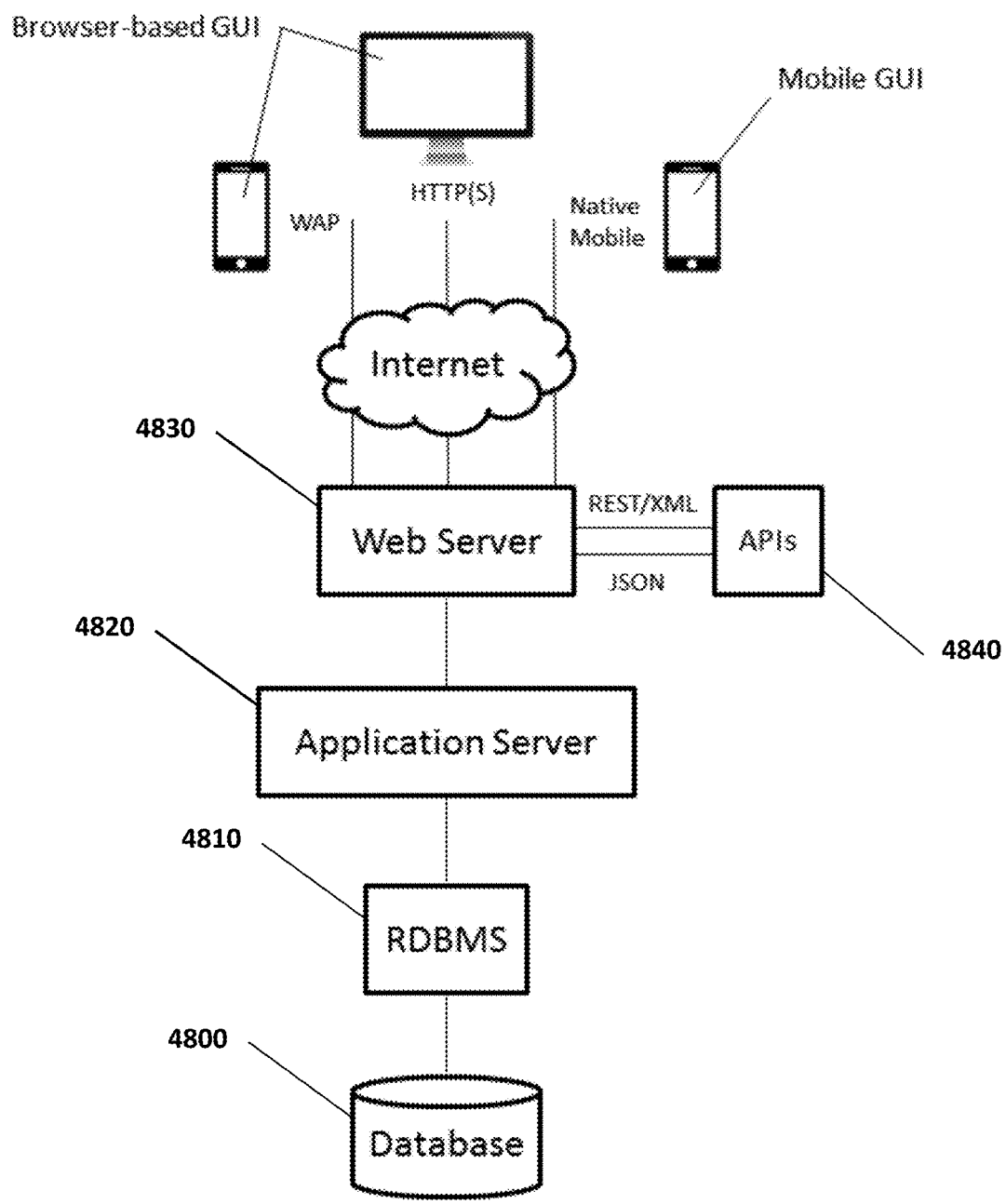
FIG. 48 shows a non-limiting example of a web/mobile application provision system; in this case, a system providing browser-based and/or native mobile user interfaces.

Referring to FIG. 48, in a particular embodiment, an application provision system comprises one or more databases 4800 accessed by a relational database management system (RDBMS) 4810. Suitable RDBMSs include Firebird, My SQL, Postgre SQL, SQLite, Oracle Database, Microsoft SQL Server, IBM DB2, IBM Informix, SAP Sybase, SAP Sybase, Teradata, and the like. In this embodiment, the application provision system further comprises one or more application severs 4820 (such as Java servers, .NET servers, PHP servers, and the like) and one or more web servers 4830 (such as Apache, IIS, GWS and the like). The web server(s) optionally expose one or more web services via app application programming interfaces (APIs) 4840. Via a network, such as the Internet, the system provides browser-based and/or mobile native user interfaces.

Figure 49:
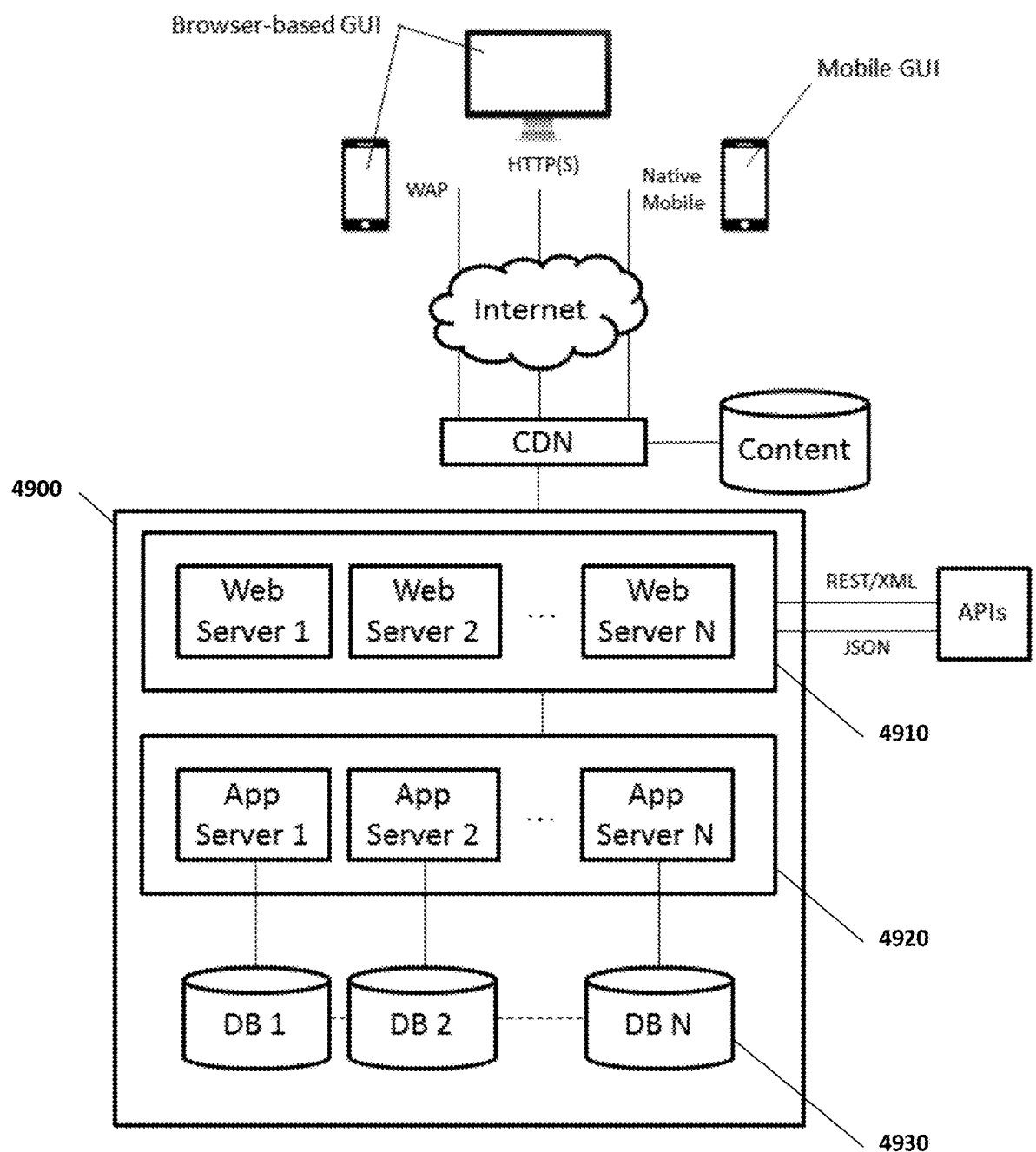
FIG. 49 shows a non-limiting example of a cloud-based web/mobile application provision system; in this case, a system comprising an elastically load balanced, auto-scaling web server and application server resources as well synchronously replicated databases.

Referring to FIG. 49, in a particular embodiment, an application provision system alternatively has a distributed, cloud-based architecture 4900 and comprises elastically load balanced, auto-scaling web server resources 4910 and application server resources 4920 as well synchronously replicated databases 4930.

Mobile Application

In some embodiments, a computer program includes a mobile application provided to a mobile computing device. In some embodiments, the mobile application is provided to a mobile computing device at the time it is manufactured. In other embodiments, the mobile application is provided to a mobile computing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C #, Objective-C, Java™, Javascript, Pascal, Object Pascal, Python™, Ruby, VB.NET, WML, and XEITML/HTML with or without CSS, or combinations thereof.

Suitable mobile application development environments are available from several sources. Commercially available development environments include, by way of non-limiting examples, Airplay SDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Google® Play, Chrome Web Store, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable complied applications.

Web Browser Plug-in

In some embodiments, the computer program includes a web browser plug-in (e.g., extension, etc.). In computing, a plug-in is one or more software components that add specific functionality to a larger software application. Makers of software applications support plug-ins to enable third-party developers to create abilities which extend an application, to support easily adding new features, and to reduce the size of an application. When supported, plug-ins enable customizing the functionality of a software application. For example, plug-ins are commonly used in web browsers to play video, generate interactivity, scan for viruses, and display particular file types. Those of skill in the art will be familiar with several web browser plug-ins including, Adobe® Flash® Player, Microsoft® Silverlight®, and Apple® QuickTime®. In some embodiments, the toolbar comprises one or more web browser extensions, add-ins, or add-ons. In some embodiments, the toolbar comprises one or more explorer bars, tool bands, or desk bands.

In view of the disclosure provided herein, those of skill in the art will recognize that several plug-in frameworks are available that enable development of plug-ins in various programming languages, including, by way of non-limiting examples, C++, Delphi, Java™, PHP, Python™, and VB .NET, or combinations thereof.

Web browsers (also called Internet browsers) are software applications, designed for use with network-connected computing devices, for retrieving, presenting, and traversing information resources on the World Wide Web. Suitable web browsers include, by way of non-limiting examples, Microsoft® Internet Explorer °, Mozilla® Firefox®, Google® Chrome, Apple® Safari®, Opera Software® Opera®, and KDE Konqueror. In some embodiments, the web browser is a mobile web browser. Mobile web browsers (also called microbrowsers, mini-browsers, and wireless browsers) are designed for use on mobile computing devices including, by way of non-limiting examples, handheld computers, tablet computers, netbook computers, subnotebook computers, smartphones, music players, personal digital assistants (PDAs), and handheld video game systems. Suitable mobile web browsers include, by way of non-limiting examples, Google® Android® browser, RIM BlackBerry® Browser, Apple® Safari Palm® Blazer, Palm® WebOS® Browser, Mozilla® Firefox® for mobile, Microsoft® Internet Explorer® Mobile, Amazon® Kindle® Basic Web, Nokia® Browser, Opera Software® Opera® Mobile, and Sony® PSP™ browser.

Software Modules

In some embodiments, the platforms, systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on a distributed computing platform such as a cloud computing platform. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for storage and retrieval of AR session, camera, backing model, photograph, measurement, and/or annotation information. In various embodiments, suitable databases include, by way of non-limiting examples, relational databases, non-relational databases, object oriented databases, object databases, entity-relationship model databases, associative databases, and XML databases. Further non-limiting examples include SQL, PostgreSQL, My SQL, Oracle, DB2, and Sybase. In some embodiments, a database is internet-based. In further embodiments, a database is web-based. In still further embodiments, a database is cloud computing-based. In a particular embodiment, a database is a distributed database. In other embodiments, a database is based on one or more local computer storage devices.

Exemplary Implementations

Figure 50:
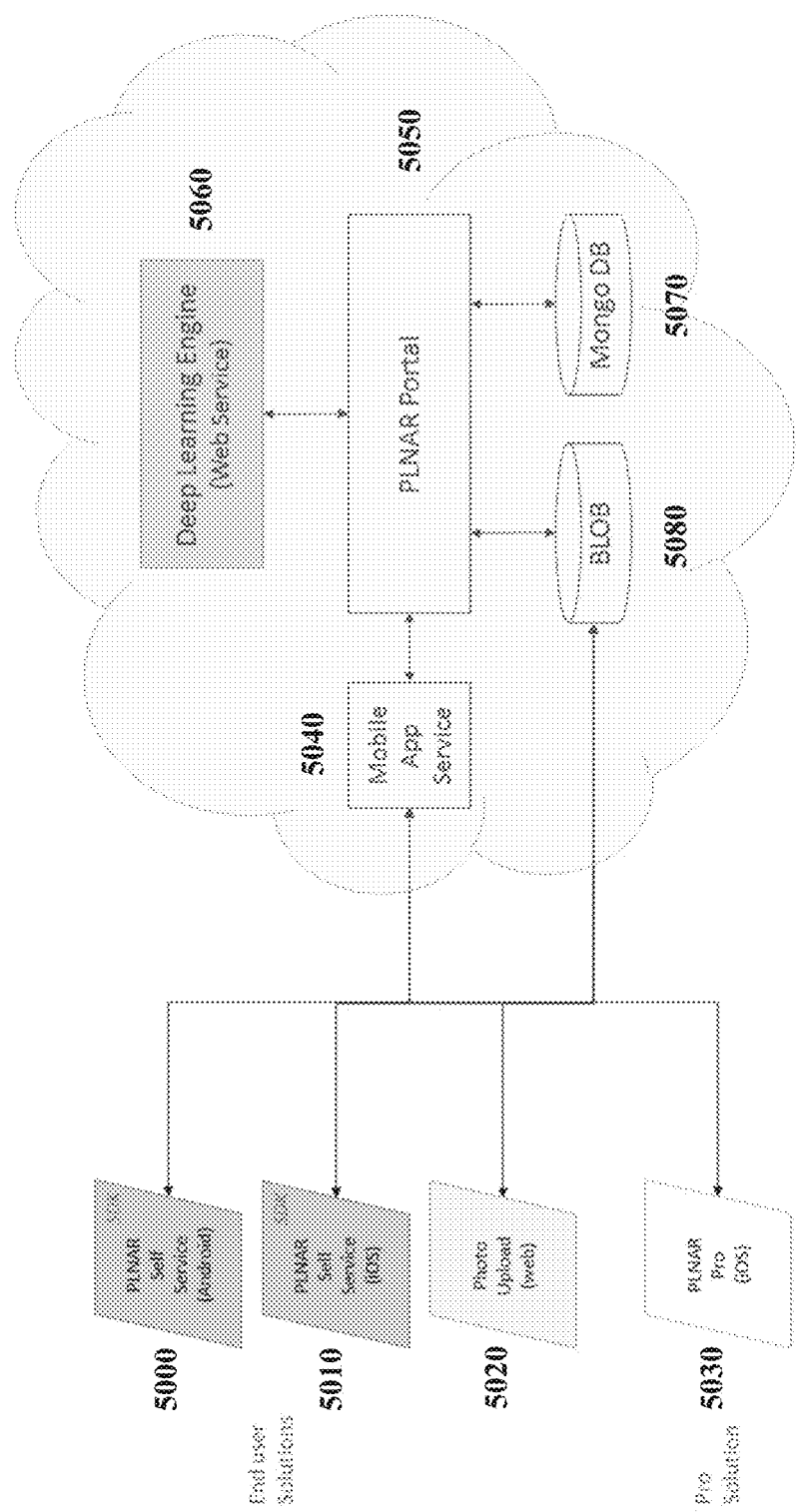
FIG. 50 shows a non-limiting exemplary block diagram; in this case, a block diagram illustrating how end user apps and a pro app connect to a cloud back-end to implement a deep learning engine.

Referring to FIG. 50, in a particular embodiment, the platforms, systems, media, and methods include a plurality of user applications (e.g., "apps"). In this embodiment, the user applications include a plurality of end user applications 5000, 5010, 5020 and a pro solution 5030. The end user applications optionally include self-service mobile apps 5000, 5010 and/or a web-based photo upload application 5020. Further, in this embodiment, communicate via a network connection, with a mobile app service 5040 or directly with a Binary Large OBject (BLOB) 5080. On the back-end a portal application 5050 is linked to the BLOB 5080 and a MongoDB document-oriented database 5070. Further, in this embodiment, the portal application 5050 provides access to deep learning web service 5060.

Figure 51:
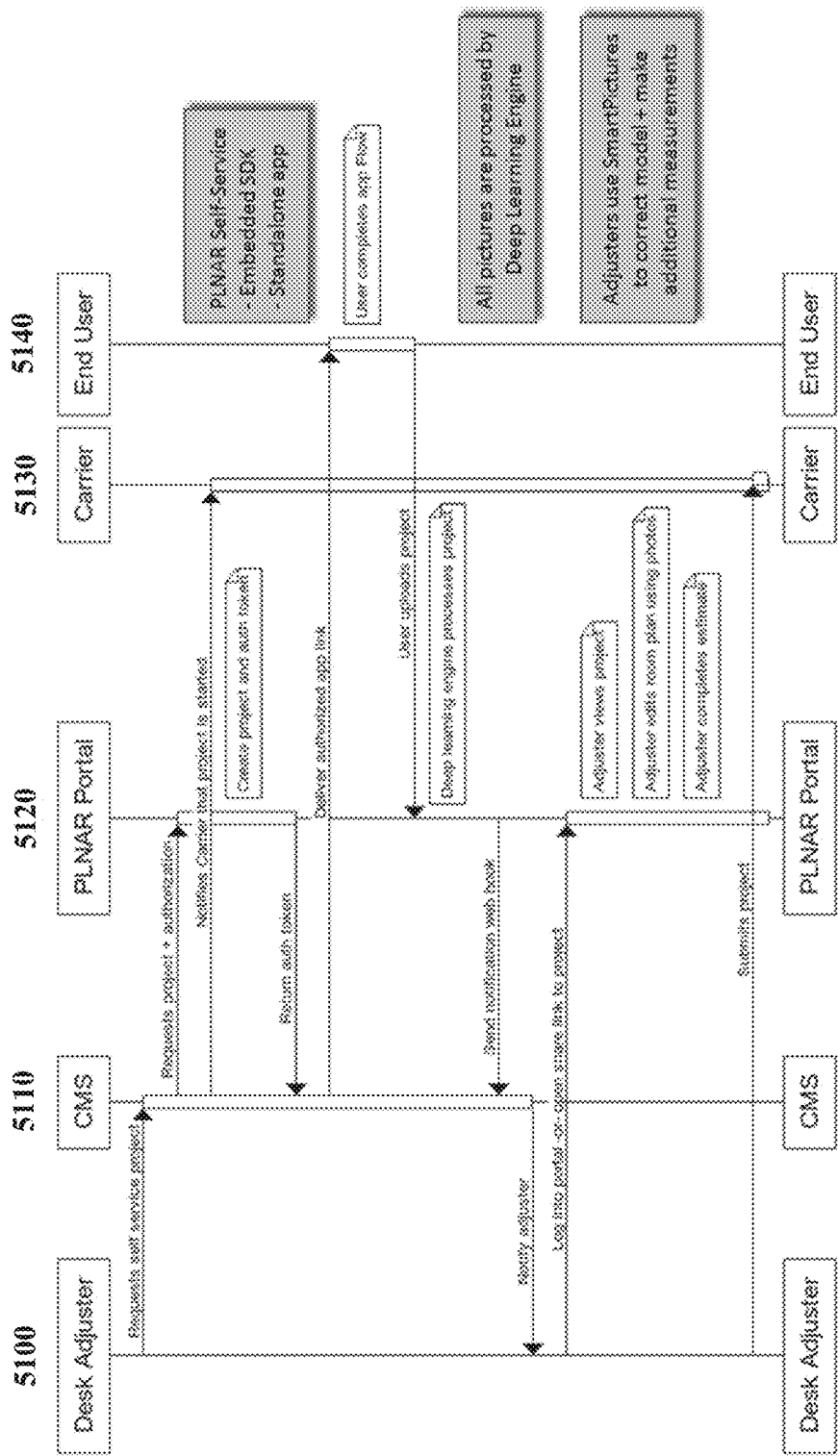
FIG. 51 shows a non-limiting exemplary process flow diagram; in this case, a process flow diagram illustrating aspects of the subject matter described herein implemented in a practical application.

Referring to FIG. 51, in a particular practical application in the insurance industry, a desk adjuster 5100 initiates a process by requesting a self-service project. A CMS 5110 requests a project and authorization from a portal application 5120, notifies the carrier 5130 that the project has been started, and delivers an authorized app link to an end user 5140 so they can complete the app process flow. Once the end user 5140 uploads the project photos, a deep learning engine at the portal 5120 analyzes the content and a portal 5120 notifies the CMS 5110, which in turn notifies the adjuster 5100. The adjuster 5100 then can log into the portal 5120 to view the project photos, edits plans using the photos, and completes an estimate, which is then submitted to the carrier 5130.

Exemplary End User Process

Figure 58:
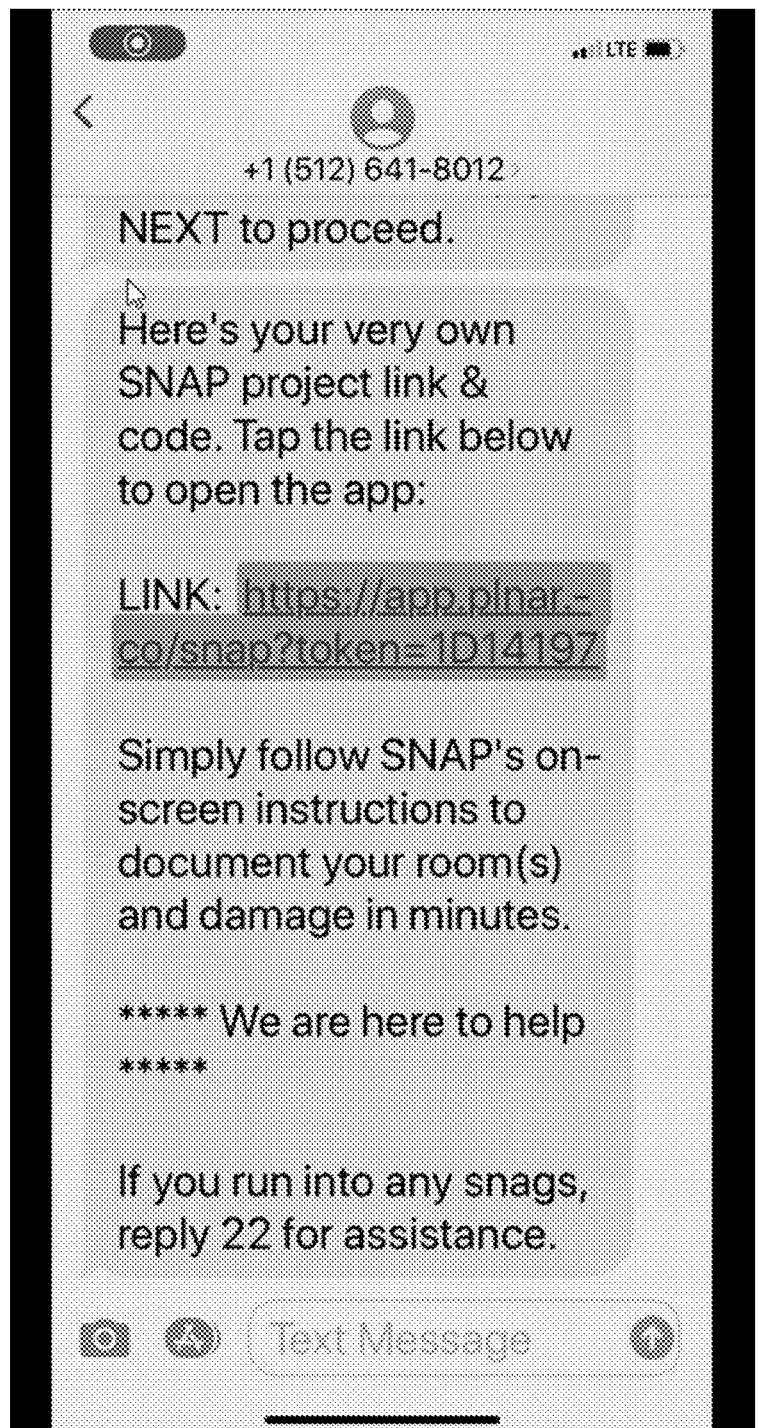
FIGS. 58-82 show non-limiting examples of a user interface for an AR application described herein; in this case, a user interface for an end user to document a 3D space and damages thereto as part of an insurance claim.
Figure 59:
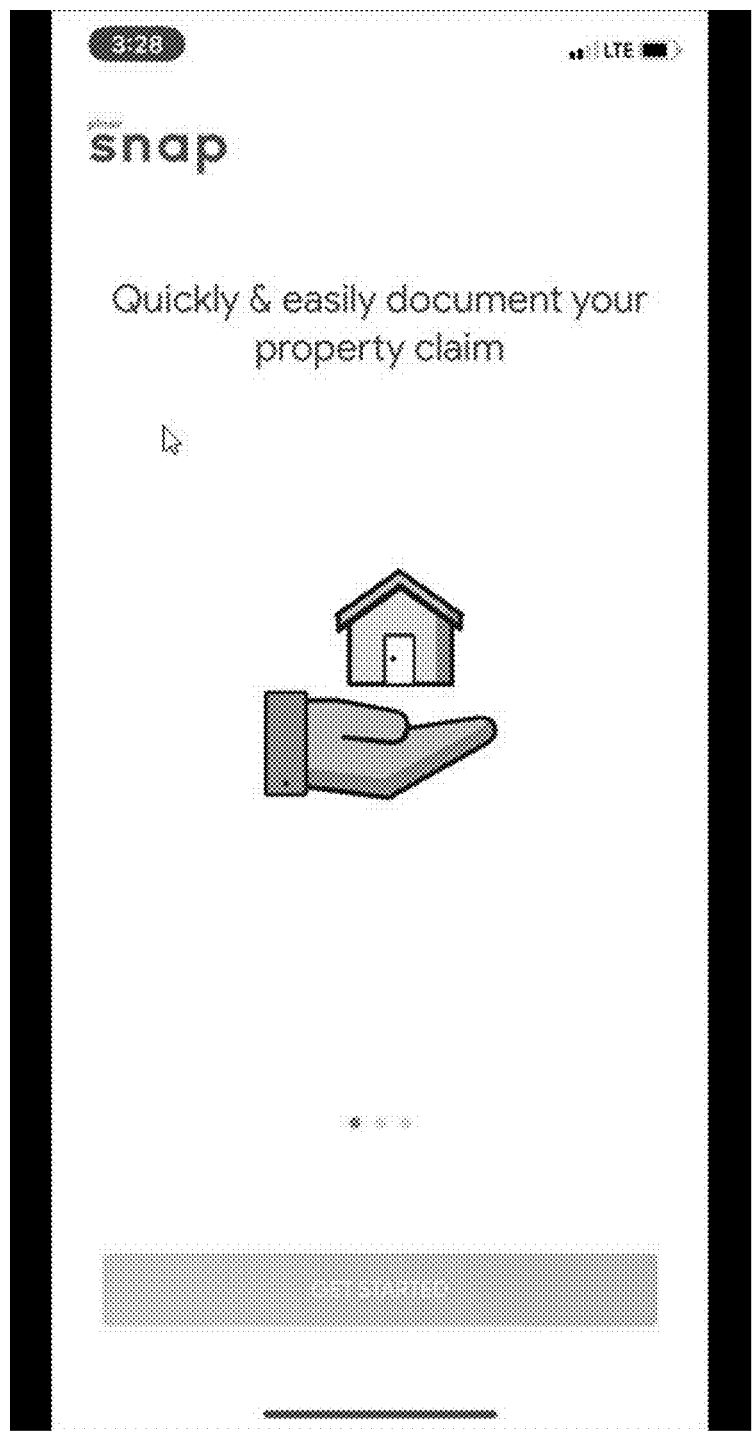
Figure 60:
Figure 61:
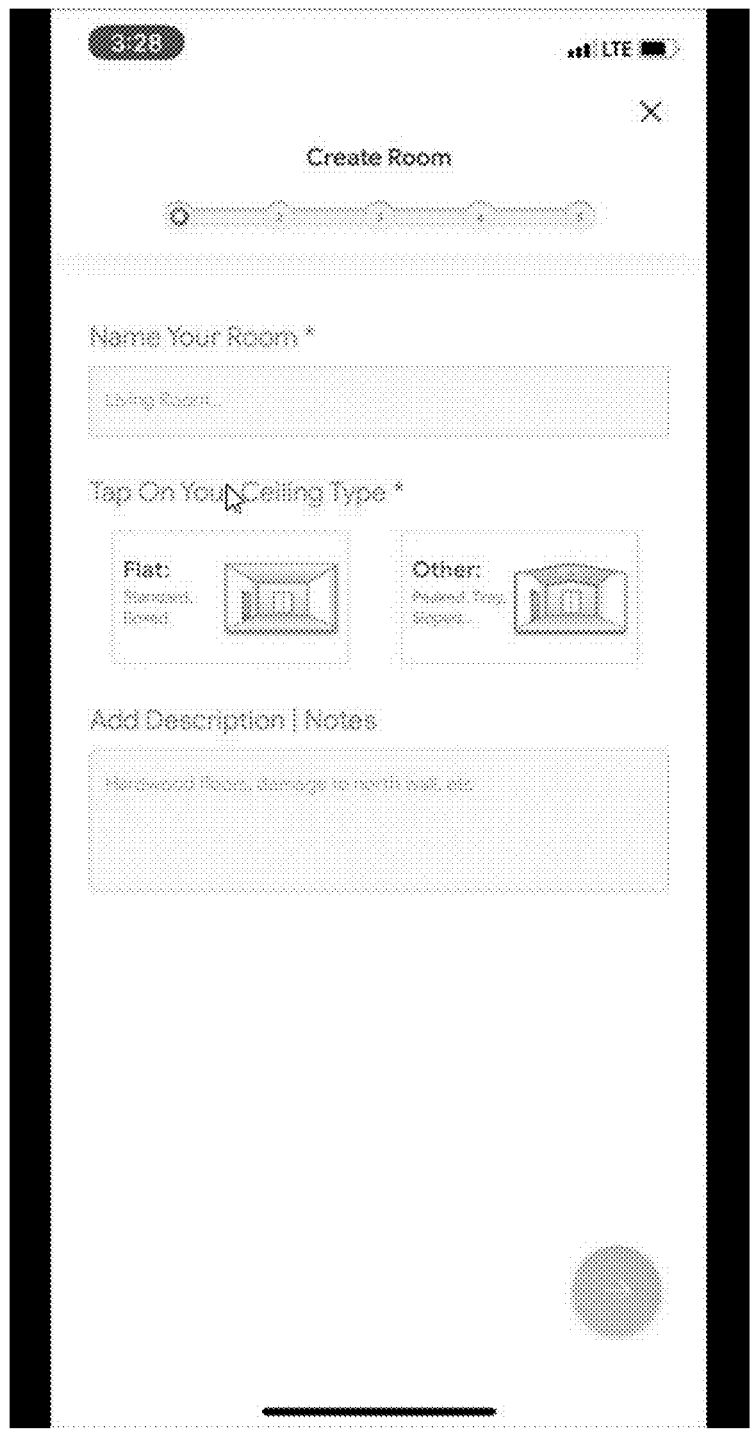
Figure 62:
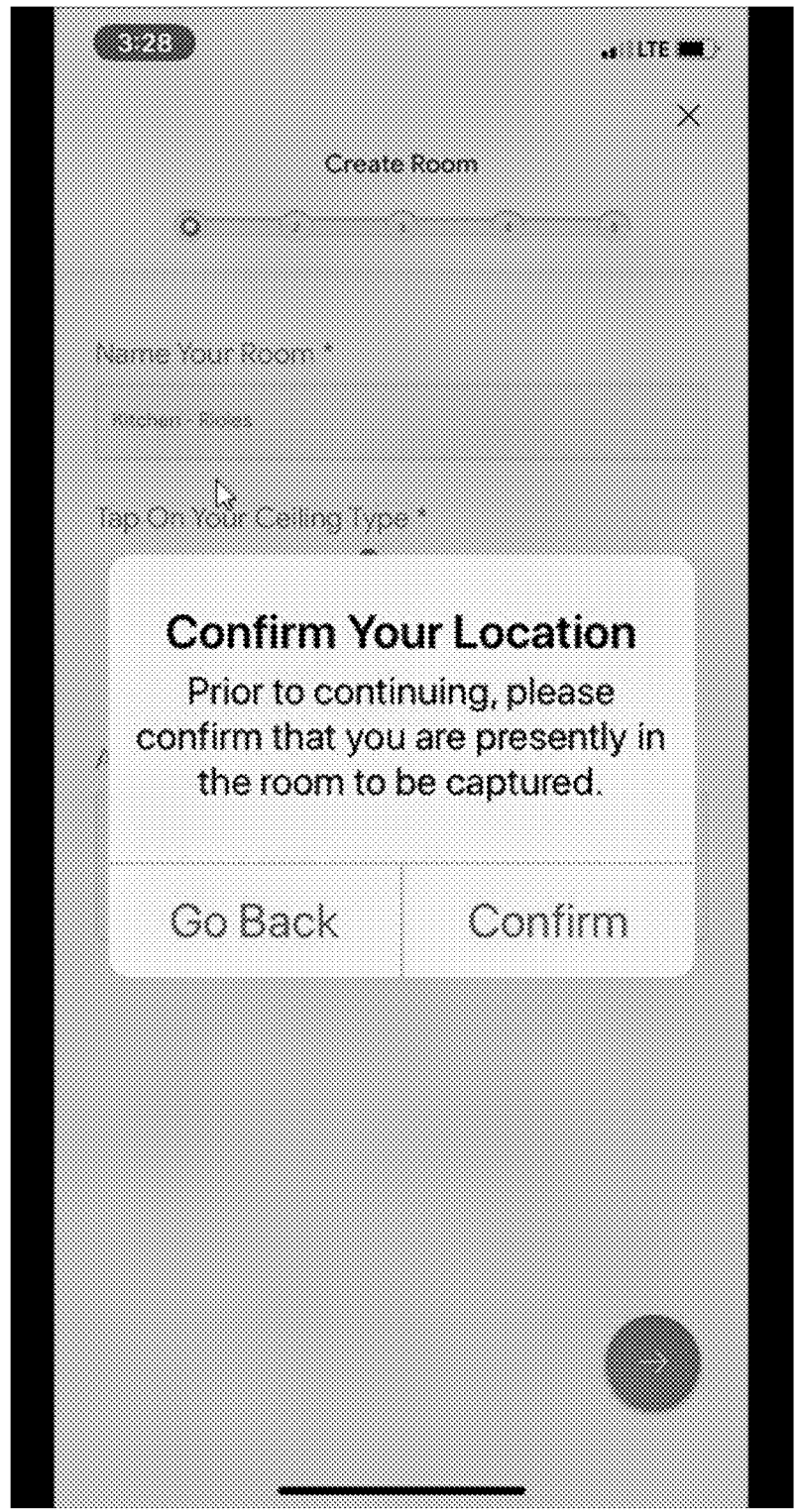
Figure 63:
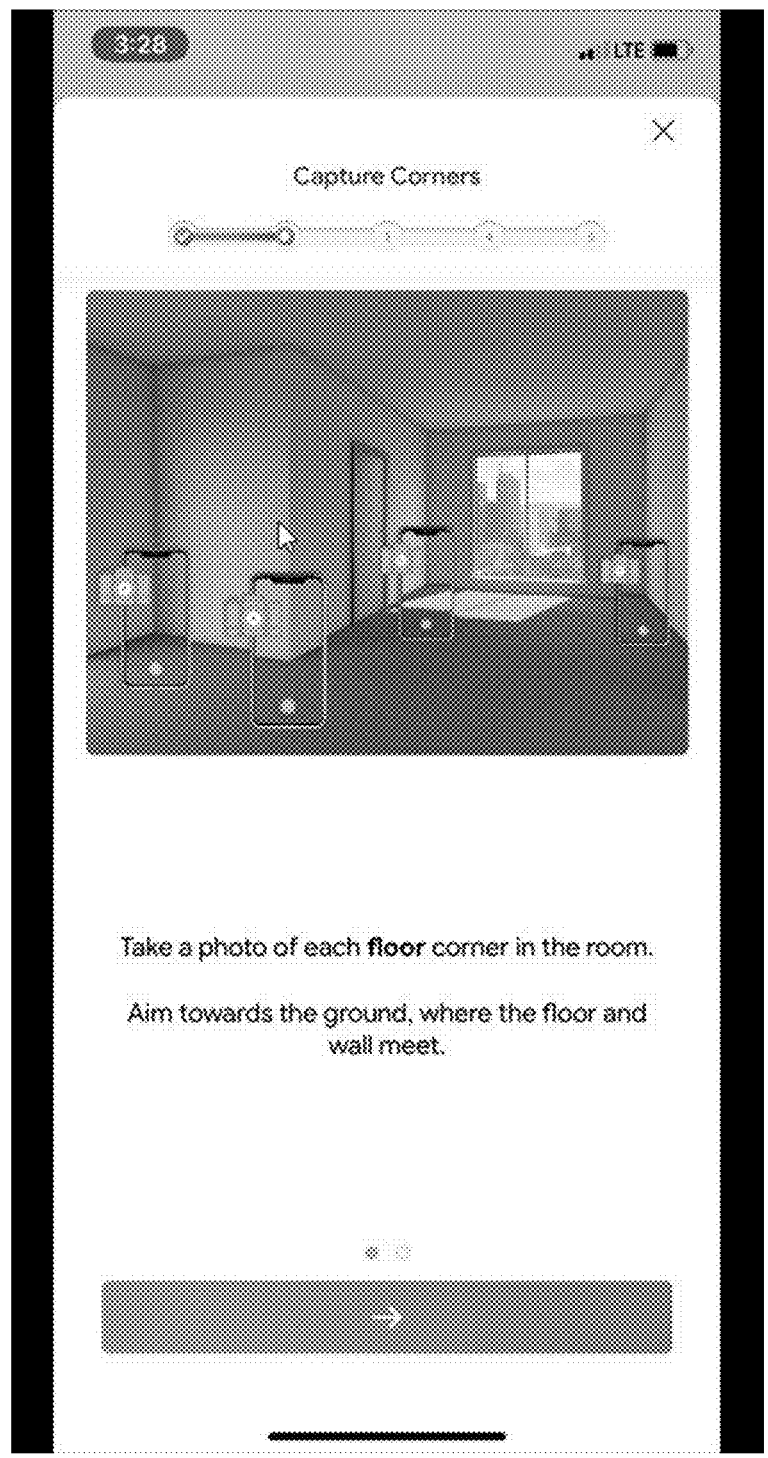
Figure 64:
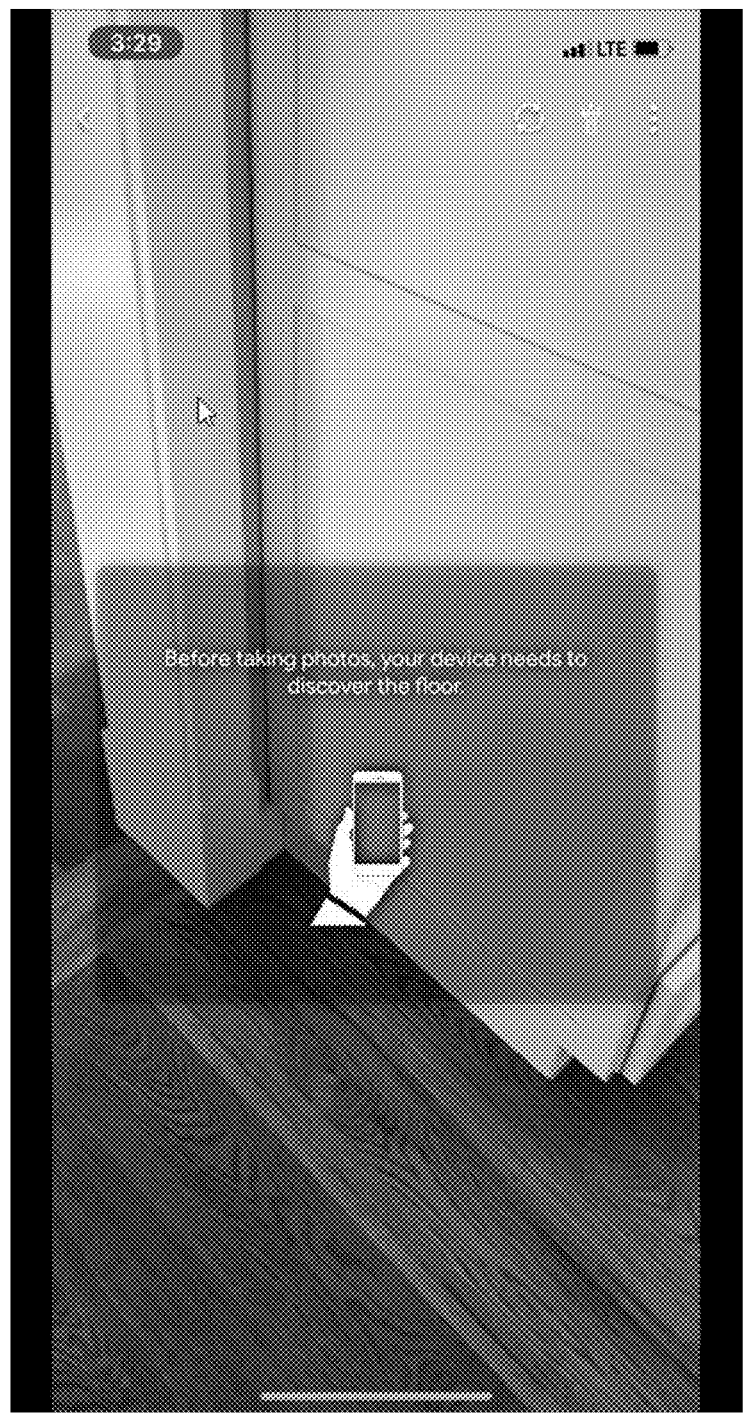
Figure 65:
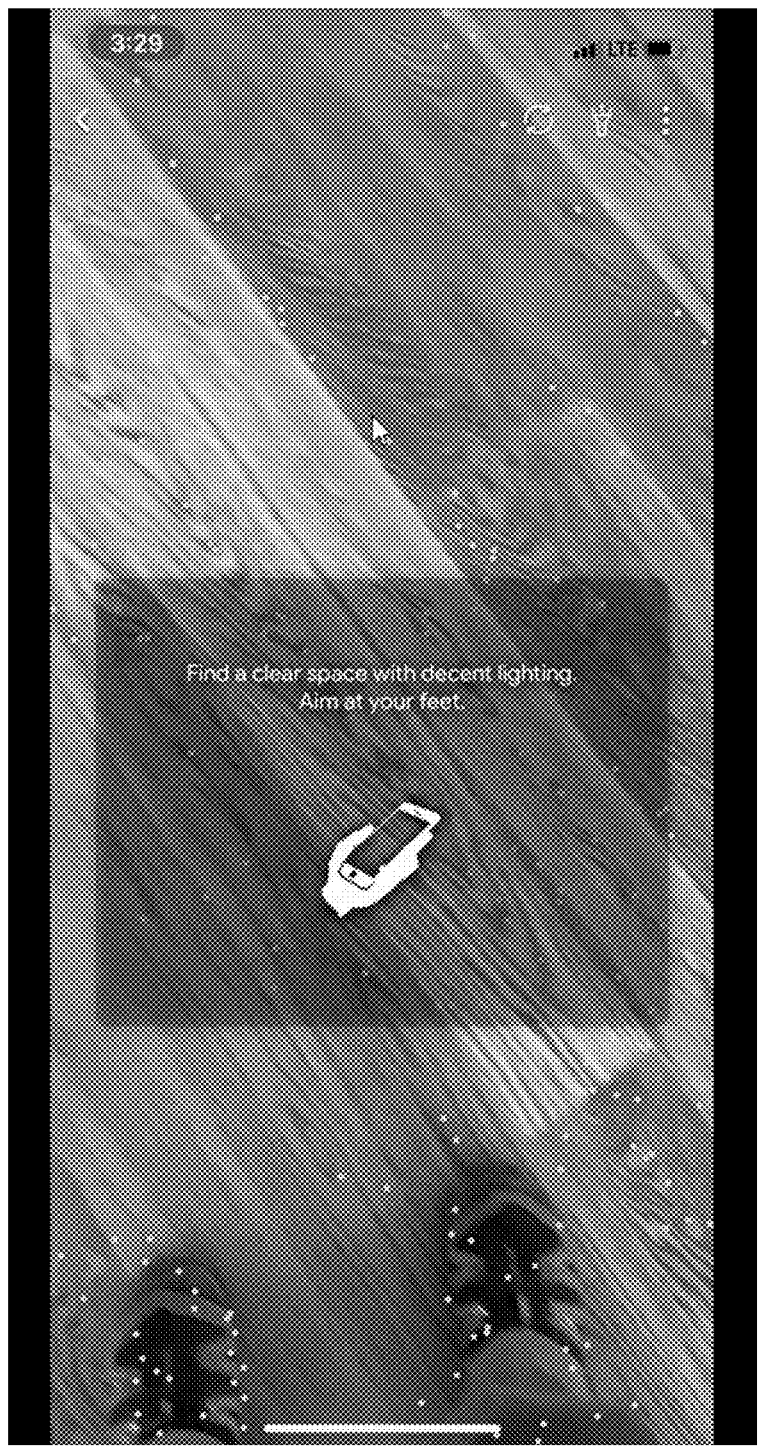
Figure 75:
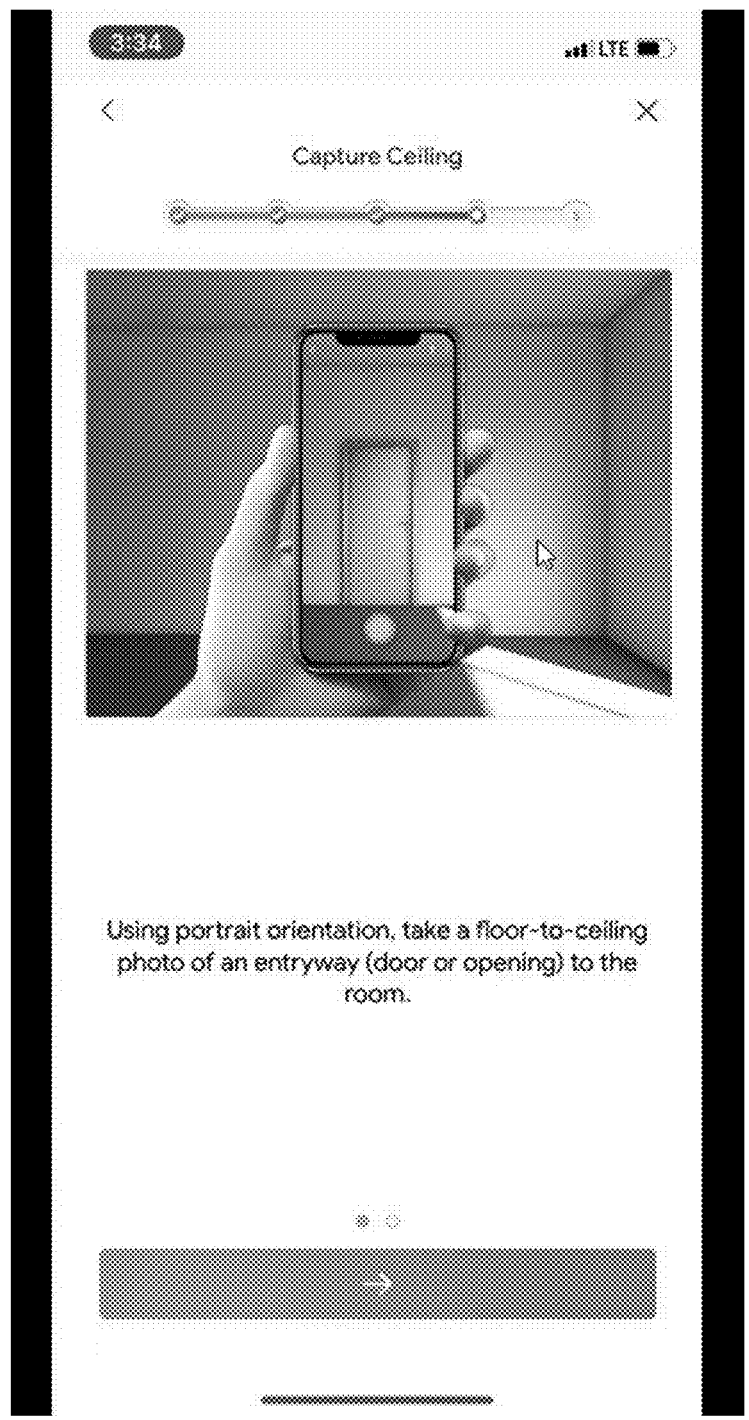

Referring to FIG. 58, in another particular practical application in the insurance industry, a policy holder receives a text message, which includes a link to activate a mobile application and start a process to document a 3D space and damage thereto as part of an insurance claim. FIG. 59 shows the mobile application opening a providing step-by-step instructions to the user. As shown in FIG. 60, the application informs the user that they can tap a "+" icon to add a room to a 3D model. Next, in this exemplary process, the application allows the user to name the room, choose a ceiling type and add a description and/or notes, as shown in FIG. 61. Per FIG. 62, the application accesses the GPS features of the mobile device and asks the end user to confirm that they (and the device) are presently located in the room to be modeled. Once the user confirms, the application instructs the user on a 3D modeling process that starts, as shown in FIG. 63, with capturing photos of the corners of the room using the camera of the mobile device. Progress of the process indicated by a progress bar as shown at the top of FIG. 63 (see also FIGS. 70, 75, and 79). However, prior to capturing corners, the application instructs the user to conduct a simple calibration process to discover the floor plane, as shown in FIG. 64. To conduct the floor calibration, the application instructs the user, as shown in FIG. 65, to find a clear space on the floor that is reasonably well lit and aim the camera of the mobile device at their feet. Continuing to refer to FIG. 65, the application provides the user with an AR environment to provide the instructions and information collected about the floor plane of the room.

Figure 66:
Figure 67:
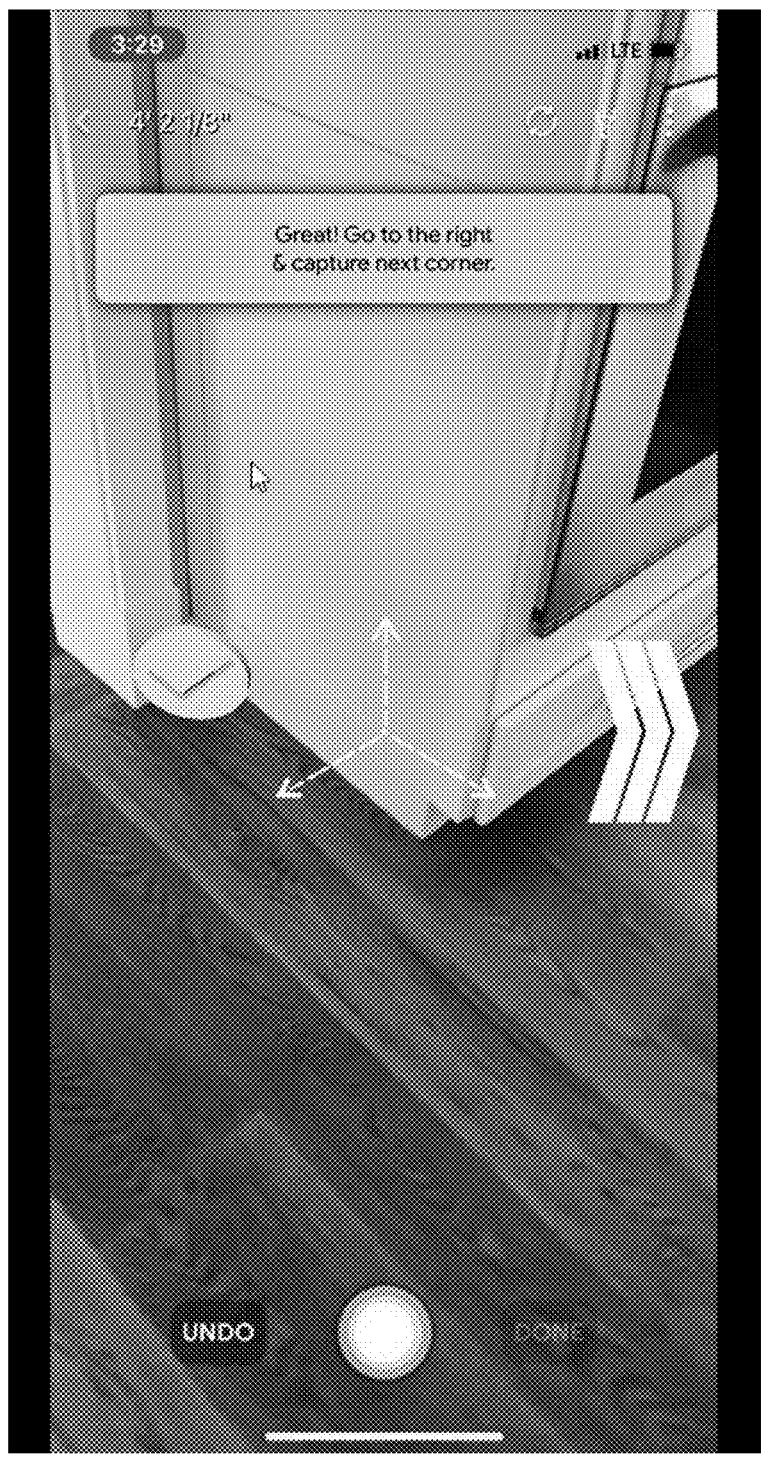
Figure 68:
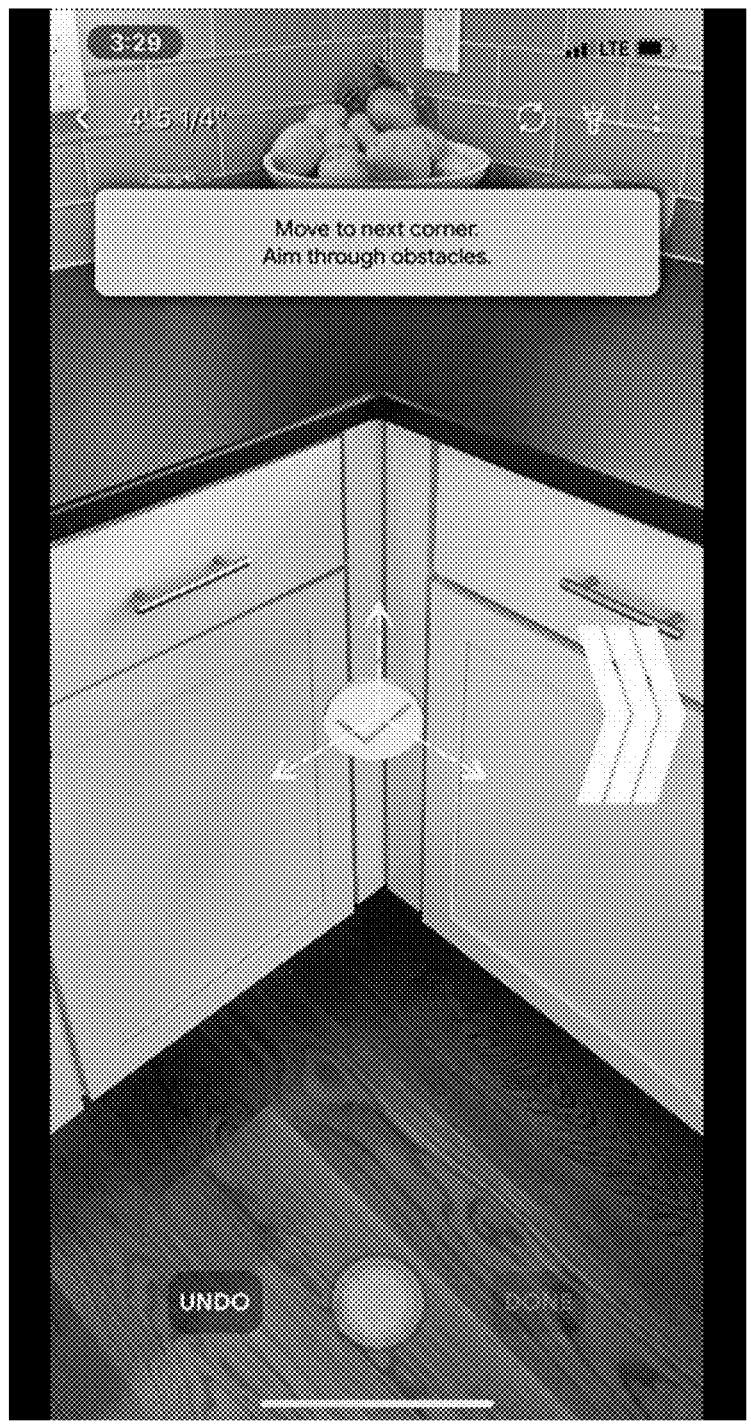
Figure 69:

Referring to FIG. 66, continuing this example of a practical application in the insurance industry, the application next provides an AR environment to provide instructions to the user about the corner capture process and to provide the user with information collected about the corners of the room. For example, FIG. 66 shows the application providing instruction to the user to aim the camera of the device at a first floor corner, to take a photo, and to move to the next corner to the right, and repeat. The application provides an AR overlay, which includes a corner icon (e.g., three rays, oriented at 120 degrees to each other, with a common origin) that the user can position over the first corner and a button at the bottom of the AR environment to capture a photo. FIG. 67 shows how the application provides an AR overlay of a check mark icon showing the position of the first corner captured, as well as the corner icon, and a set of right-facing chevron arrows with instructions for the user to go to the right and capture the next corner. Per FIG. 68, the user utilizes the AR environment provided to position the corner icon and capture a photo of a second corner of the room, which is marked by a check mark icon. This process is repeated, as shown in FIG. 69, until the user has photographed the corners of the perimeter of the room and selected a "done" button.

Figure 70:
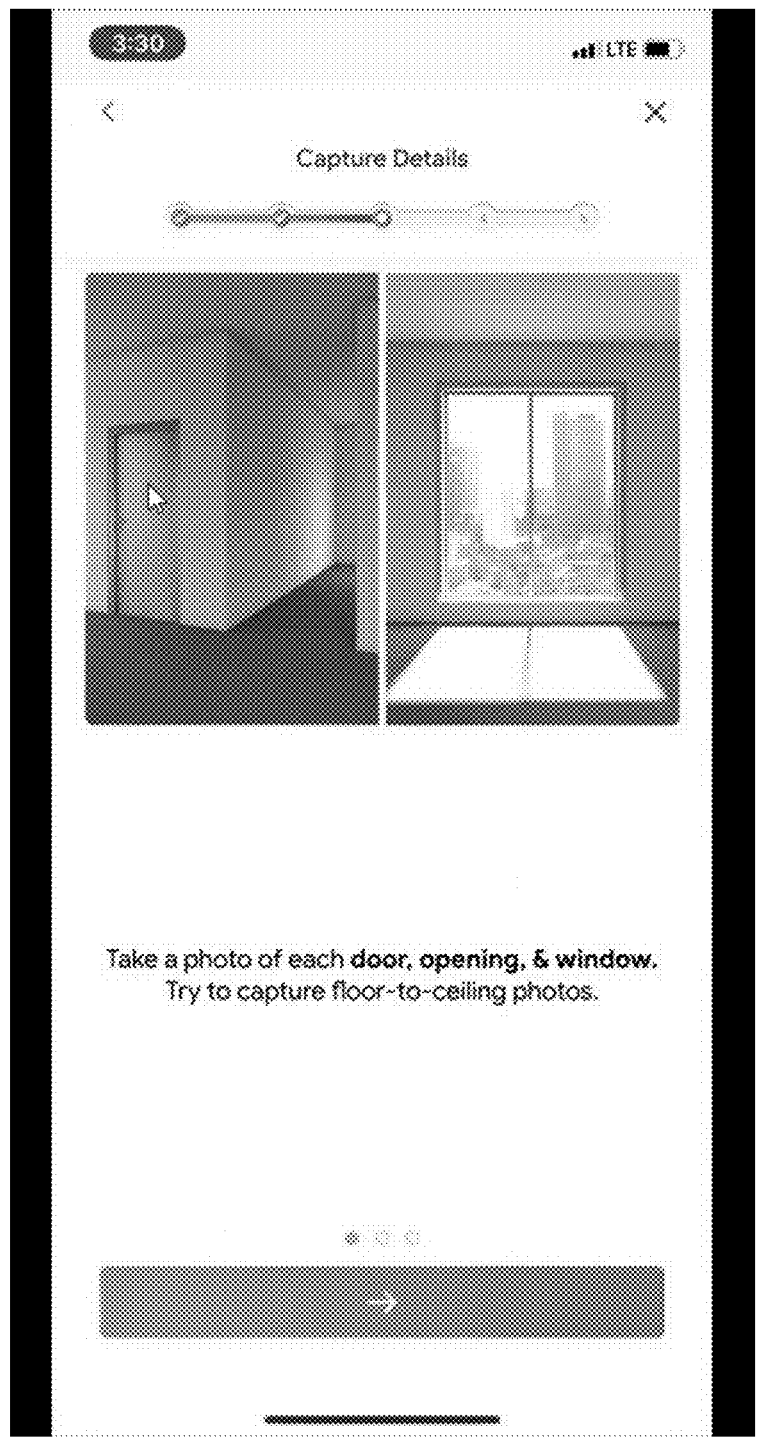
Figure 71:
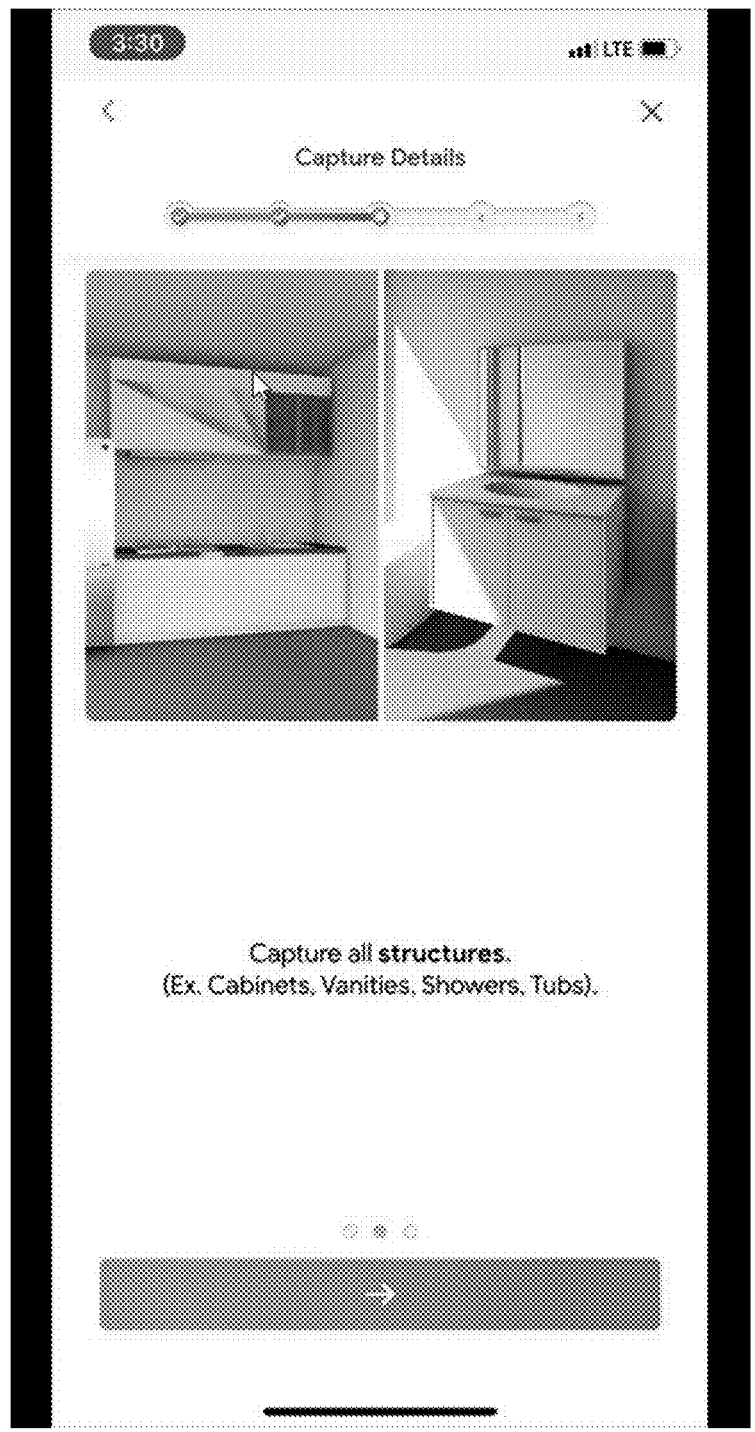
Figure 72:
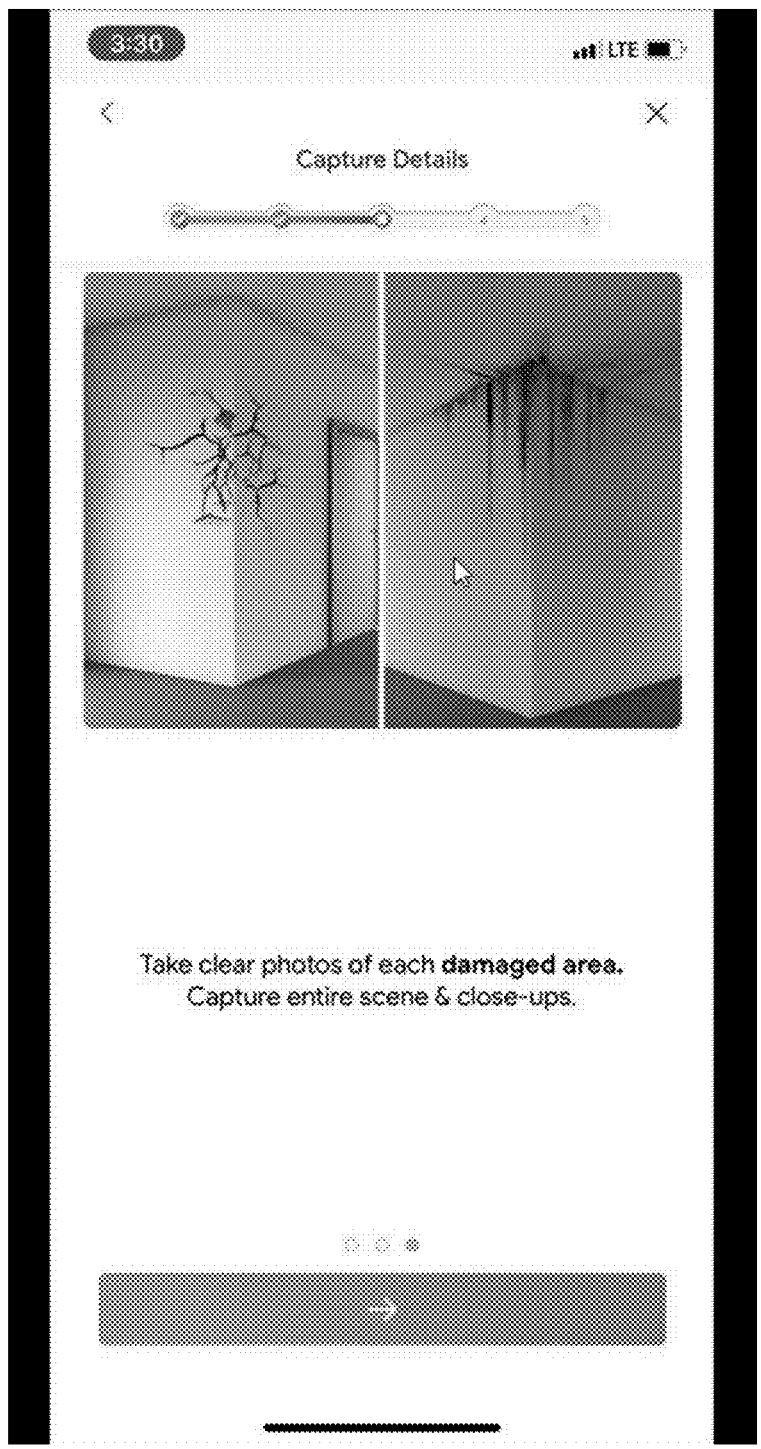
Figure 73:
Figure 74:
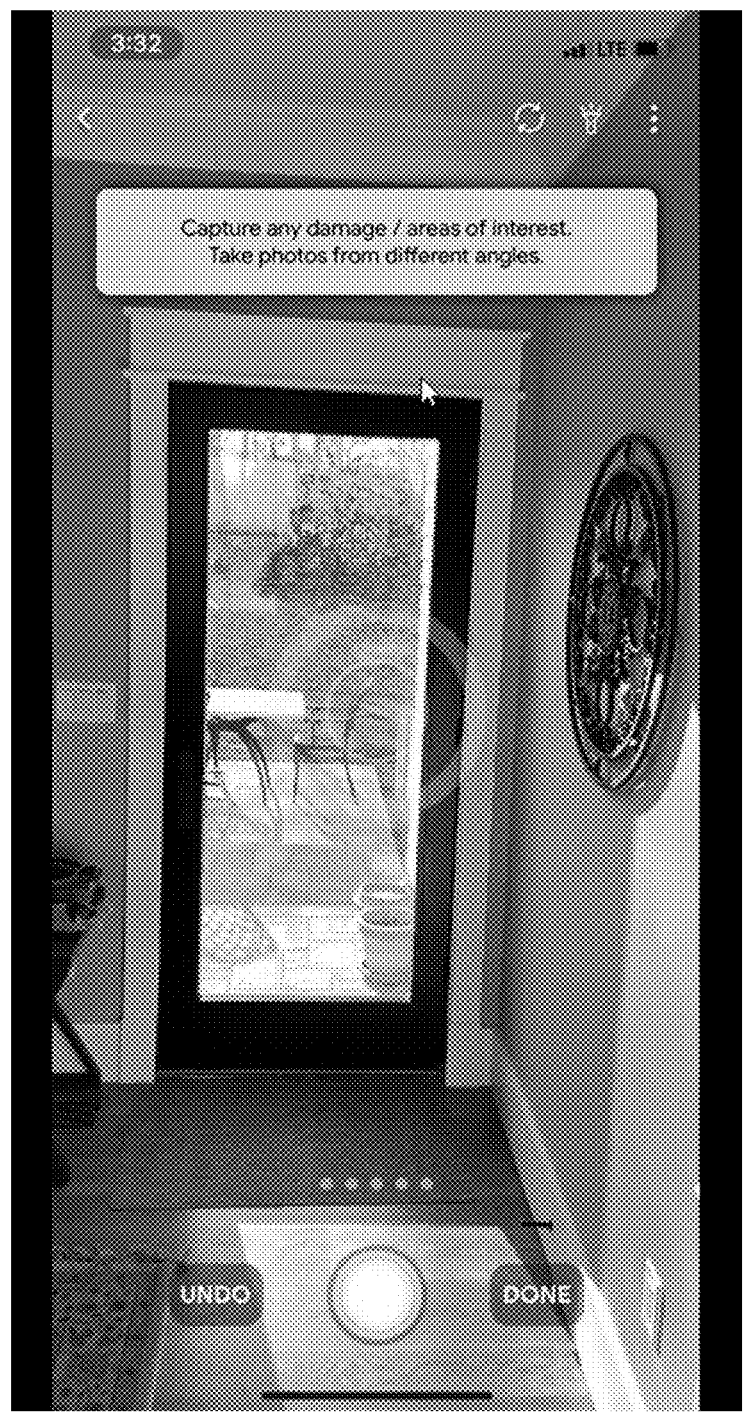
Figure 76:
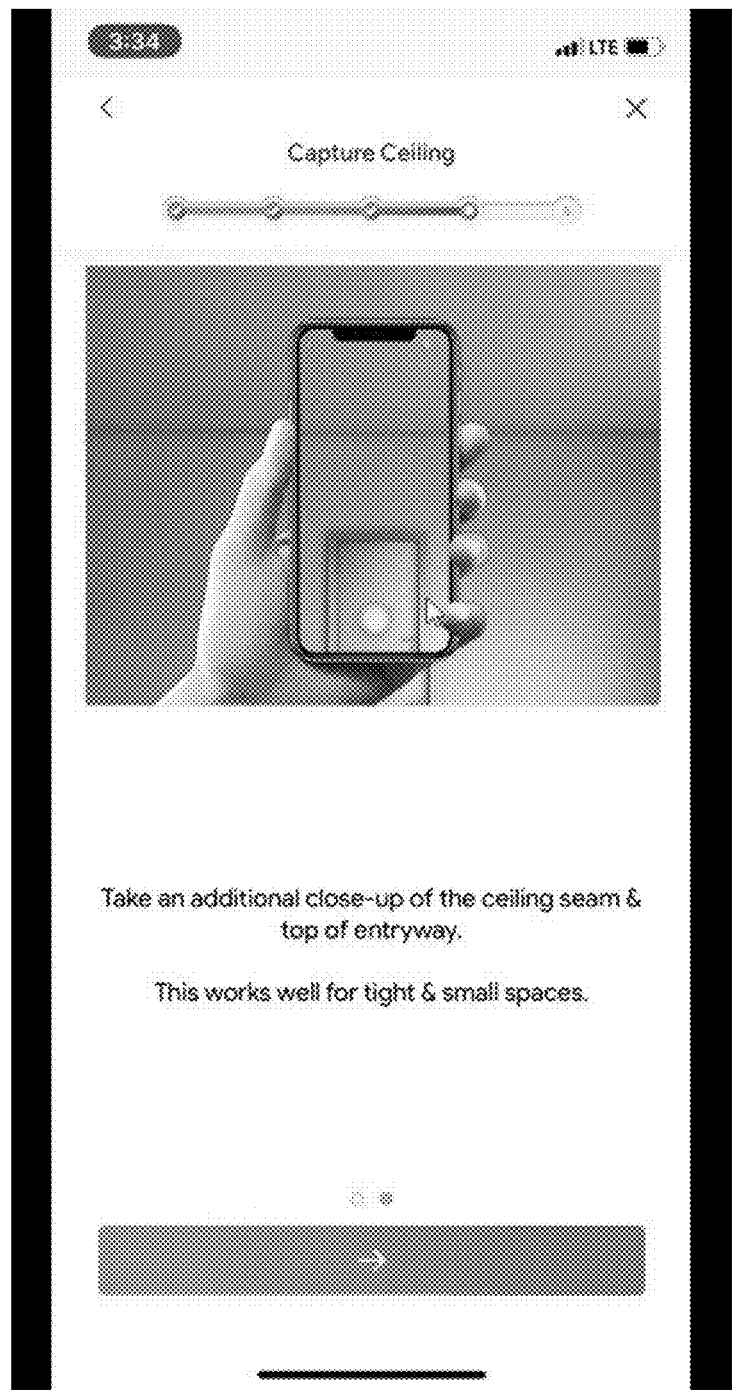
Figure 77:
Figure 78:

Referring to FIG. 70, continuing this example of a practical application in the insurance industry, the application next provides an AR environment to provide instructions to the user about a room detail capture process and to provide the user with information collected about the details of the room. By way of example, FIG. 70 shows the application providing instruction to the user to take a photo (e.g., a floor-to-ceiling photo) of each door, opening, and window of the room. By way of further example, FIG. 71 shows the application providing instruction to the user to take a photo of each cabinet, vanity, shower, and tub of the room. By way of still further example, FIG. 72 shows the application providing instruction to the user to take a photo of each damaged area of the room to allow documentation of the damage for the insurance claim. Referring to FIG. 73, the application provides the user with an AR interface facilitating capture of a photo of a wall opening (e.g., a passage way) of the room. Referring to FIG. 74, the application provides the user with an AR interface facilitating capture of a photo of a door (e.g., an exterior door) of the room. Per FIG. 75, the application instructs the user how to take a floor-to-ceiling photo of an entryway (e.g. a door or opening) to the room and FIG. 76, shows the application instructing the user how to take an additional close-up photo of the entryway at the ceiling seam and top of the entryway. By way of further examples of the entryway photo process, the application, as shown in FIGS. 77 and 78, provide an AR interface facilitating the user's capture of a floor-to-ceiling photo of an interior entryway (see FIG. 77) and a photo of the top of the interior entryway and ceiling (see FIG. 78).

Figure 79:
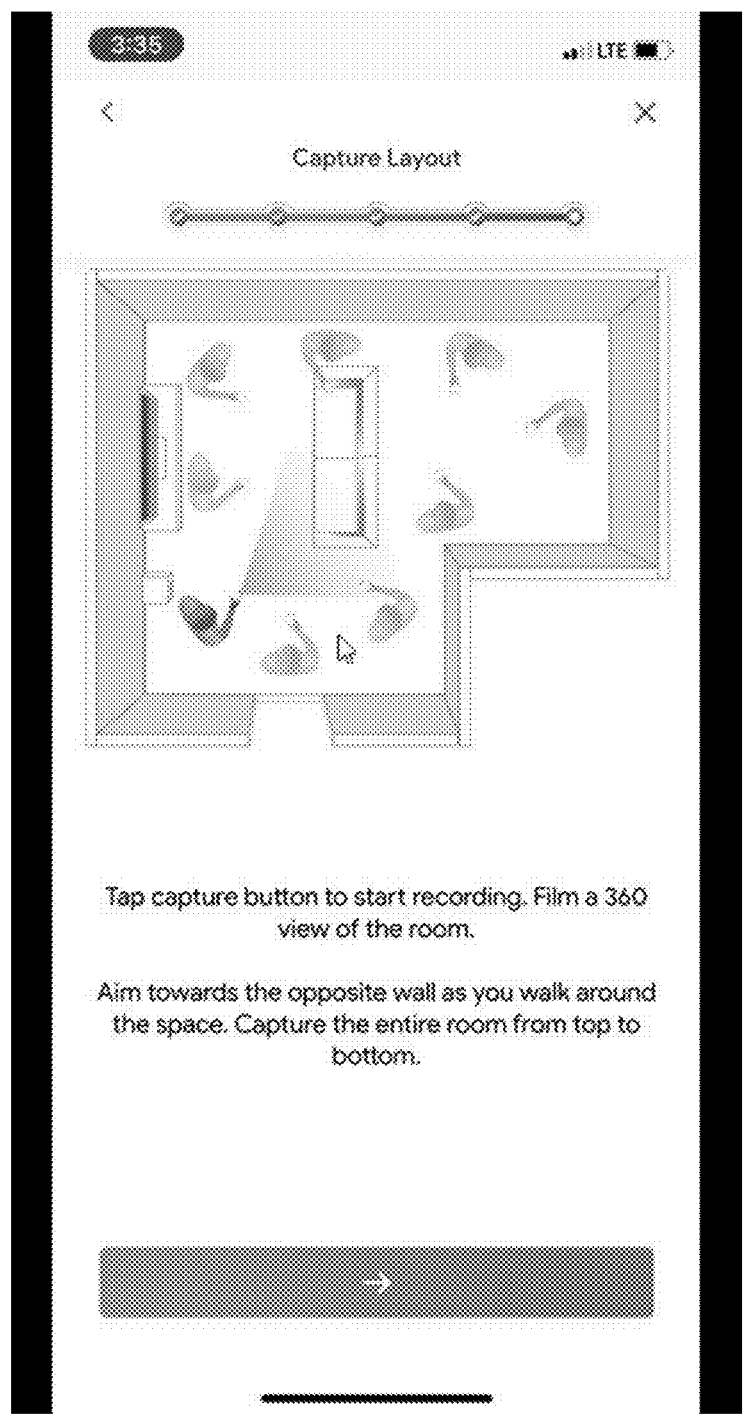
Figure 80:
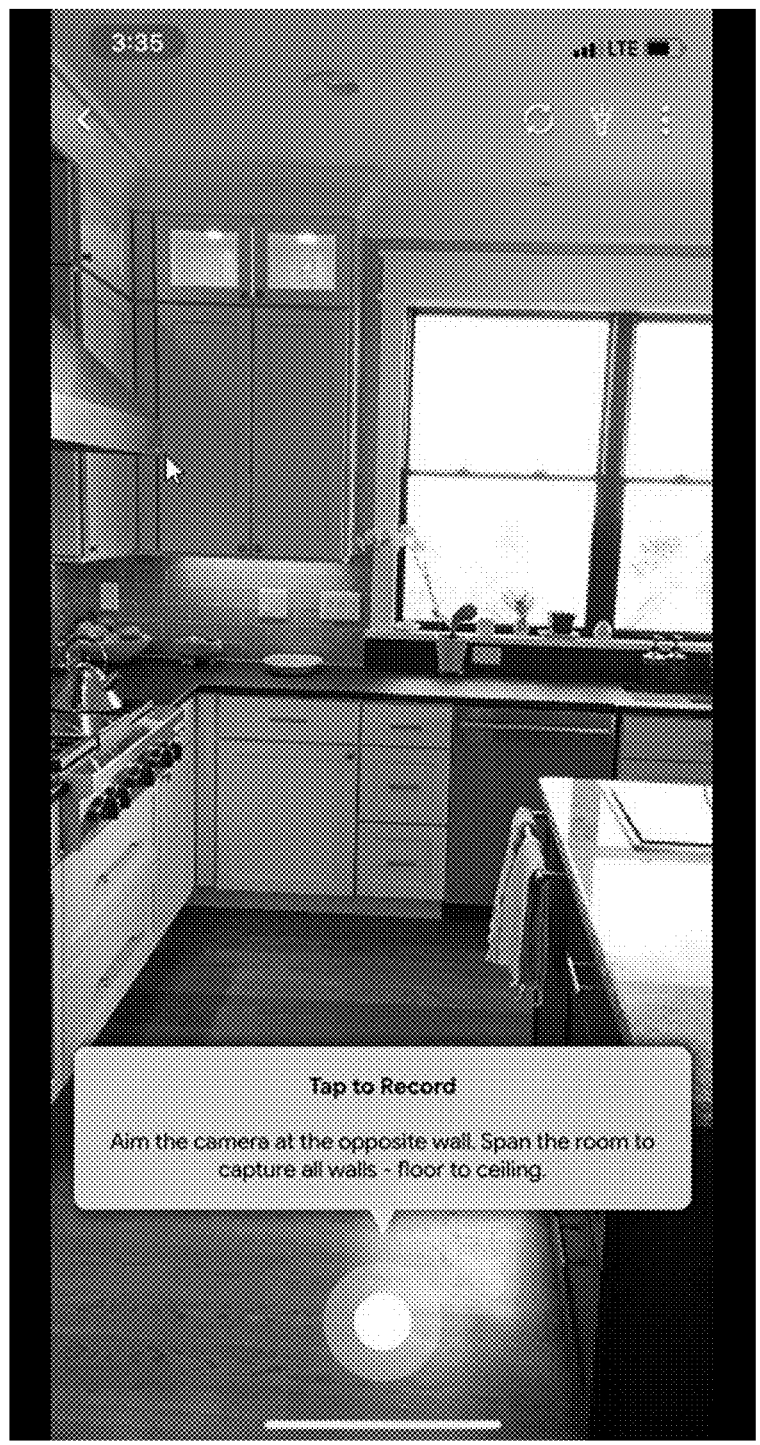
Figure 81:
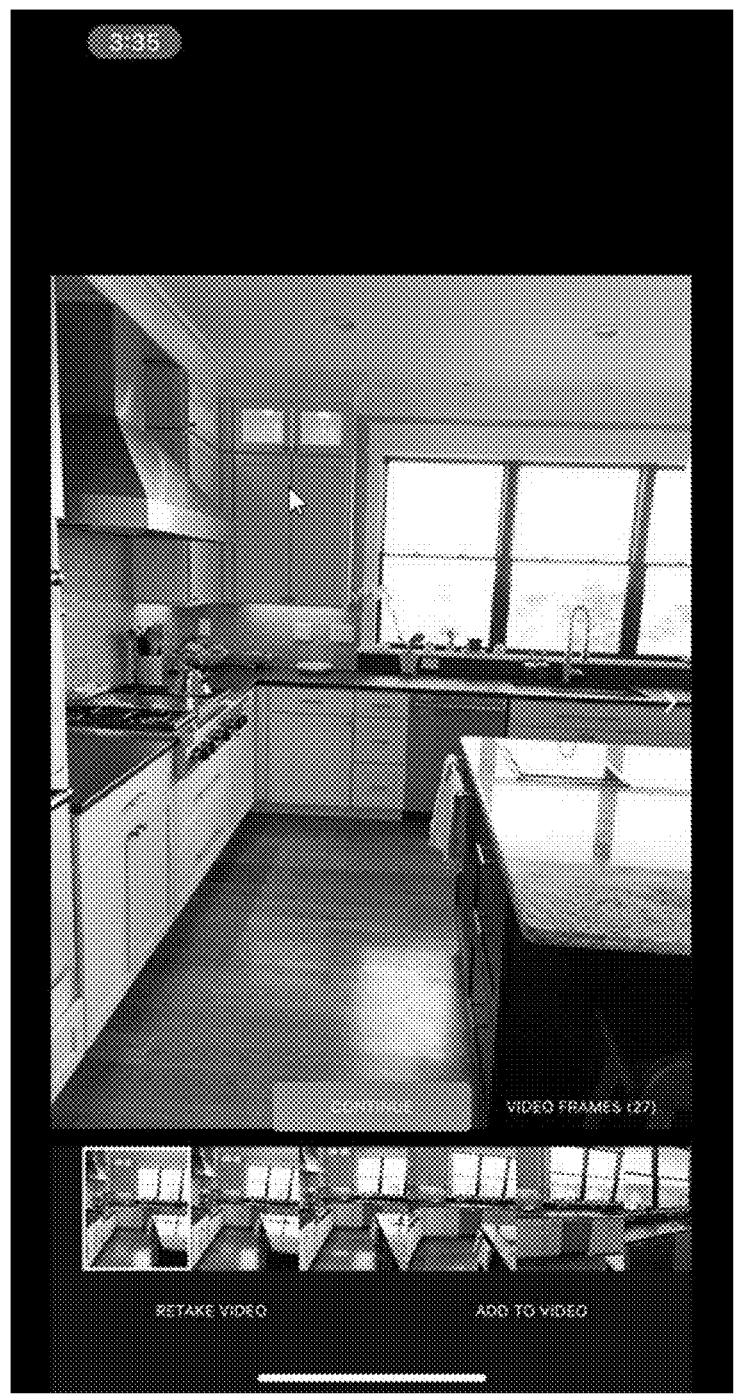
Figure 82:
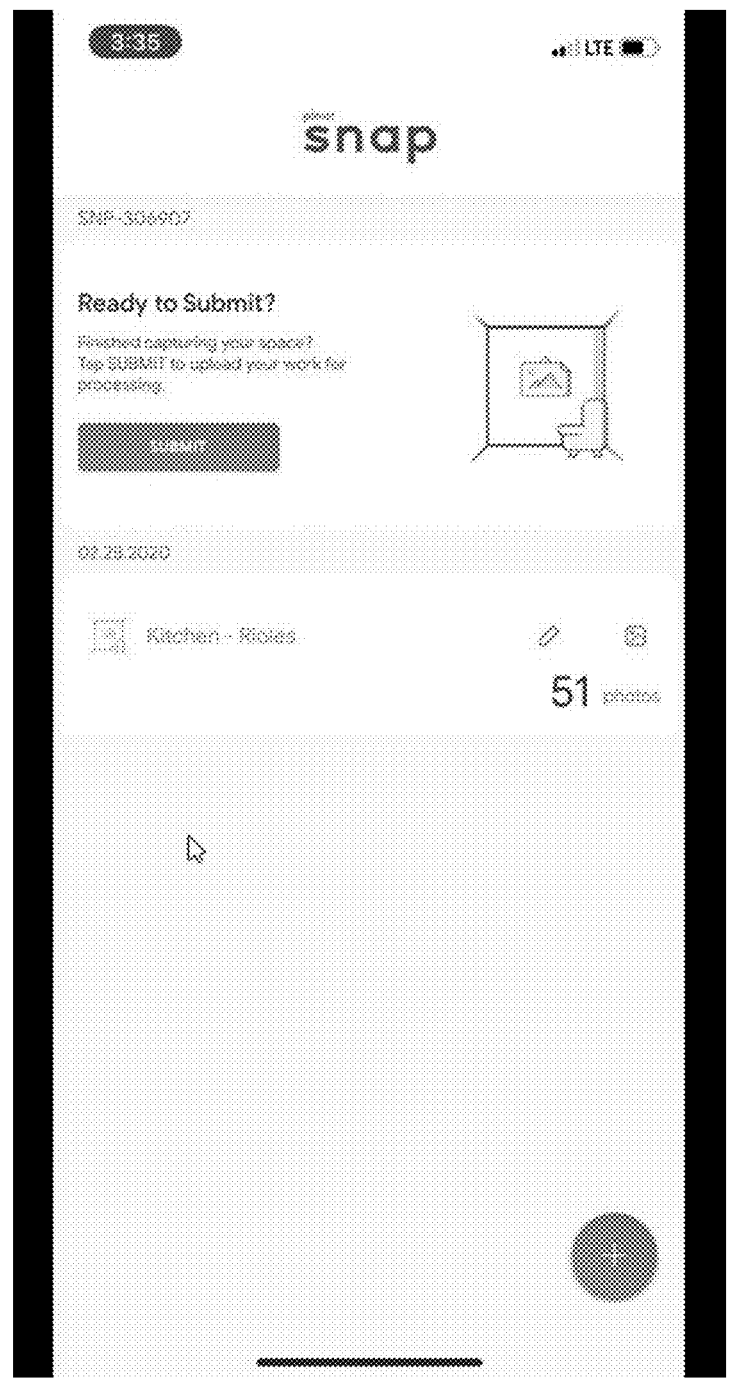

Referring to FIG. 79, continuing this example of a practical application in the insurance industry, the application next provides an AR environment to provide instructions to the user about a 360 degree video capture process and to provide the user with information collected from a 360 video of the room. By way of example, FIG. 80 shows the application providing an AR interface allowing the user to tap a "record" button to begin capturing a 360 video of the room and instructing the user to aim the camera of the mobile device at the opposite wall and to span the room to capture all the walls, floor-to-ceiling. FIG. 81 shows the AR 360 degree video capture interface including interface elements allowing the user to review video frames, retake the video, and add new frames to the video. Finally, as shown in FIG. 82, the application provides a summary of the documentation of the room, e.g., the name of the room and the number of photos (in this exemplary case, 51 photos) taken as well as interface elements allowing the user to edit the documentation, and submit the documentation if it is complete.

Portal Application

In some embodiments, the platforms, systems, media, and methods described herein include a plurality of user applications (e.g., "apps"). In further embodiments, the platforms, systems, media, and methods described herein include a portal application. A portal application described herein is suitably deployed in a number of ways, including, by way of non-limiting examples, as a cloud application, a web application, a mobile application, a standalone application, or a combination of implementations. In a particular embodiment, a portal application described herein is a cloud application performing data analysis and providing functionalities via a cloud computing platform. In some embodiments, a portal is configured for use by an administrative user, e.g., a user other than an end user with involvement, potentially, in more than one project, 3D model, and/or insurance claim. In various embodiments, a portal application described herein allows an administrative user to search, sort, explore, manage, and/or edit a plurality of projects, 3D models, and/or insurance claims.

In some embodiments, a portal application described herein allows an administrative user to conduct a quality assurance (QA) process and/or a 3D model assembly or editing process that utilizes the backing model and image information (e.g., photo, videos, LiDAR data, etc.) to improve and/or perfect the 3D model of the space. For example, via the 3D model editing and other functionalities offered, in some embodiments, by the portal application, the accuracy of the 3D model is, in various embodiments, improved by about 1%, 2%, 3%, 4%, 5%, 6%, 7%, 8%, 9%, 10% or more, including increments therein. In some embodiments, the portal application allows the user to correct for error in detection of the position of the floor plane in the AR environment. In some embodiments, the portal application allows the user to correct for drift (e.g., accumulated error in the AR session resulting from, for example, user movement, sensor accuracy, etc.) in the images (e.g., photo, videos, LiDAR data, etc.) captured by the mobile application. In some embodiments, the portal application allows the user to adjust, rectify, correct, and/or perfect the positions of corners identified in images. In some embodiments, the portal application allows the user to add object(s) not captured in the image data or extend object(s) only partially captured in the image data to complete or improve the 3D model.

In some embodiments, a portal application described herein accesses one or more computer vision algorithms. In particular embodiments, the one or more computer vision algorithms comprises one or more artificial neural networks (ANNs). In some embodiments, the one or more computer vision algorithms are utilized to identify colors of surfaces or objects. In further embodiments, the one or more computer vision algorithms are utilized to identify regions of color, perform color segmentation, and/or measure or otherwise quantify colors and/or regions or segments of color. In some embodiments, the one or more computer vision algorithms are utilized to identify materials of surfaces or objects. In further embodiments, the one or more computer vision algorithms are utilized to identify regions of particular materials, perform material segmentation, and/or measure or otherwise quantify materials and/or regions or segments of particular materials. In some embodiments, the one or more computer vision algorithms are utilized to identify objects in the space. Non-limiting examples of objects in the space include appliances, furniture, artwork, décor, and the like. In various further embodiments, the one or more computer vision algorithms are utilized to measure objects in the space, determine the position of one or more object(s) in the space, determine the value of one or more object(s) in the space.

Figure 83:
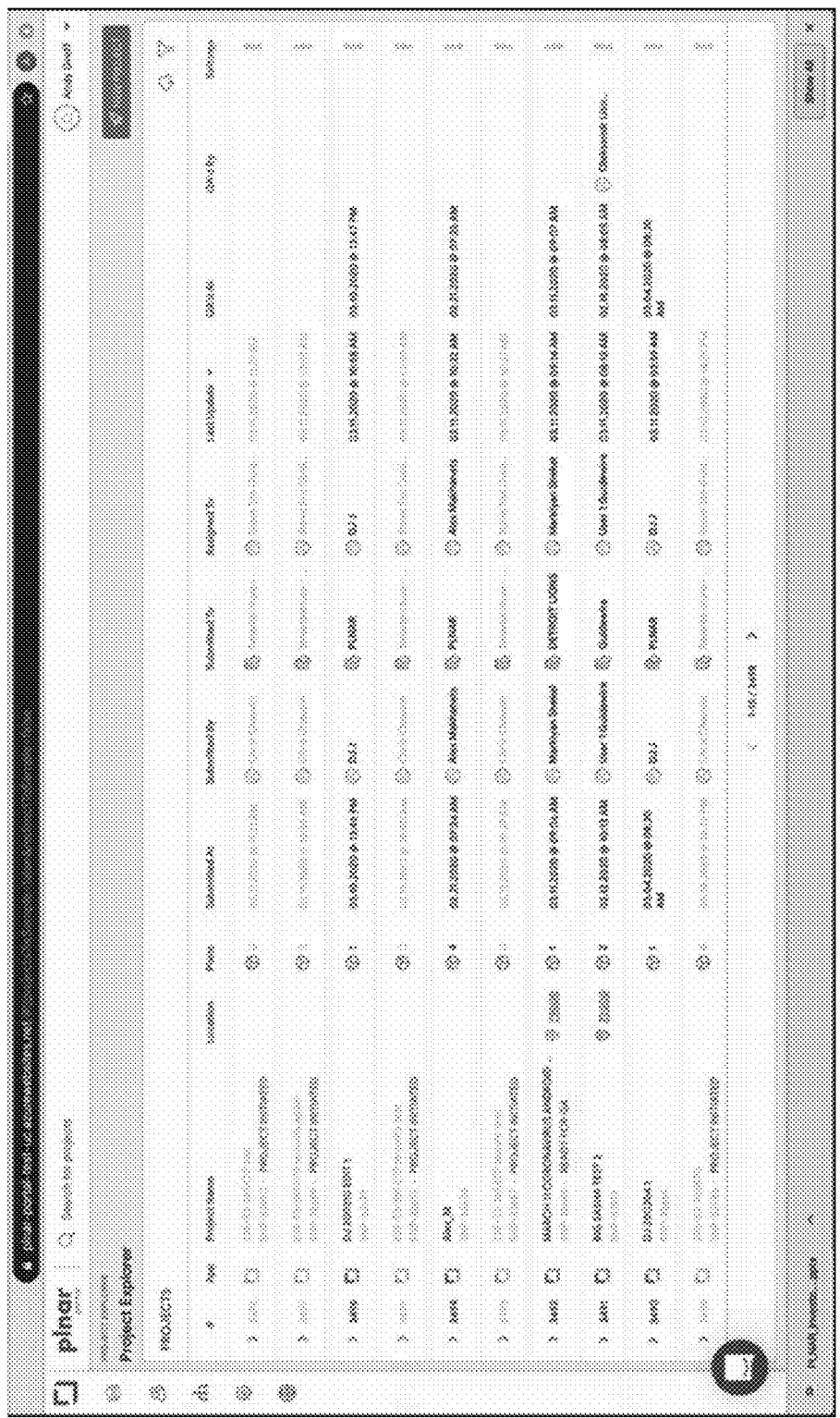
FIGS. 83-98 show non-limiting examples of a user interface for a portal application described herein; in this case, a user interface for an administrative user to manage, explore, and edit a plurality of projects and 3D models associated therewith.

Referring to FIG. 83, in a particular embodiment, the portal application includes a user interface providing a project explorer. In this embodiment, the project explorer provides an administrative user with a searchable, sortable, and filterable list of projects. For each project the project explorer provides, by way of non-limiting examples, a project number and/or ID, the type of end user app used to create the project, a project name, a location, the number of plans/models associated with the project, a date stamp of submission, a time stamp of submission, the name of the person submitting, the party, group, or organization to which the project was submitted, the name of the person to whom the project is assigned, a date/time stamp of last update, quality assurance (QA) information, and project settings. Further, in this embodiment, the project explorer provides an interface element allowing the user to create a new project. Individual projects are optionally, expanded, or otherwise accessed, to obtain further details, information, and functionality described further herein.

Figure 84:
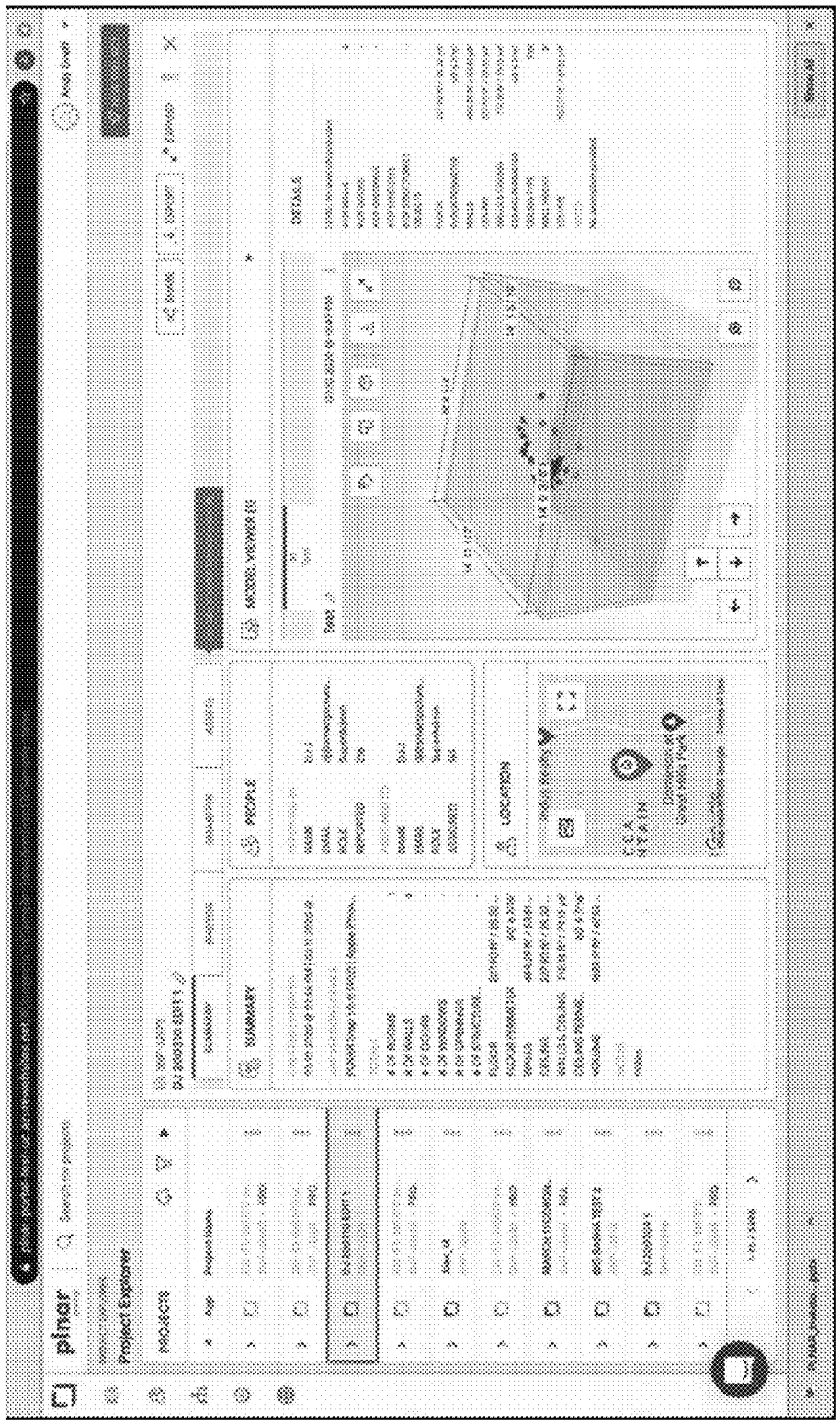

Referring to FIG. 84, in a particular embodiment, the portal application project explorer provides an interface with multiple panes, e.g., sections or grouped functions. In this example, the project explorer includes a projects pane, as described herein, allowing an administrative user to select a project. Further, in this example, the project explorer includes a tabbed pane providing optional access to a summary of a selected project, photos associated with a selected project, smartpix associated with a selected project, and/or assets associated with a selected project. As shown in FIG. 84, the summary optionally includes detailed information about the structure, building, and/or room(s) associated with the project, the people associated with the project, and/or the location(s) associated with the project. Continuing to refer to FIG. 84, in this particular embodiment, the portal application project explorer provides a 3D model viewer. In some embodiments, a model viewer described herein allows a user to move, zoom, rotate, and otherwise navigate a 3D model. In further embodiments, the model viewer shows, by way of non-limiting examples, the floor, walls, openings (e.g., doors, windows, passageways, etc.), fixtures (e.g., cabinets, islands, vanities, shelves, lighting, etc.), ceilings, and even artwork of the modeled space (e.g., structures, buildings, room(s), walls, etc.). In this embodiment, the 3D model depicted in the model viewer is updated in real-time when the administrative user utilizes the functionalities described herein to edit, update, correct, or otherwise change the data underlying the model. Also, in this embodiment, the project explorer interface includes elements allowing the administrative user to easily share and/or export one or more projects.

Figure 85:
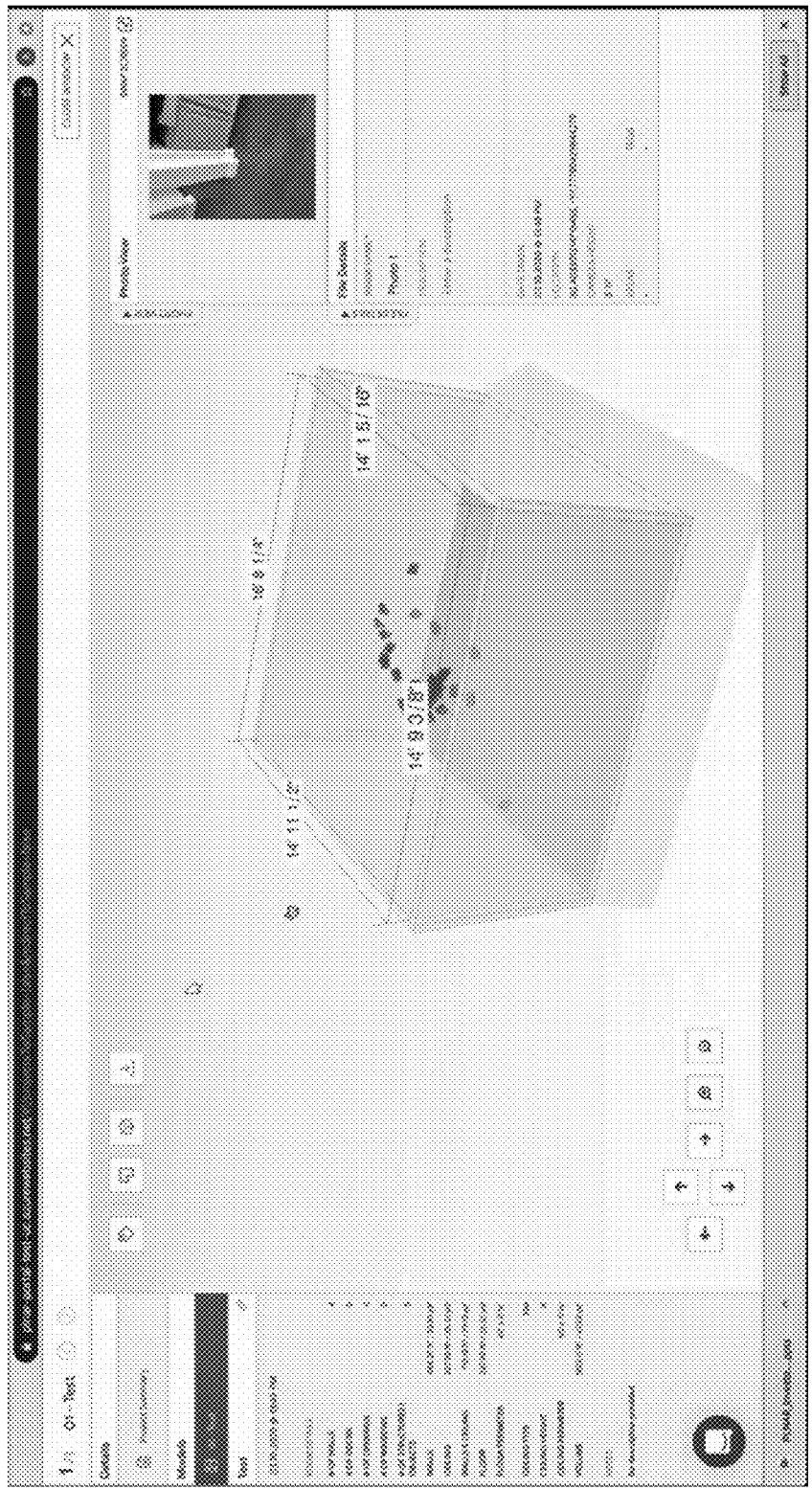

Referring to FIG. 85, in a particular embodiment, the portal application provides a model explorer that is expandable to show complex 3D models in great detail. In this embodiment, and as shown in FIG. 85, the model explorer provides 3D model information including, by way of non-limiting examples, number of walls, number of doors, number of openings, number of windows, number of structures and/or objects, wall area, ceiling area, combined wall and ceiling area, floor area, floor perimeter, ceiling type, ceiling height, ceiling perimeter, volume of the space, and combinations thereof. Further, in this embodiment, one or more (or each) photo used to construct the 3D model is represented in the model via an icon, such as, for example, a camera icon. In particular embodiments, the icons representing each photo are oriented in 3D space to show the orientation of the camera at the time the photo was captured. In this case, each photo and details pertaining thereto are optionally accessed via the model viewers interface elements, such as the icons.

Figure 86:
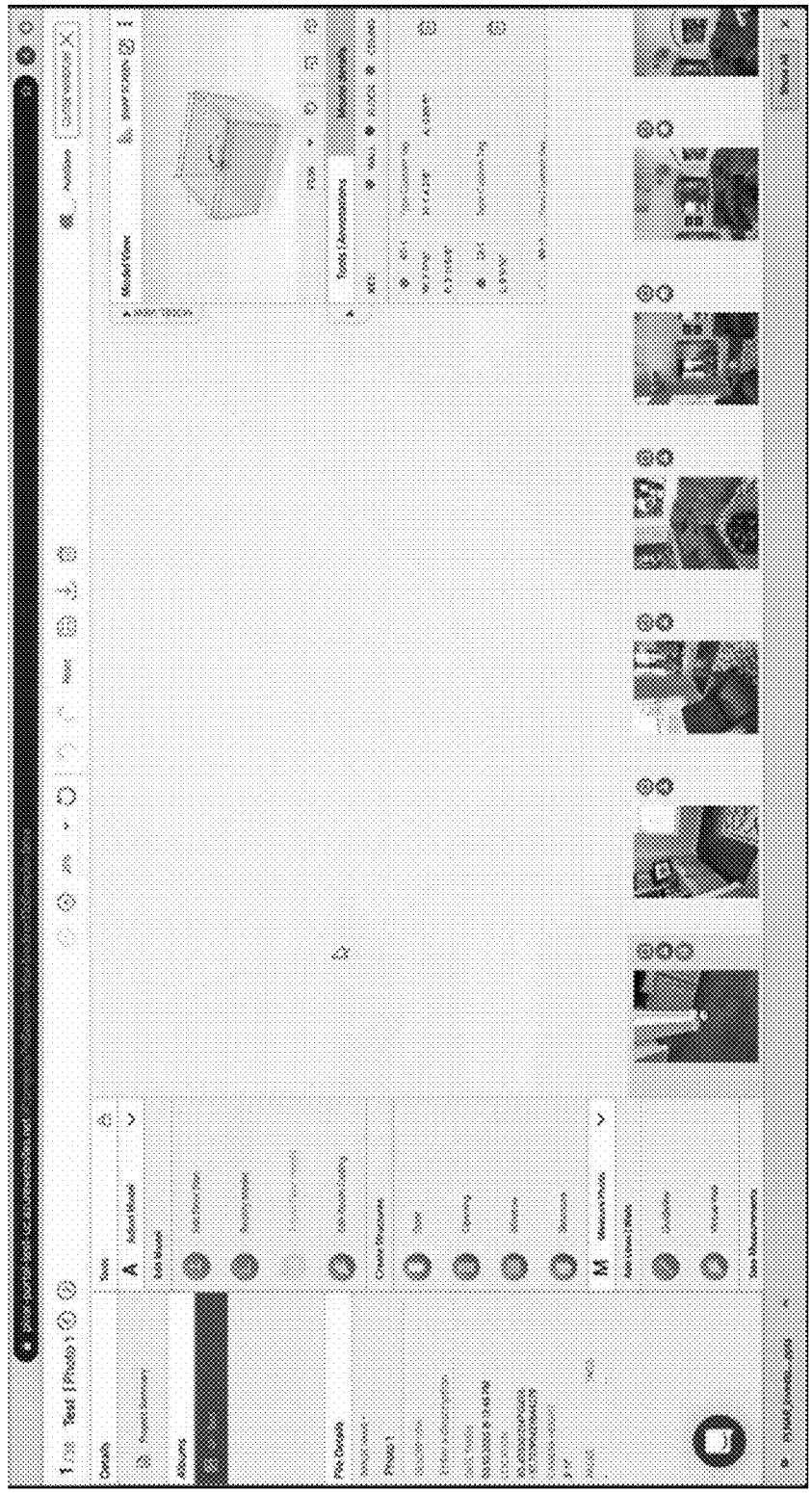

Referring to FIG. 86, in a particular embodiment, the portal application provides a suite of model tools. In this embodiment, the tools include, by way of non-limiting examples, model adjusting tools and photo measuring tools. In some embodiments, the model adjusting tools include, by way of examples, model editing tools and structure creation tools. In further embodiments, the model editing tools include, for example, an edit floor plan feature, a rectify model feature, an adjust floor height feature, an edit room ceiling feature, and combinations thereof. In further embodiments, the structure creation tools include, for example, a create door feature, a create opening feature, a create window feature, a create structure feature, and combinations thereof. In some embodiments, the photo measuring tools include, by way of examples, line adding tools, wall adding tools, and measurement taking tools. In further embodiments, the line adding tools include, for example, an add guideline feature. In further embodiments, the wall adding tools include, for example, an add virtual wall feature.

Figure 87:
Figure 88:
Figure 90:
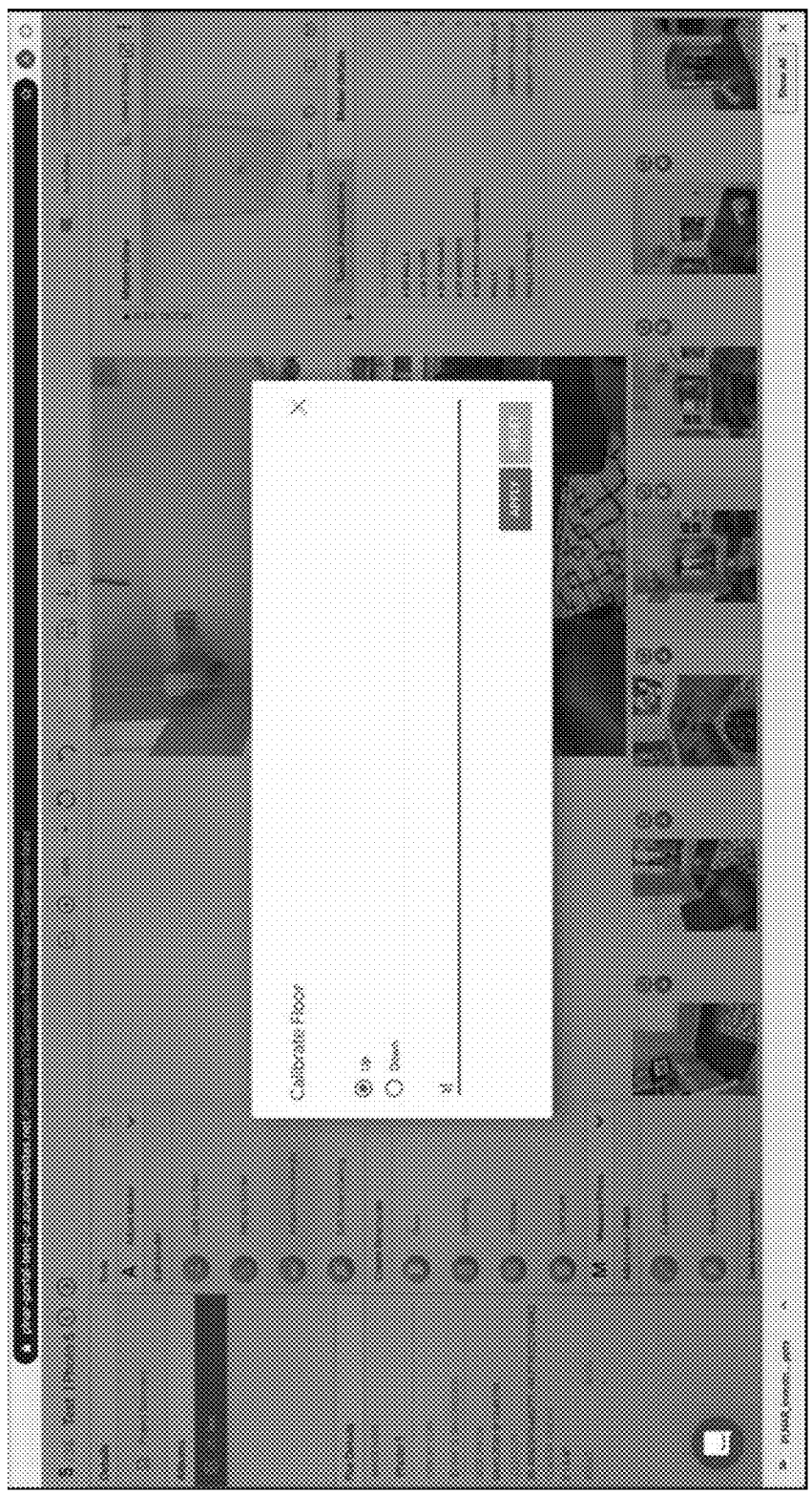

Referring to FIG. 87, in a particular embodiment, the portal application provides a model adjusting tool in the form of an edit floor plan feature. In this embodiment, the edit floor plan feature is optionally used by an administrative user to manually or automatically adjust the corners identified in respective photos captured to perfect the floor perimeter and floorplan. As shown in FIG. 87, each photo including floor corner information is optionally reviewed and the position of the identified corner optionally adjusted. In some cases, the corners are optionally manually (e.g., by selecting and shifting the position of the corner marker) or automatically rectified to square (e.g., 90 degrees) or other angles (e.g., 180 degrees, 45 degrees, 30 degrees, etc.) appropriate (whichever angle is closest). FIG. 88 exemplifies the scenario where the corner in the photo is hidden behind a visual obstruction and an automatic corner rectification tool is preferred over a manual rectification. In some embodiments, the angles and planes of the entire model are optionally automatically rectified with a rectify model feature; again to flush (e.g., 180 degrees), square and/or plum (e.g., 90 degrees) or other angles (e.g., 45 degrees, 30 degrees, etc.) where appropriate (whichever angle is closest). FIG. 90 shows a related adjust floor height feature allowing an administrative user to calibrate the floor up or down. In these embodiments, adjustments made with the edit floor plan feature are reflected in the resultant 3D model in real-time.

Figure 89:
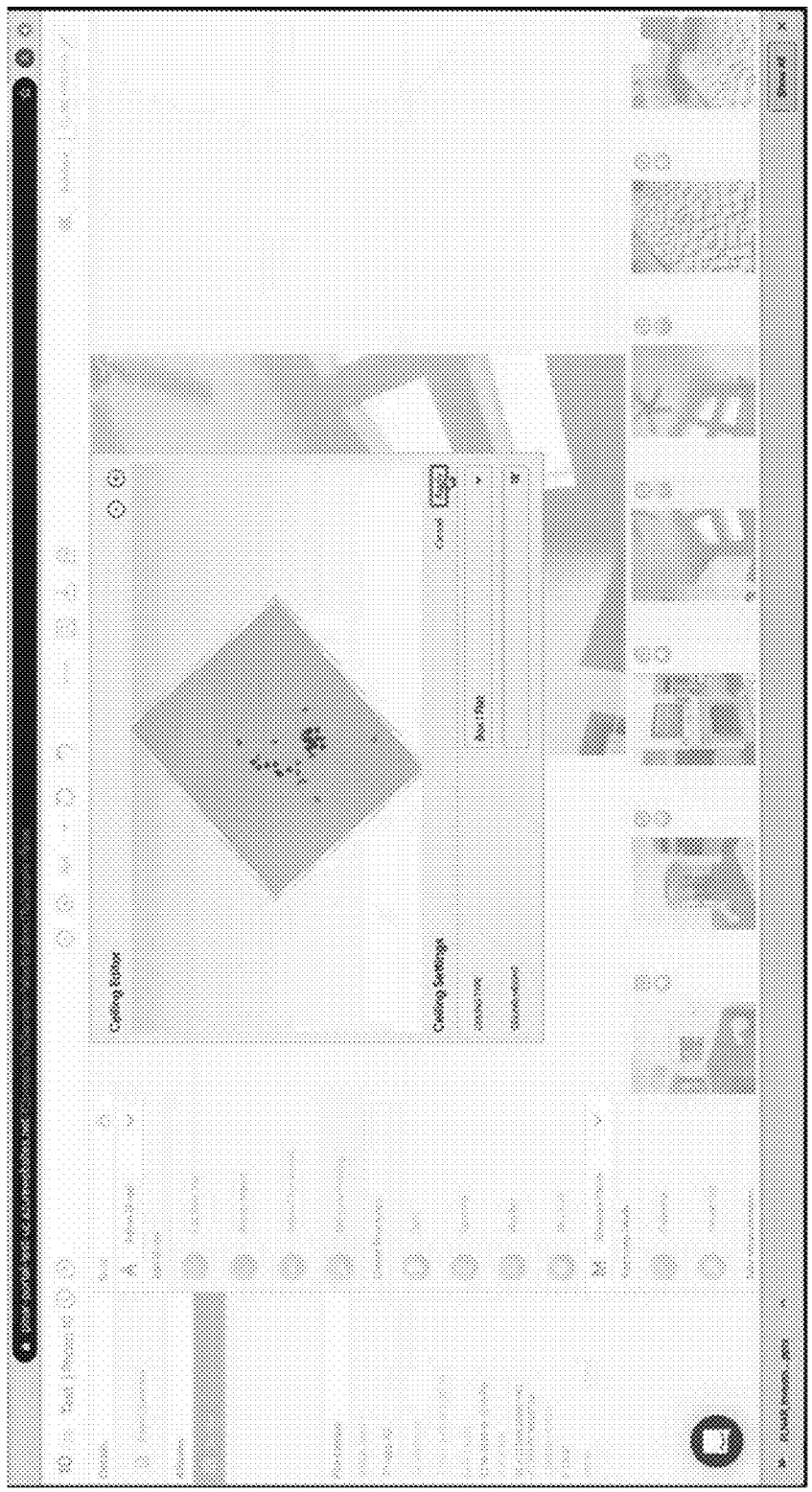

Referring to FIG. 89, in a particular embodiment, the portal application provides a model adjusting tool in the form of an ceiling editor feature. In this embodiment, the ceiling editor feature is optionally used by an administrative user to change the ceiling type (e.g., box/flat, sloped, vaulted, peaked, attic, tray etc.), raise or lower the celling height, and/or manually or automatically adjust the corners identified in respective photos captured to perfect the ceiling perimeter and virtual ceiling of the 3D model. As shown in FIG. 89, each photo including ceiling corner information is optionally reviewed and the position of the identified corner optionally adjusted. In some cases, the corners are optionally manually (e.g., by selecting and shifting the position of the corner marker) or automatically rectified to square (e.g., 90 degrees) or other angles (e.g., 180 degrees, 45 degrees, 30 degrees, etc.) where appropriate (whichever angle is closest). In some embodiments, the angles and planes of the entire model are optionally automatically rectified with a rectify model feature; again to flush (e.g., 180 degrees), square and/or plum (e.g., 90 degrees) or other angles (e.g., 45 degrees, 30 degrees, etc.) where appropriate (whichever angle is closest). In these embodiments, adjustments made with the ceiling editor feature are reflected in the resultant 3D model in real-time.

Figure 91:
Figure 92:

Referring to FIGS. 91 and 92, in a particular embodiment, the portal application provides a create structure tool in the form of an add opening feature. In this embodiment, the add opening feature is optionally used by an administrative user to add a passageway wall opening to a room photo. As shown in each of FIG. 91 and FIG. 92, the user clicks and drags to define the wall opening depicted in the photo (with annotations showing measurements in real world dimensions). In this embodiment, the 3D model of the space, shown in the model view pane of the interface, is updated in real-time. FIG. 92 illustrates how the properties of the new wall opening, including, by way of examples, one or more custom tags, width, height, area, and perimeter, are displayed in a properties explorer pane of the interface.

Figure 93:
Figure 94:
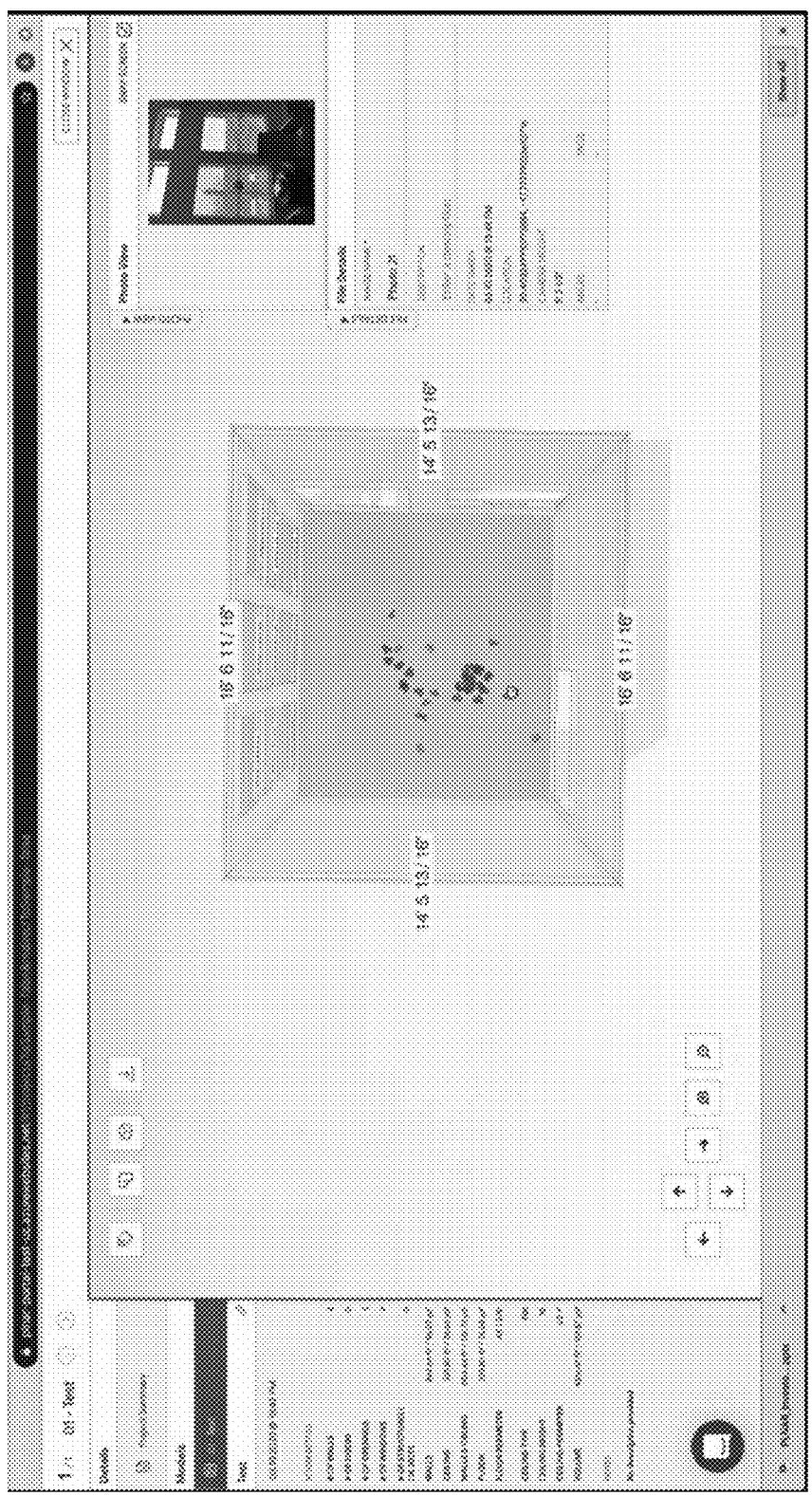
Figure 95:
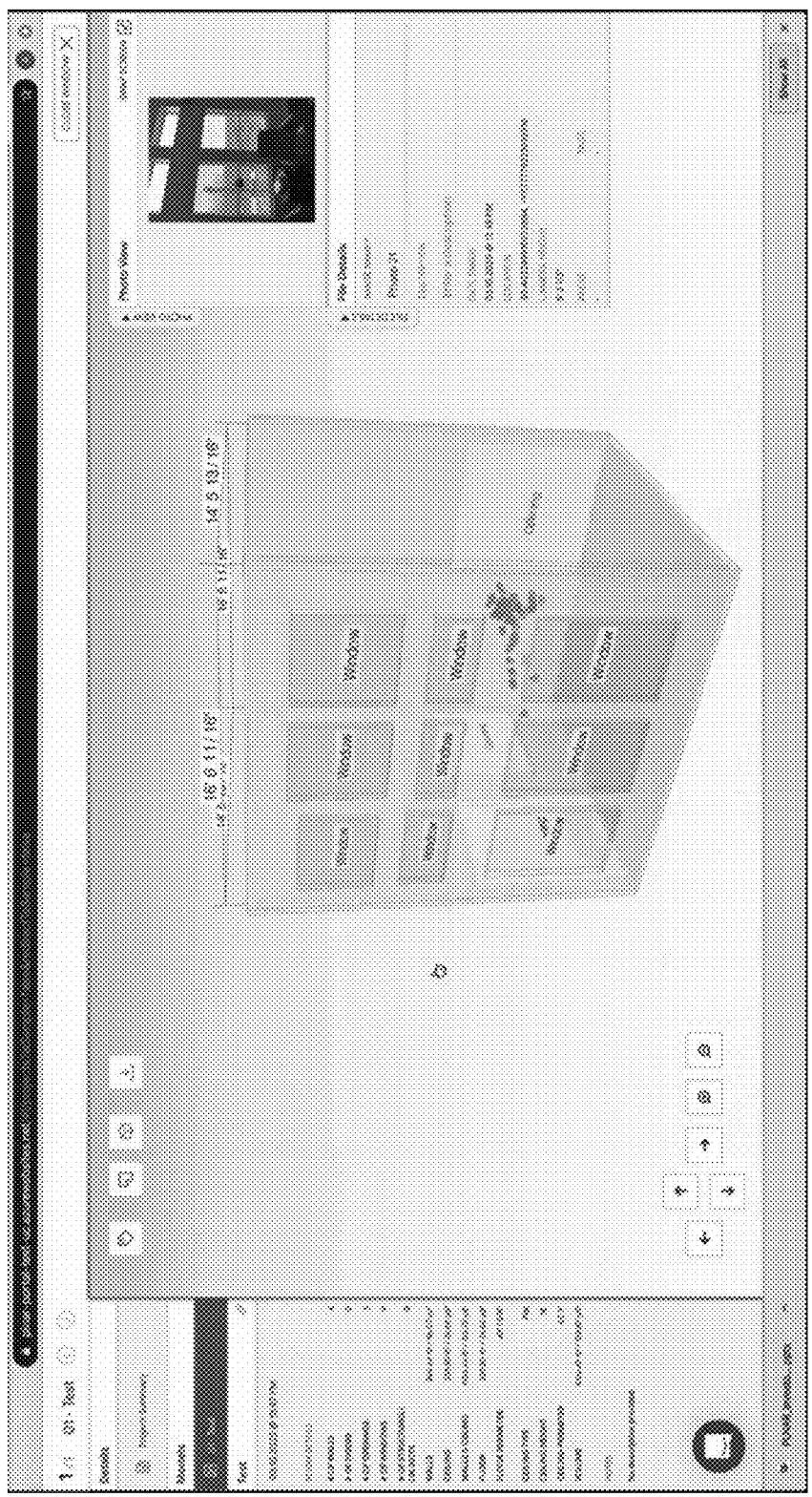

Referring to FIG. 93, in a particular embodiment, the portal application provides a create structure tool in the form of an add window feature. In this embodiment, the add window feature is optionally used by an administrative user to add a window wall opening to a room photo. As shown in FIG. 93, the user clicks and drags to define the window opening depicted in the photo (with annotations showing measurements in real world dimensions). FIG. 93 illustrates how the properties of the new wall opening, including, by way of examples, one or more custom tags, width, height, area, perimeter, window type, and window size are displayed in a properties explorer pane of the interface. FIGS. 94 and 95 illustrate how the 3D model of the space is updated in real-time as each window is added.

Figure 96:
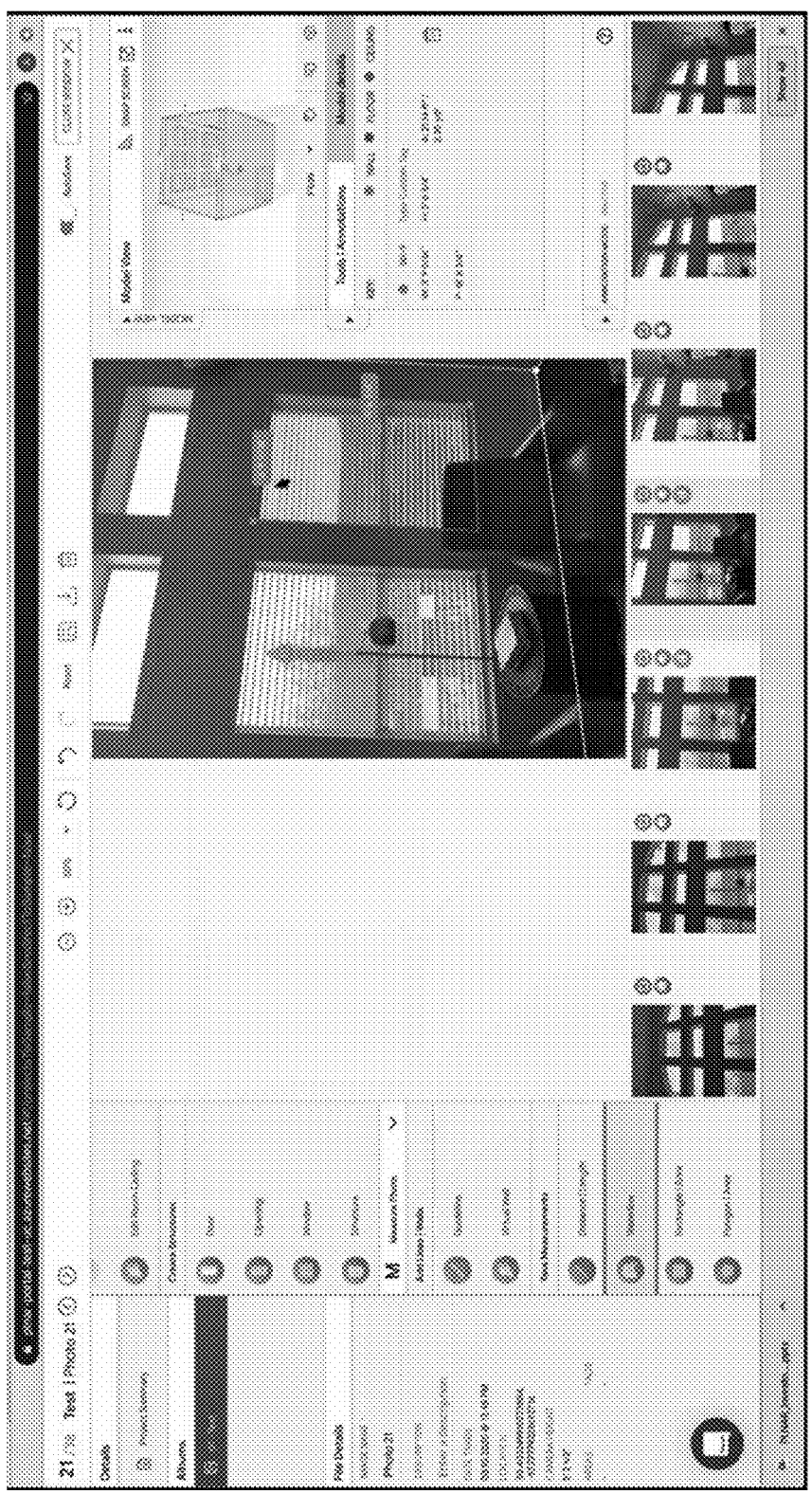
Figure 97:
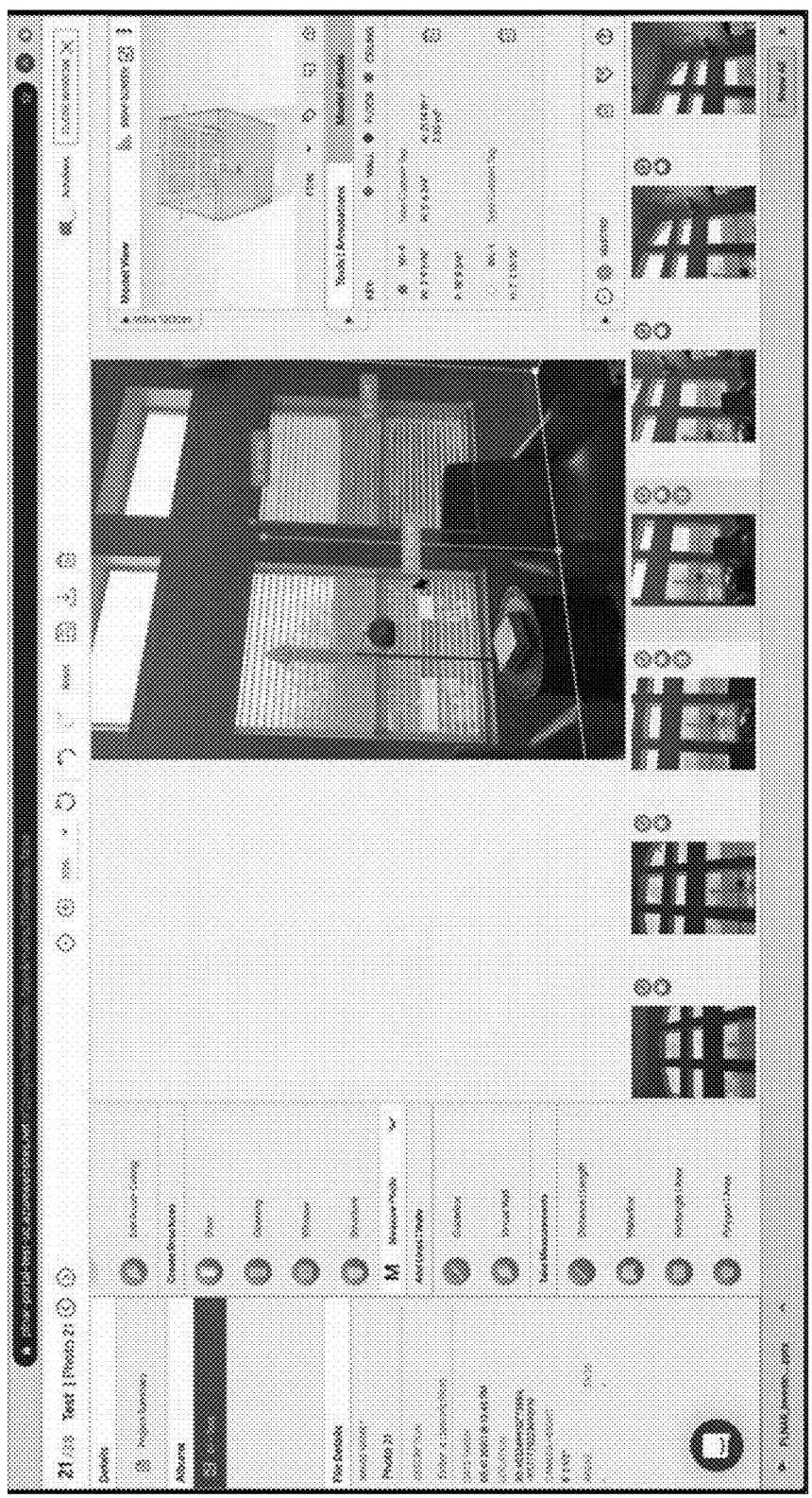

Referring to FIGS. 96 and 97, in a particular embodiment, the portal application provides a measure photo tool in the form of a waterline feature. In this embodiment, the waterline feature is optionally used by an administrative user to attach a waterline measurement to a perimeter line of the floor at a fixed height measured in real world dimensions. In this embodiment, the user optionally clicks and drags to create the waterline and define its height. As shown in FIG. 97, the user can then slide the waterline along the floor perimeter and the fixed height of the line is maintained. Continuing to refer to FIGS. 96 and 97, in various embodiments, other measuring tools include, for example, a distance feature for measuring length in real world dimensions, a rectangle feature for measuring simple area in real world dimensions, and a polygon feature for measuring complex area in real world dimensions.

Figure 98:

Referring to FIG. 98, in a particular embodiment, the portal application provides a create structure tool in the form of an add structure feature. In this embodiment, the add structure feature is optionally used by an administrative user to add one or more cabinets (or fixtures, room dividers, pony walls, vanities, islands, art works, etc.) to a room photo. As shown in FIG. 98, the user clicks and drags to define the upper and lower cabinets depicted in the photo. FIG. 98 illustrates how the properties of the cabinets, including, by way of examples, one or more custom tags, width, height, depth, type, and the like are displayed in a properties explorer pane of the interface. FIG. 98 illustrates how the 3D model of the space is updated in real-time as each window is added.

While preferred embodiments of the present subject matter have been shown and described herein, it will be obvious to those skilled in the art that such embodiments are provided by way of example only. Numerous variations, changes, and substitutions will now occur to those skilled in the art without departing from the subject matter described herein. It should be understood that various alternatives to the embodiments of the subject matter described herein may be employed.

What is claimed is:

1. A system comprising a first processing device and a second processing device;
   the first processing device comprising a camera and at least one processor configured to perform at least the following:
   a) launch an active augmented reality (AR) session;
   b) calibrate the AR session by:
      i) establishing a fixed coordinate system,
      ii) receiving a position and orientation of one or more horizontal or vertical planes in a space in reference to the fixed coordinate system, and
      iii) receiving a position and orientation of the camera in reference to the fixed coordinate system;
   c) construct a backing model comprising:
      i) the fixed coordinate system,
      ii) the position and orientation of the camera,
      iii) a projection matrix of the camera; and
      iv) the position and orientation of the one or more horizontal or vertical planes;
   d) present a user interface allowing a user to capture at least one photo of the space during the active AR session;
   e) extract camera data from the AR session for the at least one photo;
   f) extract the backing model from the AR session; and
   g) store the camera data and the backing model in association with the at least one photo, wherein the association between at least one photo and the camera data and the backing model is formed by storing the camera data and the backing model as metadata of the at least one photo or by a key, token, or link;
   the second processing device comprising at least one processor configured to perform at least the following:
   a) access, after close of the AR session, the at least one photo, the camera data, and the backing model; and
   b) provide, after close of the AR session, a user interface allowing a user to take a measurement in the at least one photo, wherein the measurement utilizes at least the position and orientation of the camera and the projection matrix of the camera to map a plurality of 2D points in the at least one photo to 3D world points in the space.

2. The system of claim 1, wherein the first second processing device is further configured to:
   a) provide a user interface allowing the user to perform at least:
      i) viewing the at least one photo; and
      ii) identifying screen coordinates on the at least one photo to measure a feature of the space;
   b) build a conversion pipeline, using the camera data, to convert the screen coordinates to world coordinates using ray-casting, the conversion pipeline performing at least:
      i) using the screen coordinates to project a camera ray in world coordinates;
      ii) evaluate the ray for intersections with objects in the backing model; and
      iii) return any intersections as the world coordinates corresponding to the screen coordinates;
   c) convert the identified world coordinates to one or more lengths, one or more areas, or one or more volumes in the space;
   d) annotate the at least one photo with the one or more lengths, one or more areas, or one or more volumes; and e) store the measurements and annotations in association with the at least one photo.

3. The system of claim 2, wherein the user identifies screen coordinates by tapping on a touchscreen, tapping and dragging on a touch screen, clicking with a pointing device, or clicking and dragging with a pointing device.

4. The system of claim 2, wherein the measurements and annotations are stored in association with the at least one photo as metadata associated with the at least one photo.

5. The system of claim 2, wherein the measurements and annotations are stored in association with the at least one photo by linking the measurements and the annotations to that at least one photo via a stored token or key.

6. The system of claim 1, wherein the second processing device is further configured to:
 a) utilize one or more computer vision algorithms to detect one or more 3D geometries in the space, the one or more 3D geometries selected from: floor corners, walls, windows, doors, and other 3D geometries; and
 b) automatically add detected 3D geometries to the backing model.

7. The system of claim 1, wherein the first processing device is further configured to allow the user to make corrections to the backing model based on measurements taken in the at least one photo.

8. The system of claim 1, wherein the second processing device is further configured to transmit the stored camera data, the stored backing model, and the at least one photo.

9. The system of claim 1, wherein the camera data comprises: projection matrix, view matrix, view port, camera position, view angle, scale factor, or a combination thereof.

10. The system of claim 1, wherein the first processing device is further configured to allow the user to add one or more objects to the backing model by performing at least the following:
 a) provide an AR interface allowing the user to indicate the positions of corners of a floor of the space in reference to the fixed coordinate system, wherein the application is configured to project a reference point on the screen into a ray in world coordinates and determine an intersection point with the one or more horizontal or vertical planes plane via hit-testing thus detecting the corners of the floor of the space;
 b) assemble the detected corners into a floorplan of the space;
 c) generate virtual quasi-infinite vertical planes extending from each corner of the detected corners representing virtual walls of the space;
 d) provide an AR interface allowing the user to indicate the positions of intersection points between the ceiling and the virtual walls;
 e) truncate the virtual walls to reflect the ceiling height in the space; and
 f) optionally, provide an AR interface allowing the user to indicate the positions of corners openings in the virtual walls.

11. The system of claim 1, wherein the first processing device is further configured to convert the at least one photo to a transmittable format.

12. The system of claim 1, wherein the camera data and the backing model are stored in a structured or semi-structured data format.

13. The system of claim 1, wherein the camera data and the backing model are stored in association with the at least one photo as metadata associated with the at least one photo.

14. The system of claim 1, wherein the camera data and the backing model are stored in association with the at least one photo by linking the camera data and the backing model to that at least one photo via a stored token or key.

15. The system of claim 1, wherein the capture of the at least one photo of the space during the active AR session is triggered by a local user present in the space and with the first processing device.

16. The system of claim 1, wherein the capture of the at least one photo of the space during the active AR session is triggered by a remote user not present in the space.

17. The system of claim 1, wherein the second processing device is further configured to provide a user interface allowing a user to edit the position or orientation of the one or more horizontal or vertical planes in the space in reference to the fixed coordinate system.

18. The system of claim 2, wherein the second processing device is further configured to provide a user interface allowing a user to edit the screen coordinates identified on the at least one photo.

19. The system of claim 1, further comprising one or more computer vision algorithms configured to perform one or more of the following:
 a) identify or quantify one or more colors in space;
 b) identify or quantify one or more materials in the space; and
 c) identify or quantify one or more objects in the space.

20. The system of claim 1, further comprising an application allowing a user to rectify a floorplan by enforcing angles of all segments of the floorplan to fall into a predetermined set of angles selected from the group consisting of: 0 degrees, 45 degrees, 90 degrees, 135 degrees, and 180 degrees.

21. The system of claim 1, further comprising an application allowing a user to adjust a scale of a floorplan and 3D model by adjusting a virtual floor-plane height incrementally such that modeled object dimensions and aspect ratios match those of a known physical size of the space.

22. The system of claim 1, further comprising an application allowing a user to model ceiling geometries from the at least one photo of the space by hit-testing and identification of ceiling planes, facets, and boundaries.

23. A method comprising:
 a) launching an active augmented reality (AR) session on a first processing device comprising a camera and at least one processor;
 b) calibrating the AR session by establishing a fixed coordinate system, receiving a position and orientation of one or more horizontal or vertical planes in a space in reference to the fixed coordinate system, and receiving a position and orientation of the camera in reference to the fixed coordinate system;
 c) constructing a backing model comprising the fixed coordinate system, the position and orientation of the camera, a projection matrix of the camera, and the position and orientation of the one or more horizontal or vertical planes;
 d) providing an interface allowing a user to capture at least one photo of the space during the active AR session;
 e) extracting camera data from the AR session for the at least one photo;
 f) extracting the backing model from the AR session;
 g) storing the camera data and the backing model in association with the at least one photo, wherein the association between at least one photo and the camera data and the backing model is formed by storing the camera data and the backing model as metadata of the at least one photo or by a key, token, or link; and h) asynchronously, after close of the AR session, taking a measurement in the at least one photo, wherein the measurement utilizes at least the position and orientation of the camera and the projection matrix of the camera to map a plurality of 2D points in the at least one photo to 3D world points in the space.

* * * * *